United States Patent
Sanderford, Jr. et al.

[11] Patent Number: 6,111,911
[45] Date of Patent: *Aug. 29, 2000

[54] DIRECT SEQUENCE FREQUENCY AMBIGUITY RESOLVING RECEIVER

[75] Inventors: H. Britton Sanderford, Jr., New Orleans; Robert E. Rouquette, Kenner; Robert J. Davis, Metairie, all of La.

[73] Assignee: Sanconix, Inc, New Orleans, La.

[*] Notice: This patent issued on a continued prosecution application filed under 37 CFR 1.53(d), and is subject to the twenty year patent term provisions of 35 U.S.C. 154(a)(2).

[21] Appl. No.: 08/485,007

[22] Filed: Jun. 7, 1995

[51] Int. Cl.$^7$ .................................................. H04B 1/707
[52] U.S. Cl. ........................................ 375/147; 375/141
[58] Field of Search ................................. 375/347, 349, 375/350, 367, 130, 140, 141, 143, 147, 152; 370/342, 441, 479, 335, 320

[56] References Cited

U.S. PATENT DOCUMENTS

| | | | |
|---|---|---|---|
| 4,100,370 | 7/1978 | Suzuki et al. | 395/2.55 |
| 4,152,651 | 5/1979 | Lampert et al. | 375/200 |
| 4,468,793 | 8/1984 | Johnson et al. | 375/344 |
| 4,485,477 | 11/1984 | Nossen | 375/200 |
| 4,525,676 | 6/1985 | Atobe et al. | |
| 4,550,311 | 10/1985 | Galloway et al. | |
| 4,550,312 | 10/1985 | Galloway et al. | |
| 4,599,732 | 7/1986 | LeFever | 375/367 |
| 4,621,365 | 11/1986 | Chiu | |
| 4,636,583 | 1/1987 | Bidell et al. | 380/48 |
| 4,752,939 | 6/1988 | Amoroso et al. | |
| 4,780,892 | 10/1988 | Lagadec | |
| 4,847,860 | 7/1989 | Robert | 375/200 |
| 4,932,037 | 6/1990 | Simpson et al. | 375/200 |
| 4,941,051 | 7/1990 | Hicks | 348/245 |
| 4,977,577 | 12/1990 | Arthur et al. | 375/200 |
| 5,029,181 | 7/1991 | Endo et al. | 375/200 |
| 5,095,493 | 3/1992 | Arthur et al. | 375/200 |
| 5,101,416 | 3/1992 | Fenton et al. | 375/200 |
| 5,101,417 | 3/1992 | Richley et al. | 375/206 |
| 5,168,508 | 12/1992 | Iwasaki et al. | 375/200 |
| 5,185,761 | 2/1993 | Kawasaki | 375/200 |

(List continued on next page.)

OTHER PUBLICATIONS

JTR, Ltd., "Spread Spectrum Systems Tolerant Of Frequency Offset Errors," *Non–Patent Publication Survey*, pp. 1–14, (1995).

*Primary Examiner*—Young T. Tse
*Attorney, Agent, or Firm*—Oblon, Spivak, McClelland, Maier & Neustadt, P.C.

[57] ABSTRACT

A system and method for receiving direct sequence spread spectrum transmissions with both chip code and frequency uncertainty including a parallel frequency acquisition technique for increasing receiver sensitivity and increasing process gain while reducing a preamble duration required for spread spectrum acquisition. The system and method include techniques for reducing effects of jamming and impulse noise on receiver performance via enhanced antenna diversity by constructively combining received signals. Further, techniques are provided which compensate for chip code alignment drift, providing an associated transmitter maintains carrier and chip code coherence, by comparing received signal energies at varying chip code alignments. These techniques enable the use of lower cost frequency setting crystals in both the receiver and transmitter as well as provide for system operation over a wider temperature range.

66 Claims, 24 Drawing Sheets

U.S. PATENT DOCUMENTS

| | | | |
|---|---|---|---|
| 5,197,084 | 3/1993 | Fuhrman . | |
| 5,239,555 | 8/1993 | Konig . | |
| 5,267,244 | 11/1993 | Messerschmitt et al. . | |
| 5,285,472 | 2/1994 | Leonard et al. . | |
| 5,287,067 | 2/1994 | Denno et al. . | |
| 5,291,081 | 3/1994 | Takeuchi et al. | 327/47 |
| 5,291,517 | 3/1994 | Stein et al. | 375/206 |
| 5,293,399 | 3/1994 | Hefti . | |
| 5,309,484 | 5/1994 | McLane et al. | 375/354 |
| 5,343,495 | 8/1994 | Lovell et al. . | |
| 5,363,401 | 11/1994 | Lucas et al. . | |
| 5,365,550 | 11/1994 | Roberson . | |
| 5,365,551 | 11/1994 | Snograss et al. . | |
| 5,377,222 | 12/1994 | Sanderford, Jr. . | |
| 5,377,223 | 12/1994 | Schilling . | |
| 5,377,225 | 12/1994 | Davis . | |
| 5,418,778 | 5/1995 | Cummiskey et al. | 370/32.1 |
| 5,420,850 | 5/1995 | Umeda et al. | 370/18 |
| 5,422,912 | 6/1995 | Asser et al. . | |
| 5,425,061 | 6/1995 | Laczko, Sr. et al. . | |
| 5,426,665 | 6/1995 | Cleverly et al. | 375/200 |
| 5,436,935 | 7/1995 | Bernhard et al. | 375/367 |
| 5,440,595 | 8/1995 | Nagasaki . | |
| 5,450,453 | 9/1995 | Frank | 375/206 |
| 5,528,624 | 6/1996 | Kaku et al. | 375/206 |
| 5,563,537 | 10/1996 | Seta | 327/44 |
| 5,640,431 | 6/1997 | Bruckert et al. | 375/344 |

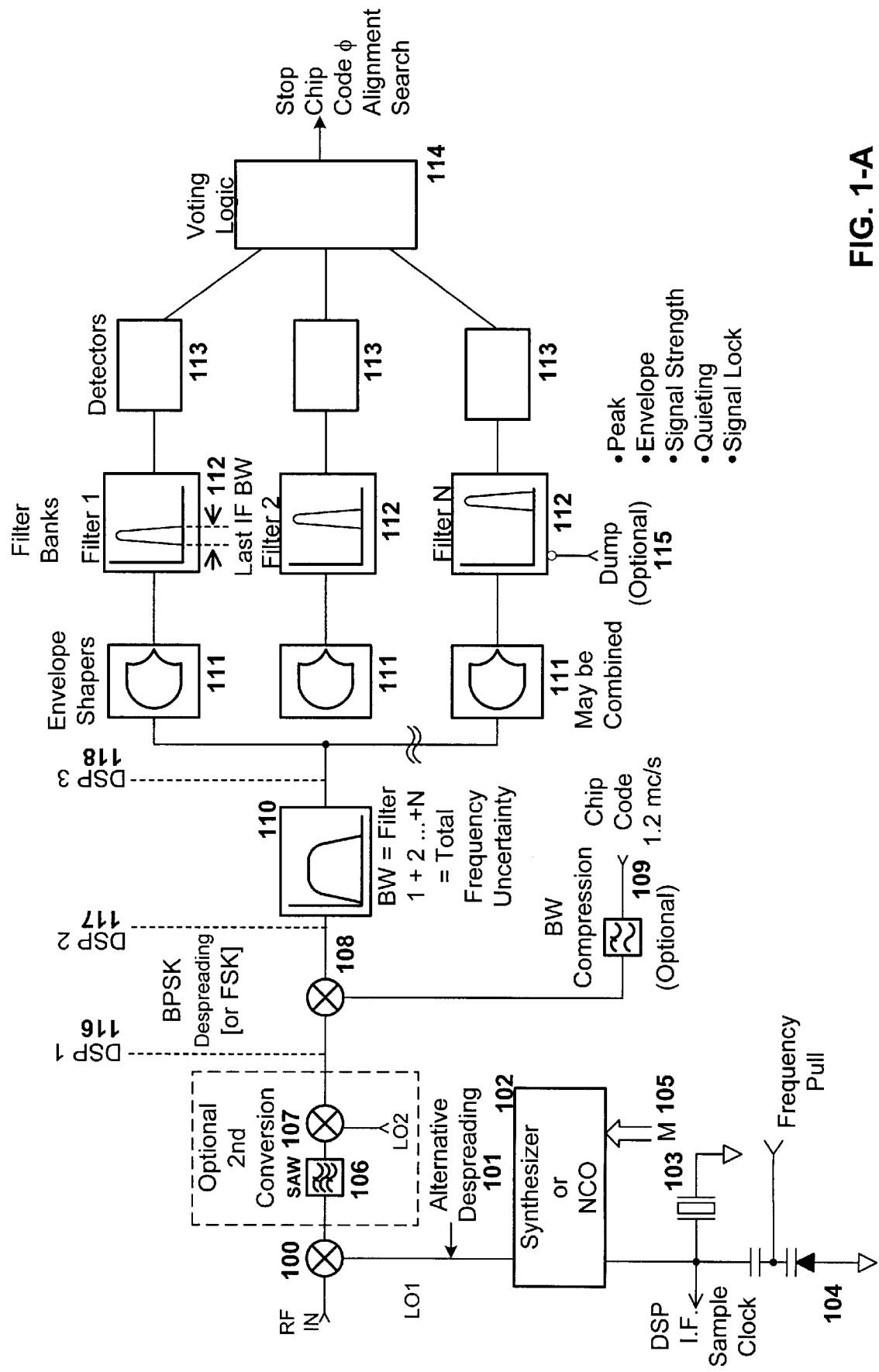
FIG. 1-A

Expanded I.F. BW to Allow for Frequency Uncertainty

Filter Banked Approach to Reduce Noise BW

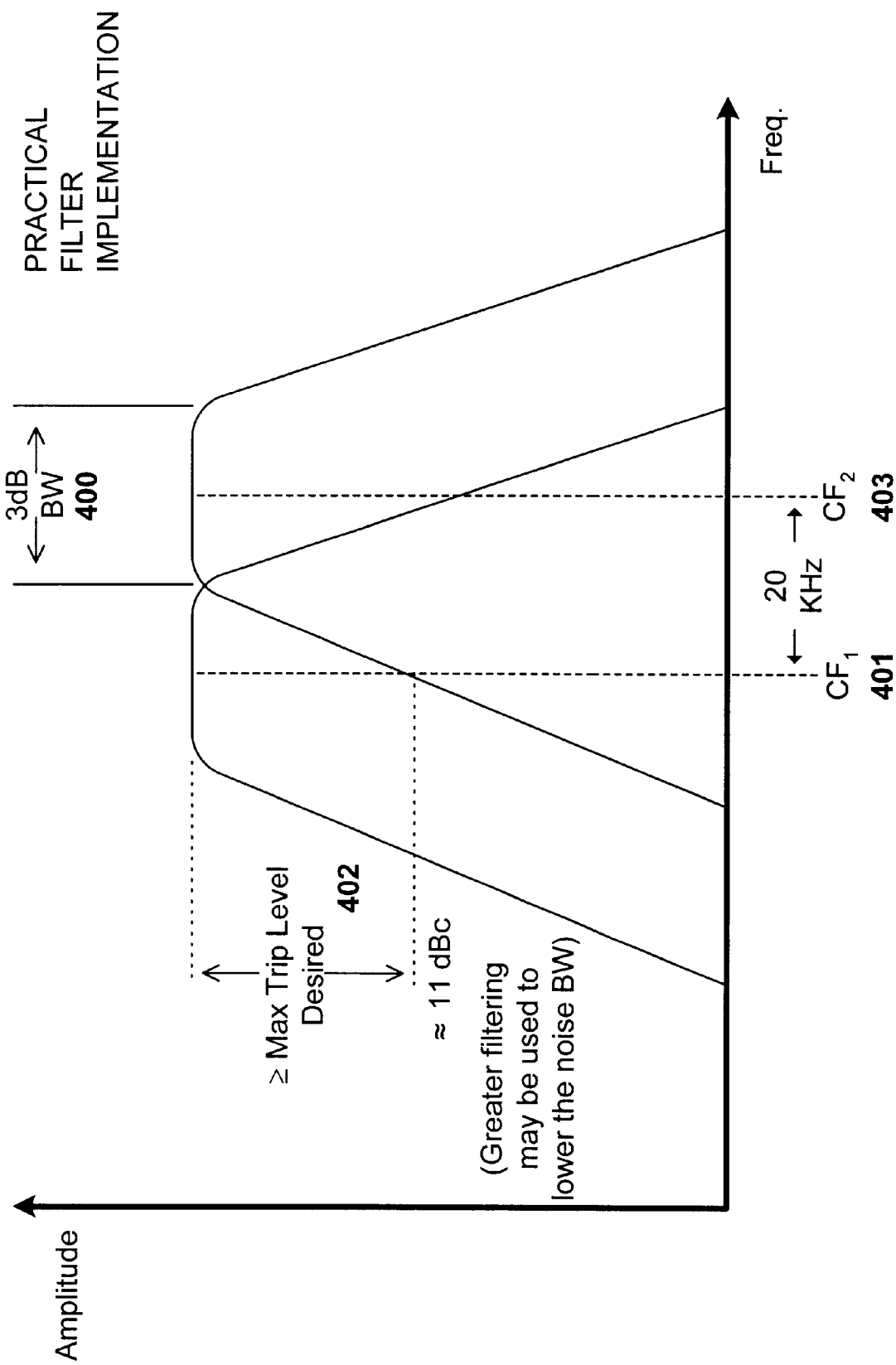

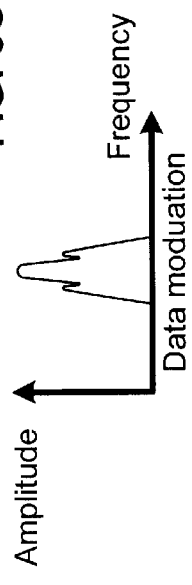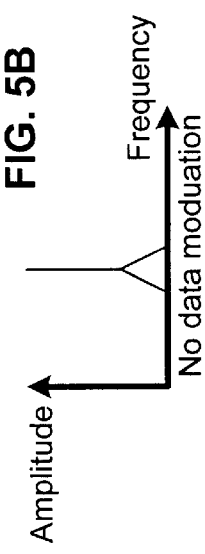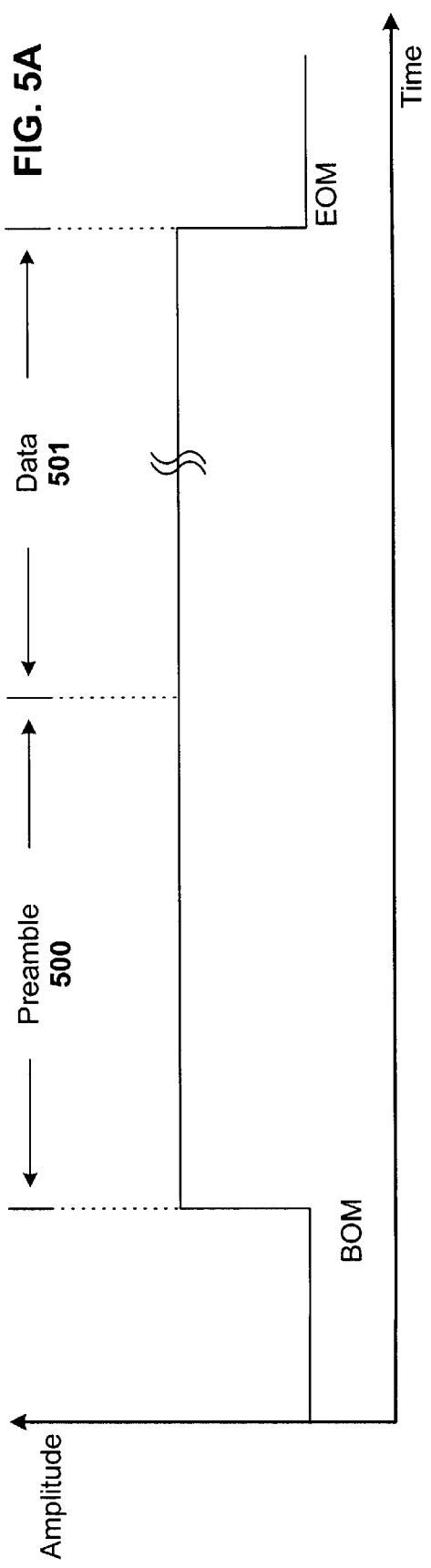

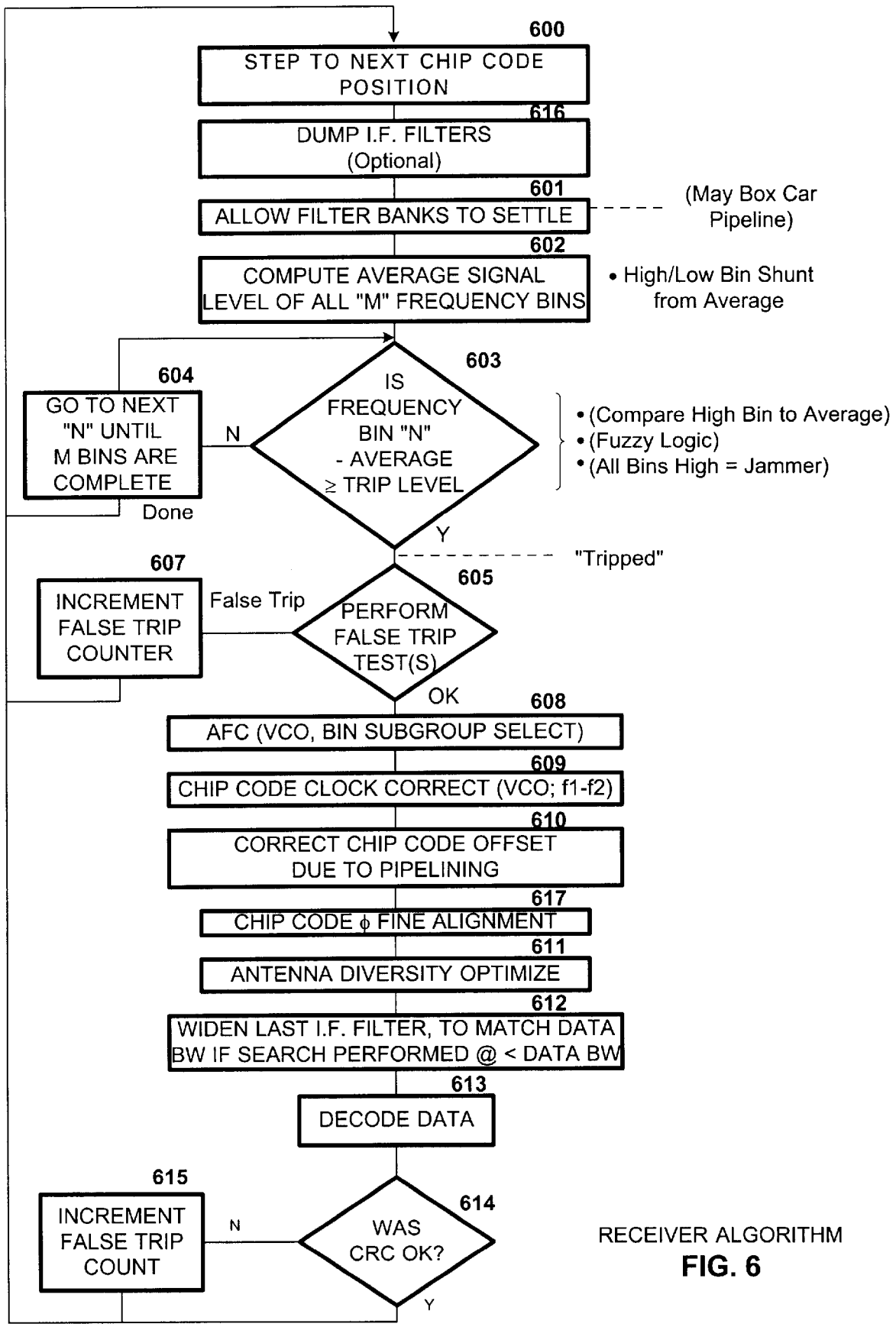

Frequency Bin Separation = Chip Rate ÷ Chip Code Length

Trip Algorithm Based Upon Current Frequency Bin Information
(3 Frequency Bin Example)

Trip Algorithm Based Upon Previous History, as well as Current Frequency
Bin Information (3 Frequency Bin Example)

LUMPED ELEMENT FILTER PLOTS

IN-BAND RISE TIME OF 20 KHz FILTER

RESONANCE TO OUT-OF-BAND SIGNAL 20 KHz FROM CENTER FREQUENCY

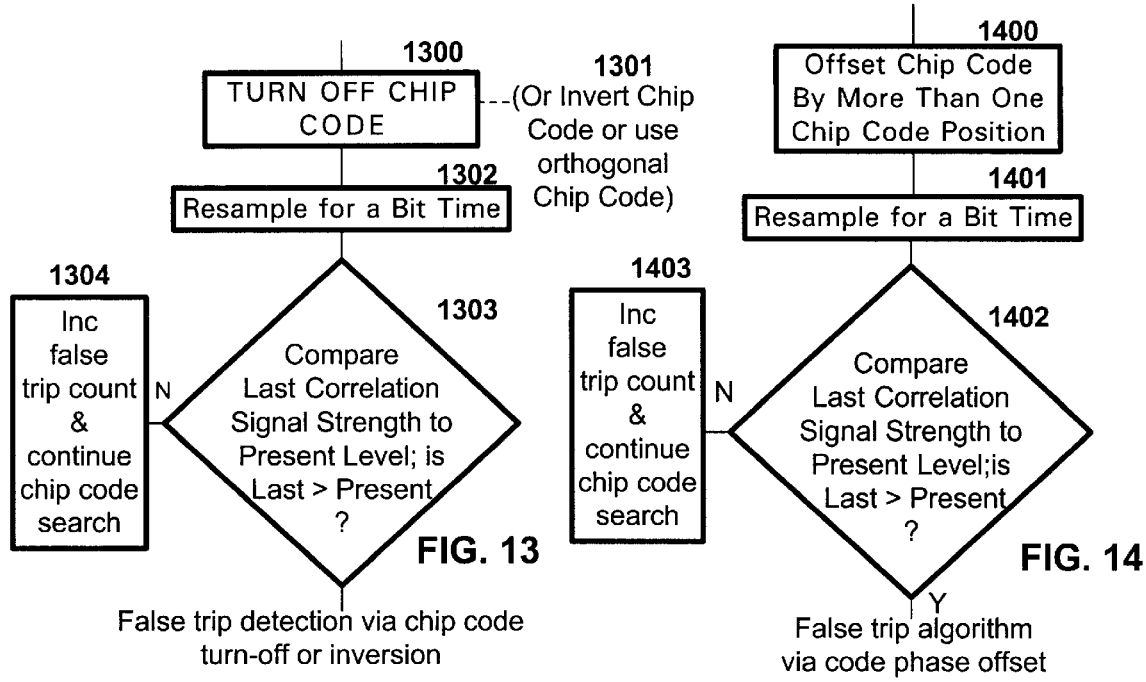
FIG. 13
False trip detection via chip code turn-off or inversion
FIG. 14
False trip algorithm via code phase offset
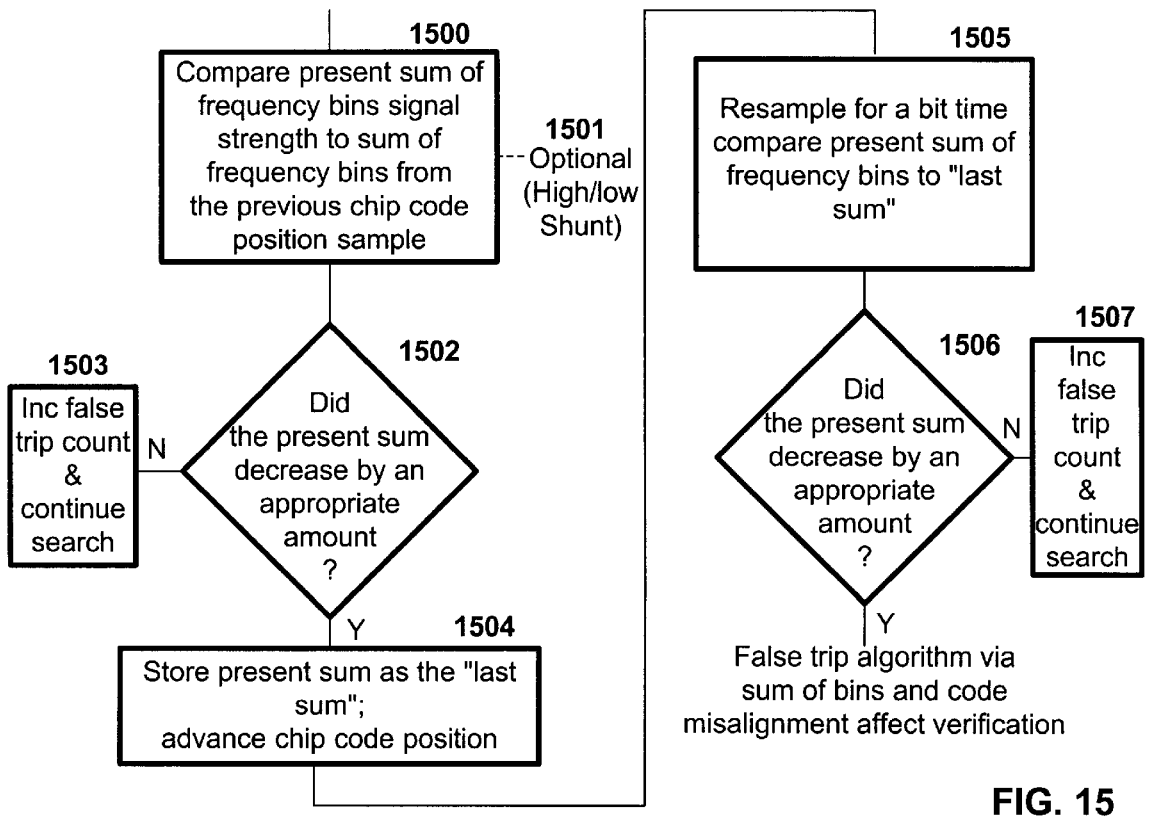
FIG. 15
False trip algorithm via sum of bins and code misalignment affect verification Resulting Hybrid FIR Coefficient
Set = Chip Code (A) X fc (B) X Low Pass (C)

3 Functions Combined into One Hybrid Coefficient Set

PHASE & FREQUENCY AMBIGUITY RESOLUTION BY USE OF ONE HYBRID COEFFICIENT TABLE FOR EACH PHASE / FREQUENCY COMBINATION

DIRECT SEQUENCE FREQUENCY AMBIGUITY RESOLVING RECEIVER

BACKGROUND OF INVENTION

State of the Art

To demodulate direct sequence spread spectrum transmissions, chip code phase ambiguities and carrier center frequency ambiguities must be resolved. The frequency ambiguities are caused by an imperfect match of transmitter frequency reference to that of the receiver. If the frequency uncertainty is sequentially searched and the chip code phase position is sequentially searched, then the total acquisition time is the product of the two search processes. This can lead to excessively long search times and inefficient transmitter preamble lengths. One method to overcome this added search time is to widen the receiver's Intermediate Frequency (IF) bandwidth to that of the data bandwidth plus the total system frequency uncertainty. This has the undesirable effect of raising the minimum detectable signal level as well as lowering the process gain achievable.

Conventional, non-spread spectrum, radio systems must contend with frequency imperfection between receiver and transmitter. As more expensive frequency references are utilized, the error term between the transmitter and receiver may be minimized over a greater and greater operating temperature range. Even so, any frequency error must be compensated at the receiver. One conventional means for compensating for frequency error is to widen the IF bandwidth to be somewhat greater than that of the bandwidth of the data being received. This technique of widening the IF bandwidth has the negative effect of reducing the signal to noise ratio available. As an alternative, the full signal-to-noise ratio may be recovered but at the penalty of added acquisition time. These techniques may use frequency lock loops with wide locking ranges or may scan over a range of frequencies equal to the total system frequency uncertainty.

In a direct sequence spread spectrum system, there is the frequency uncertainty inherent in a conventional radio system, as well as the time uncertainty of the chip code phase position between the transmitted signal and the receiver chip code reference. If the transmitter performs a frequency search, as well as a chip code alignment search, then the total search time is the product of the two processes. Alternatively, the direct sequence receiver may widen its last IF bandwidth to be greater than the data modulation being received. This again causes a reduction in achievable receiver sensitivity.

A further drawback in direct sequence serial acquisition receiving detectors is that there is little benefit to searching at a wide bandwidth and then, upon some initial Trip condition initiated by proper chip code alignment, further reducing the IF bandwidth in a second step. The difficulty in such a technique is that the effective signal to noise ratio must be adequate to provide the initial Trip. The effect is that many Trips will be lost when the system is operating at its minimum detectable signal level.

Further exacerbating the problems with direct sequence serial acquisition receiving detectors, is the fact that many direct sequence transmission systems operate in a packet mode. The packet mode operation is desirable for reducing the transmitter turn-on time and, therefore for increasing battery life, or to enhance the aloha collision performance between multiple unsynchronized transmitters, or as a tactic to increase the overall message traffic throughput. In any of these cases, it is desirable to utilize a preamble for spread spectrum acquisition which is as short as possible.

An alternative to serial correlation search techniques are various parallel correlation methods. These methods also suffer from frequency uncertainty between the transmitter's crystal reference and that of the receiver. Even with the added expense and complexity of parallel correlation methods, additional techniques must be utilized to compensate for frequency error, which are similar in nature as those employed by conventional non-spread spectrum radio systems.

Dixon's textbook on spread spectrum communications revision 3 teaches the use of carrier tracking in order to resolve the uncertainty between a transmitted signal and a receiver's frequency reference. Dixon further teaches the use of phase lock loops to track the frequency uncertainty. Dixon does not teach the use of parallel IF filter banks or the like. In U.S. Pat. No. 4,977,577, Arthur et al, direct sequence spread spectrum acquisition techniques are taught for serial correlation architectures. Arthur et al, teaches the use of a last IF filter bandwidth which is large enough to compensate for the frequency uncertainty between the transmitter's reference and the receiver's reference. Arthur et al, does not teach the use of parallel IF filter banks in order to enhance the sensitivity achieved by the receiver. Hillier (U.S. Pat. No. 4,864,588) teaches the use of parallel correlating devices to obtain synchronization of a received direct sequence spread spectrum modulated signal. Hillier transmits a special square-wave modulation in order to enhance signal acquisition time. Hillier does not teach the use of parallel filter banks in the receiver to enhance sensitivity of the receiver.

SUMMARY OF THE INVENTION

The present invention, generally speaking, relates to a parallel frequency acquisition technique for increasing receiver sensitivity and for increasing process gain while reducing the necessary preamble duration required for spread spectrum acquisition. In addition, the present invention relates to techniques for reducing the effects of jamming and impulse noise on the performance of the receiver as well as enhanced antenna diversity approaches. Further, the present invention relates to techniques which compensate for chip code alignment drift, providing an associated transmitter maintains carrier and chip code coherence. These techniques allow for the use of lower cost frequency setting crystals in both the receiver and transmitter as well as the operation of the system over a wider temperature range.

The present invention, in its preferred embodiment, employs parallel IF filters in order to resolve the frequency uncertainty inherent between the receiver and the transmitter. Techniques are taught which use both conventional analog filters as well as those implemented in digital signal processing devices. Voting techniques are then disclosed which are necessary to select the best frequency bank from which to later demodulate data. Although applicable to some parallel correlating architectures, specific techniques are taught to reduce the search time required in serial acquisition architectures. Techniques are further taught to reduce the last IF filter bandwidth to a bandwidth which is actually more narrow than the data modulation being received. This can be done when the preamble utilized for spread spectrum synchronization acquisition is not modulated by a data signal. This can allow the receiver to be more robust against false Trips due to jamming and impulse noise. In addition, since the last IF bandwidth is made to be nearly equal to that of the received data modulation, the full achievable processing gain is realized. This, in turn, leads to superior operation with minimal detectable signal levels.

Finally, the effects of frequency ambiguity upon SNR become greater at higher operating frequencies. For example:

TABLE 1

$$\frac{\text{Crystal Tolerance}}{70 \text{ parts per million (ppm)}} \times \frac{\text{Operating Frequency}}{915 \text{ MHz}} = \frac{\text{Frequency Ambiguity}}{+/- 64 \text{ KHz}}$$

Whereas:

$$\frac{\text{Crystal Tolerance}}{70 \text{ ppm}} \times \frac{\text{Operating Frequency}}{2.44 \text{ GHz}} = \frac{\text{Frequency Ambiguity}}{+/-171 \text{ KHz}}$$

If not otherwise compensated, this results in a loss of SNR equal to:

$$10 \text{ Log } \frac{64 \text{ KHz}}{171 \text{ KHz}} = -4.3 \text{ dB}$$

The instant invention eliminates this cause of SNR loss.

In one embodiment, the present invention may be understood to provide a direct sequence spread spectrum system using Binary Phase Shift Keying (BPSK) spreading modulation and amplitude shift keying (ASK) data modulation. In the alternative, Frequency Shift Keying (FSK) type spreading modulations may be used as well as phase or frequency shift data modulation forms. The data rate of the instant invention is 20 Kb/s. This data rate may readily be doubled or increased to higher data rates by using the techniques as taught herein. A typical transmitted message preamble time is 4 milliseconds. If higher data rates are utilized the time required for spread spectrum synchronization acquisition will also be reduced. The data portion of the message typically contains at least 48 bits but may alternatively transmit data for an indeterminant period of time. The system nominally operates at 915 MHz but is equally applicable to other frequencies such as 2.4 GHz.

The receiver may either be single, double or direct conversion. The despreading of the BPSK modulated signal may occur at one of several points. The chip code reference may be mixed with the first Local Oscillator (LO) and injected into the first mixer thereby providing both spectrum compression and/or despreading, as well as frequency down conversion. As an alternative, the same technique may be employed in an optional second mixer. Lastly, the chip code may be mixed in line with the receiver's IF in order to compress the spread bandwidth. Alternatively, this despreading function may be provided within a Digital Signal Processing chip via the use of a multiply instruction whose sign is altered as a function of the desired chip code pattern. A second alternative is the use of specially designed hybrid coefficient tables which combine both chip code characteristics with bandpass filter characteristics.

The despread signal can be preconditioned by a preselection filter. The purpose of this preselection filter is to reduce the minimum performance characteristics of the subsequent IF filter bank. The despread signal is next passed to a bank of two or more IF bandpass filters. The instant invention uses a group of five of these IF bandpass filters. These IF bandpass filters may be implemented as maximally flat delay Chebyshev stopband, Gaussian, Blinchikoff, ceramic, quartz, Finite Impulse Response (FIR) or Infinite Impulse Response (IIR) Digital Signal Processing (DSP) type devices. The center frequency of each of these IF filters is staggered by approximately the band width of the filter.

These IF filters refer to the last IF if the receiver has multiple conversion stages. The last IF filter is always the most narrow bandwidth filter. The most narrow bandwidth filter sets a noise bandwidth of the radio. The noise bandwidth is the greatest contributor to the sensitivity of the radio. As the noise bandwidth increases, the sensitivity of the receiver decreases. Narrow bandwidth is, therefore, desirable.

Each of these IF filters is then individually detected. The instant invention uses signal strength as a detection means, however, quieting or Phase Locked Loop (PLL) lock or the like are appropriate for this application. The outputs of the detectors are then made available to a bank of voting logic or are made available to a processor executing an appropriate algorithm. The purpose of the voting logic or the voting algorithm is to determine if any of the IF filter banks has obtained a signal likely to be representative of a desired transmitter. In addition, the voting circuit or voting algorithm can determine the filter bank which provides the signal characteristic indicating frequency offset between the transmitter and the receiver.

The receiver may then simply use the IF filter bank with the strongest resulting signal from which to decode data. Alternatively, the receiver may provide a frequency error output adjustment signal to a frequency synthesizer driving one of the LO's. The purpose of this signal is to steer the received signal to the center of the IF filter bank selected. Alternatively, a second or third bank of IF filters may be used which are designed with center frequencies offset by one third or one half of an IF filter's bandwidth. Selecting better centered IF filters reduces the signal loss caused by frequency offset. Lastly, a DSP approach may use a frequency offset multiplication factor prior to presenting the signal to the IF filter bank selected, thereby centering the received frequency in the IF filter bank selected.

The use of a DSP may further reduce frequency error offsets which may be suffered by the receiver. If a conventional discrete analog filter is used to implement the last IF, that filter will be subject to temperature offset drift. The displacement of the center frequency of this last IF filter adds to the required frequency error budget between the transmitter and receiver's crystal references. This drift is eliminated when a DSP device is used to implement the last IF filter since the "components" in a DSP are mathematical and cannot drift. In addition to this benefit, the DSP's clock reference may be made coherent with that of the synthesizer, or synthesizers, which drive the first and second LO's. In this manner, the DSP implemented IF filters will track the drift caused by the imperfect receiver crystal frequency reference.

Decimation is used in the DSP in order to minimize the number of computations required. The filter bank coefficients are run only at an interval equal to a bit time, or equal to one over the bandwidth of the last IF filter. In addition, a varistor or some temperature sensing element may be externally provided in order to monitor the temperature in which the receivers frequency setting element is operating. This information may be used by the processor or DSP algorithm in order to reduce the frequency ambiguity experienced by the receiver and therefore lower the number of frequency bins which must be searched. This has the desirable effect of reducing the computation time required to resolve the frequency uncertainty between the transmitter and the receiver's crystal references.

Practical filter implementations typically specify a 3 dB bandwidth, as well as some characteristic defining ultimate rejection. The instant invention uses an IF filter with a 3 dB bandwidth which is closely matched to the bandwidth of the transmitted data modulation. In the instant invention, this is 20 KHz. The ultimate rejection of the filter is defined by the desired noise bandwidth and the adjacent channel signal suppression desired. In order for the various Trip and voting algorithms to perform correctly, the channel-to-channel isolation must be equal to or greater than the maximum Trip Level which may be used during system operation.

There must be enough adjacent frequency bins/frequency channels in order to adequately cover a bandwidth equal to the total frequency ambiguity between the receiver and transmitter. The frequency ambiguity is set by as defined by the table below:

TABLE 2

Frequency Ambiguity Error Budget

Transmitter:

| | | | |
|---|---|---|---|
| Crystal absolute accuracy | 30 ppm | w/tune | 2 ppm |
| Crystal temperature drift | 20 ppm | | 20 ppm |
| Crystal aging (15 yr) | 10 ppm | | 10 ppm |
| | 60 ppm | | 32 ppm |

Receiver:

| | | |
|---|---|---|
| Crystal absolute accuracy (w/tune) | 1 ppm 20 ppm | 1 ppm — |
| Crystal temperature drift$^{(2)}$ | 10 ppm | 10 ppm |
| Crystal aging (15 yr) | — | — |
| Last IF filter drift$^{(1)}$ | 31 ppm | 11 ppm |
| | | 43 ppm |
| | 91 ppm | |

∴Total effect of frequency ambiguity on required last IF BW:

91 ppm × 915 MHz × 2 =      167 KHz        79 KHz

| | | |
|---|---|---|
| Note 1: | For last IF filter add: | |
| | Ceramic filter: | 30 to 40 ppm |
| | Crystal filter: | ≈0 |
| | DSP filter: | - - |
| | Lumped element filter: | 1 ppm |
| Note 2: | May be eliminated in a DSP architecture receiver that locks IF filter sample clock to synthesizer frequency reference. | |

The table indicates that a frequency uncertainty of approximately 80 KHz will exist and up to approximately 170 KHz. Further, if a ceramic type IF filter is used, the maximum uncertainty rises to 200 KHz. All of these drifts may be reduced by utilization of more expensive frequency reference sources, but it is an object of the instant invention to reduce or eliminate the cost of such references.

The invention may further take advantage of the fact that the preamble used for spread spectrum acquisition does not have to be modulated by data. This enables the use of a last IF filter with a bandwidth less than that of the data. This effectively provides an enhanced Signal-to-Noise Ratio during the period of time when the transmitted signal is being acquired. Depending on implementation, this reduced bandwidth may, however, result in an increased preamble time. This drawback may be overcome by pipelining and/or parallel processes which may be implemented in Digital Signal Processors or the like. If this approach is taken, then a Trip Level with a higher threshold may be employed. The higher Trip Level threshold is compensated by the increased available Signal to Noise Ratio made possible by reduced bandwidth during the acquisition time of the transmitted preamble. By increasing the threshold of the Trip level, the Trip and the false Trip algorithms may be made further resistant to noise and impulse jamming effects.

The acquisition algorithm may be accomplished by a microprocessor or a DSP or a gate array or any equivalent appropriate processor means. The algorithm must step through all of the available chip code positions in a particular chip code. The last IF filter banks must then be allowed to settle, or alternatively, pipelining of some form must be employed. Then one of several algorithms must be used to determine the frequency bin most likely to yield a valid message. Once this is accomplished, one or more false Trip tests may be applied in order to reduce the occurrences of a dwell, in a particular chip code position, which does not result in a valid message. It is important to reduce the occurrences of false Trips, since the data decode algorithm will typically not have the ability to detect bad data until a final (or intermediate, delayed) Cyclic Redundancy Code (CRC) check, or the like, is performed. This may result in the effective "blinding" of the receiver for 3 milliseconds to 20 milliseconds or longer while a transmitted data message is being decoded.

Next, an automatic frequency fine tuning process is invoked. This process may permit fine tuning and alter the frequency of a Voltage Controlled Oscillator (VCO) or Numerically Controlled Oscillator (NCO), or it may steer a frequency multiplier implemented within a Digital Signal Processing approach, or it may select an alternate subgroup of IF filters which are on offset centers of ½, ⅓ or ¼ the bandwidth of the last IF filter.

The chip code clock is then corrected for the offset due to frequency mismatch of the transmitter and receiver crystals. The chip code is next offset to compensate for the delays in pipelining caused by the receiver's algorithm. This alignment process may take place anywhere after the initial Trip algorithm, however, it must take place prior to sampling any further message data. Next, the antennas are optimized for anti-fading performance. If the IF filter had been reduced to lower than that used by the data modulation, then the IF filter must be increased to match the data bandwidth prior to data demodulation. The data is then decoded. In addition to this data decoding, forward error correction may be employed. The instant invention uses Amplitude Shift Keying (ASK) data modulation, however, frequency and phase modulations work equally as well. In addition, coherent data demodulation techniques may be employed. Lastly, a CRC or Forward Error Correction (FEC) function, is applied to the data in order to determine if the bits contained within yield a valid message.

The chip code correction factor is calculated as the difference from the receiver center frequency to that of the frequency bin in which the transmitted signal was found. A received signal may fortuitously fall directly in the center of a frequency bin. It may also, however, fall between two frequency bins. The shape factor of practical filter implementations will overlap adjacent channels, as a result, a ratio of the received signal energy can be found by observing more that one frequency bin. This ratio may be calculated by the use of interpolation techniques such as linear, quadratic, cubic, linear regression, etc. By calculating the relationship in two adjacent frequency bins, a more exact frequency position may be obtained. Such techniques can yield better than ±5 KHz accuracy in a 20 KHz frequency bin system.

Measurement accuracy with bin interpolation=±5 KHz $$\frac{\pm 5 \text{ KHz}}{915 \text{ MHz}} = 5.5 \text{ ppm resulting transmitter to receiver chip code accuracy}$$

⅛ Chip Drift (1.16 dB ultimate error) would occur in (⅛ * 1/1.2 Mc/S) / 5.5 ppm=19 ms after chip code synchronization This means that a 19 ms data message may be received without the requirement of any additional closed-loop locked tracking techniques. These techniques may, however, also be employed for message lengths in excess of 19 ms.

When a jamming signal is received, its signal energy will be distributed into the various frequency bins. In the case of a Continuous Wave (CW) jammer, the resulting spectral lines from the jammer will be separated by the receiver's reference chip code rate divided by the receiver's chip code length. In the instant invention, these spectral lines are separated by 20 KHz. It is desirable to make the bandwidth of a frequency bin equal to or less than that of the separation between spectral lines which result from a jamming signal. In either the presence of high background noise or of jamming, the receiver's Trip algorithm may compare the relative signal strengths of the frequency bins available, against the average background energy—when jamming occurs, the signal energy increases approximately equally in all frequency bins. The exception to this is the frequency bin in which carrier suppression occurs, which is the center frequency of the receiver. Once the desired signal increases by an amount equal to or greater than that of the Trip Level, then the receiver can be alerted in the likelihood that this chip phase position may yield a desired message.

Several Trip algorithms are disclosed. The highest signal strength frequency bin may be selected as a result of a conventional bubble type sort. It may also be determined through any other sequential magnitude determining type sort. In addition, it may be accomplished through parallel computation methods including through the use of fuzzy logic. It may also do calculation by first determining the lowest signal strength frequency bin (this may alternatively be done after the shunt of the lowest signal which may be artificially created by the carrier suppression of a jamming signal). This lowest signal strength factor may then be used to algebraically combine the signals which are higher than this level and which are in other frequency bins. If this sum is greater than or equal to a certain Trip Level then the particular chip code position may be further examined for the likelihood of a valid data message. This type of algorithm uses current frequency bin information to determine the likelihood of a correct Trip. In the alternative, the algorithm may use previous history. Such an algorithm would begin by determining the lowest signal strength frequency bin as before. This lowest signal strength frequency bin would be used to compute the present absolute signal strength whereby frequency bins with a signal strength greater than this lowest frequency bin are summed as part of this absolute figure. Next, if the sum of present signal strengths, when subtracted from the sum from previous signal strengths, exceeds a Trip Level, then the algorithm further examines the current chip code position for the likelihood of obtaining valid data.

The ultimate performance of the instant invention is limited by the achievable performance of the last IF filter. It is desirable to reduce the bandwidth of the filter as much as possible. As the skirts of the filter are reduced, however, the rise time of the filter is resultingly delayed. Delays in the rise time of the filter may slow down the overall acquisition time of the transmitted preamble if pipelining and parallel processing at the receiver are not employed. In addition, the cochannel rejection, from frequency bin to frequency bin, is important to allow an adequate dynamic signal range for the various Trip algorithms to function properly. Further, each chip code phase offset during the search algorithm, causes a resulting impulse effect upon the response of the filters which are adjacent to the desired receiver frequency.

Typically, a channel adjacent to a desired signal experiences overshoot. This overshoot has the undesired effect of reducing the dynamic signal range available in reference to adjacent channels for the receiver's Trip algorithm to operate upon. This overshoot in adjacent channels may be reduced by one of several means. One means is to employ envelope pre-shaping. This envelope shaping may be applied to each filter individually or it may be applied to all frequency bins simultaneously. If a great deal of impulse suppression is desired, then individual envelope shaping filters may be required. In the instant invention, however, only a small degree of envelope shaping serves to eliminate the overshoot phenomena in adjacent channels. Therefore, a single envelope shaping function may be applied prior to the last IF filters. As an alternative to the envelope shaping filters, the post filtered sign wave of adjacent channels may be subtracted from one another after the overshoot has occurred. As a further alternative, the trip algorithm may be made to operate adequately with adjacent channels which provide only 3.7 to 7.4 dB of signal difference. Lastly, more intelligent integraters may be used which avoid or mitigate the peak detection artifact caused by the overshoot phenomena. Further, filter topologies may be optimized to enhance the cochannel dynamic signal available (See Table 6).

Once an initial Trip occurs, it is desirable to perform one or more tests insuring that the Trip was not false. The various tests center around the fact that a properly coded received spread spectrum signal must be correlated with respect to the receiver's chip code reference. The receiver's chip code reference is purposely altered in various ways and the results are compared to verify that they are appropriate for a matching desired chip code signal. The first technique either selects an orthogonal chip sequence, or turns off the chip code reference, or inverts the chip code sequence in FSK Spreading Modulation Systems, in order to determine if there is a proportionate reduction in signal strength of the received signal. If the chip code reference is turned off, a jamming signal will increase, whereas a correctly coded signal will decrease. Alternatively, the chip code may be inverted, in this case there should be no effect on a jamming signal, whereas the correctly coded signal should decrease. As a further alternative, the receiver's chip code reference may be offset by one or more chips. This should have little effect on a jammer, whereas a correctly coded signal will decrease. Lastly, an algorithm can be used whereby the sum of all frequency bins of the current reading is compared to the sum of all frequency bins from a chip code position which is purposely offset to create a chip code phase error.

The Trip Level is used by the Trip algorithm to determine whether a signal is adequately high with respect to another signal to force the algorithm into further analyzing a particular chip code alignment position. It is desirable for this Trip Level to be as low as possible since this figure ultimately effects the Minimum Detectable Signal (MDS) strength level of the receiver. On the other hand, Trip Levels which are too low will be sensitive to background noise and to low level impulsive jammers. The instant invention discloses a technique for adaptive Trip threshold selection. An ongoing tally of false Trips is kept by the processors algorithm to determine an average false Trip occurrence. The system may be designed to handle a certain acceptable quantity of false Trips. This acceptable level of false Trips may be increased by lengthening the time in which the preamble leader is transmitted. A false Trip will thereby not waste so much time as to have the receiver's search algorithm run out of transmitted preamble prior to the completion of the preamble. This acceptable false trip quantity can be factored by the estimated total message density and signal environment anticipated for a particular system. These considerations will yield an acceptable false Trip average. If the system experiences a level of false Trips which exceeds this acceptable level then the Trip Level must be increased in order to reduce the number of false Trip occurrences. If the average false Trip occurrences are less than the preset acceptable amount, then the Trip Level may be decreased in order to increase the effective sensitivity of the receiver. Before effecting an actual increase or decrease in Trip Level, however, the algorithm performs a reasonableness test so that a Trip Level cannot become too low, nor can it become so high as to cause the unacceptable loss of MDS signals, which are lower than the Trip Level.

After an initial Trip, and after the verification that the Trip is not false, the receiver's algorithm seeks to fine tune the received frequency so that it is closely centered in a particular frequency bin. This may be accomplished through the previously discussed interpolation of signal strengths of two adjacent frequency bins. It may also be accomplished by a carrier tracking loop. It may be accomplished by selecting alternate frequency bins whose center frequency are offset by a portion of a frequency bin bandwidth or via an Automatic Frequency Control, AFC, tracking loop which may generate an error voltage to the Voltage Controlled Oscillator, VCO, or Numerically Controlled Oscillator, NCO. Such a technique would utilize the two frequency bins adjacent to the frequency bin chosen by the trip algorithm which is most likely to yield a valid reception. These two adjacent frequency bins are than summed into an operational amplifier (op amp), or the digital equivalent thereof. The op amp then provides an error term which steers the VCO back towards the center of the frequency bin of interest.

Another application of the above technique is to use that process for initial frequency ambiguity resolution. On a three frequency bin system, the center bin may be used to decode data or to sense initial Trip. The two adjacent bins can be used to create an error term which steers the LO's VCO during the preamble acquisition time. In order for this to work, the settling time of the bin filters and steering circuit must be adequately fast with respect to the jogging interval of the chip code phase position. If the response time is adequate, the VCO can re-center the signal before the center bin is used for Trip detect. In this manner, the VCO steering technique, in combination with the three adjacent filter bins, may resolve the frequency ambiguity between the transmitter and receiver's crystal references.

As an alternative to analog and lumped element filter approaches, Digital Signal Processing may be applied to the instant invention. A block diagram conducive to DSP approaches is taught. This diagram shows four alternative methods to despread the received signal. The first alternative is to despread in line with the receivers IF. The second alternative technique is despreading at the first LO. The despreading function in the instant invention is BPSK, although the despreading is applicable to FSK, MSK, QPSK, or the like, modulations as well. An equivalent option is to despread within the second LO. The third alternative is to use a parallel correlator which follows the A/D convertor and then feeds a DSP that resolves the frequency ambiguity. The fourth alternative is to actually despread in the DSP device itself.

The receiver may have one or two conversion stages, followed by some means for base-band conversion and anti-aliasing. Base-band conversion may be accomplished by a in-phase mixer or from an increased rate mixer which samples in quadrature or by use of I and Q channels or by sub-sampling/under sampling techniques. The anti-aliasing filter may be a maximally flat Chebyshev, or any filter capable of providing the desired roll-off characteristics. These characteristics include a 3 dB pass-band of 80 to 180 KHz with an ultimate rejection of 240 to 540 KHz. The ultimate rejection required may be anywhere from 40 to 90 dB depending on Automatic Gain Control (AGC) techniques used, previous filtering stages such as a Surface Acoustic Wave (SAW) filter and receiver performance desired. These bandwidths are appropriate for despreading alternatives which have occurred external to the DSP. In an application which provides for despreading within the DSP, the ultimate pass band rejection of the anti-aliasing filter must be approximately 1.5 to three times that of the chip code. For Nyquist purposes, a chip time is ½ that of the fastest waveform period. The instant invention uses a chipping rate of 1.2 mega chips per second. This chip code bandwidth is further compressed typically by a fifth order low pass filter to suppress out-of-band interference. A 0.8 compression of the chip code bandwidth $R_c$ yields a 1.60 dB loss in signal, whereas a compression equal to the chip width causes a 1.1 dB of signal loss. The anti-aliasing filter's pass band in such an application is, therefore, 2 to 4 MHz.

Next, the signal must be converted to a digital format. This may be accomplished through an appropriate speed A/D converter or a $\Sigma\Delta$ converter or via a hard limiter followed by a highly sampled 1 bit A/D converter. Typically, in order to avoid inefficiencies, the digital data received from the A/D converter is stored in a circular buffer. In this manner, the process of storage may simultaneously take place with the process of DSP filter calculation. The instant invention uses a two layer circular buffer, whereby the IF is sampled and stored over approximately one bit time in coincidence with the other half of the circular buffer being used to compute resultant filter signal strength magnitudes. In the instant invention, if the DSP uses an external mixer for chip code despreading, then the DSP's algorithm steps the receiver's chip code reference by ⅜ of a chip and then ⅝ of a chip code every search increment. (Per FIGS. 23 and 24)

The other half of the DSP's algorithm clears the accumulator to perform a dump function, which is optional. The algorithm then runs the first filter to determine the magnitude of the resulting signal strength. If a strong signal is received, it can overcome the dynamic range available in the A/D converter. In order to provide a wide dynamic range for desired signals, an AGC feedback loop is provided. Since a strong signal will splatter into all of the frequency bins, the first frequency bin is equally useful to make this evaluation. In addition, if the AGC has been previously set with a higher level value, this step may also serve to reduce the AGC correction factor thereby allowing the DSP algorithm to sense weaker signals. An A/D converter which provides enough bits to yield a resolution of 50 dB (approximately 8 bits), then an effective 90 dB of dynamic range may be developed with one or two AGC tracking steps.

The various filter banks are then run and the magnitude resultant is stored in an associated memory location. Once all of the filter banks have been run, the voting algorithm is invoked. If a Trip has not been detected, then the algorithm resets its data pointers to aim at the opposite half of the circular buffer in order to begin processing the next bit. Prior to processing the next bit, flags may be tested to ensure that the data will be valid (i.e. to insure that the computational half of the algorithms does not overrun the data collection portion of the algorithm). As an alternative to running multiple filters, it is viable to use a single Fast Fourier Transform (FFT) algorithm whereby the points output by the FFT are made to be equal to the frequency bin spacing and equal to the number of channels, as used by the adjacent frequency bin approach. Such FFT algorithms are well known in the art.

As an alternative to a sequential search of chip code phase positions, by mixing an external chip code reference with the received signal, a set of DSP coefficients can be created to merge the chip code despreading characteristics with the band-pass filter coefficients required by the frequency bins. As a part of the implementation of the system, a set of coefficients are computed and loaded into either ROM or RAM lookup tables. The hybrid coefficients are the product of the IF center frequency multiplied by the low pass function desired, to yield a 20 KHz bandpass filter, which are further multiplied by the desired chip code. This can be accomplished with approximately 150 taps for a 20 KHz bandwidth filter and a 3 Ms/s sample rate.

In order to make use of such combined coefficient tables, data must be sampled at approximately three times the chip rate and stored for one or two bit times within the DSP. The filter tables are later post-processed to determine which one matched the received signals. After the match is established, the chip code phase position must be re-aligned to compensate for the time used in computing the chip code phase and frequency match. These time delays can be made constant and can therefore be readily corrected. These time periods are constant for a particular set of computations since a DSP processor is typically a Reduced Instruction Set Computer (RISC) architecture.

If there are five frequency bins required to resolve the frequency ambiguity between a transmitted signal and received reference, then five different coefficient tables must be computed and stored within the DSP. The first alternative technique uses two bit times of IF samples. Each hybrid coefficient table is lined up with the first sample stored from the IF. The five tables are then multiplied and accumulated against the first data bit stored and the magnitudes compared by the voting Trip logic algorithm. If a Trip does not occur, the chip code must be shifted in order to search all 63 possible chip code positions. The hybrid filter tables in the first alternative approach are stored with only one chip code phase position. The table may be rotated by one chip code time in order to search the next chip code phase position. Alternatively, prior to the next set of filter compensations, the table pointer into the initial IF samples may be incremented by three positions (or about one chip time), therefore, effectively sliding the chip code position of the initial IF sample bits. Then the filter coefficients 1 through N are rerun to yield signal strength magnitude for each frequency bin. The Trip logic is once again invoked until the search is stopped, indicating presence of a likely desired signal.

As an alternative, coefficient tables may be created for each frequency bin as well as for each chip code phase position. If there are five frequency bins and 63 chip code positions this would yield a total of 315 individual tables. As a further alternative, the DSP can operate in two steps. Step one would multiply the initial IF sample times the chip code sequence at an initial phase position and leave the multiplied results in a temporary buffer. This temporary buffer may in turn be multiplied by each of the five filter bin coefficient tables which then in turn result in five frequency bin signal strength magnitudes.

Upon completion, the next chip code phase position may be multiplied times the initial IF sampled data and again left in the temporary buffer, until a Trip is detected. The above techniques allow for the chip code phase ambiguity to be resolved in parallel with the frequency ambiguity, by utilizing a DSP device.

It is desirable to search the chip code phase ambiguity in one chip time increments. In this manner the entire chip code sequence may be observed in 63 steps. Any fewer steps would miss potentially viable chip code phase positions. Any more steps will require additional preamble dwell time, unless additional pipelining and parallel computation techniques are utilized. It is also desirable to acquire a transmitted signal even though it operates at a low Carrier-to-Noise Ratio. These low Carrier-to-Noise Ratios have the effect of reducing the apparent size of the correlation function in relationship to the background noise floor. A one half chip error results in a signal reduction of only 6 dB from the peak of the correlation function. This is due to the relationship $$20 \text{ LOG } 63 - 20 \text{ LOG } 31.5 = 6 \text{ dB}$$

This means that if a Minimum Detectable Signal yields a Carrier-to Noise Ratio of approximately 6 dB, then the entire correlation function visible above the noise floor will equal only one chip time. Typically a strong signal condition correlation function equals two chip times. Therefore, a chip code search that increments the receivers chip code phase references in one chip time increments will result in no more than a 6 dB loss of signal strength as compared to the correlation peak. Further, if the bandwidth of the last IF is made excessively wide, the correlation peak flattens out somewhat and this signal difference becomes somewhat smaller. The above is true for signals received with high Signal-to-Noise Ratios.

In a Minimum Detectable Signal case, a chip code search spaced by one chip time offsets may completely miss a signal which only peaks 6 dB above the noise. This is not desirable since signals with 6 dB Carrier-to-Noise Ratio may be decodeable, depending on modulation form and demodulation method utilized. Further, the trip/voting algorithm benefits from the greatest possible initial signal. As an alternative, a receiver's chip code reference may be stepped in ½ chip time increments. This has the undesirable effect of doubling the amount of transmitted preamble time. It will have the desirable effect of yielding an average 3.5 dB of improvement when operating in the Minimum Detectable Signal case. This approach will yield no more than a ¼ chip error. The resulting loss in dB equals:

$$20 \text{ Log } 63 - 20 \text{ Log } (63 \times \tfrac{3}{4}) = -2.5 \text{ dB}$$

2.5 dB subtracted from the 6 dB carrier to-noise ratio at the Minimum Detectable Signal case yields an available Carrier-to-Noise ratio of 3.5 dB for which the Trip algorithm to operate. The Trip algorithm may successfully operate upon signals in the range of 3–5 dB.

As an alternative to half chip stepping, which causes a penalty in transmitted preamble time, the instant invention teaches a technique of signal averaging over two samples. The technique causes no additional transmitted preamble time as compared to one chip stepping. The technique initially steps by ⅜ of a chip, dwells for ½ of a bit time then steps ⅝ of a chip and dwells for ½ of a bit time. Prior to the next bit's sample, the chip code is again offset by an additional ⅜ of a chip. Therefore, the total offset is one full chip between bit integrate times. The energy received is also integrated over a full bit time. The above results in a 2.41 dB improvement over conventional full chip steps. In order to prevent expansion of the bandwidth of the chip code reference signal, the ⅜–⅝ chip steps must be specially placed. Stepping may be accomplished by either reducing the duration of a portion of a chip code or by increasing the duration of a chip code by a portion of a chip time. Increasing the duration of a chip code will have no negative effect on the chip code reference signal bandwidth. Reducing the chip duration will have the effect of slightly increasing the chip code reference bandwidth, if the reduction is made on a chip whose 1/0/1 or 0/1/0 transition duration is a single chip time. In this case, the chip code reduction can be made in the chip preceding or following the exact ⅜–⅝ chip position. This will cause a very small degradation in correlation match.

This technique works within one dB of the half chip stepping technique which functions at the penalty of a double sized transmitted preamble. Still, the 2.41 dB peak is 3.59 dB below the maximum correlation peak. Once an initial Trip is made, a fine chip code search or a chip code clock realignment may serve to reduce the chip code error to between ⅛ of a chip and zero offset. This means that any signal to noise enhancement technique which is viable during the preamble time may reduce the effect of initial chip code alignment imperfection in obtaining the first Trip.

One technique is to reduce the filter bandwidth below that of the data thereby increasing the effective Signal to Noise Ratio (SNR) and using this SNR to overcome the loss created by the chip code phase alignment error. If there will be a ⅛ of a chip offset error after fine chip code alignment, this will result in 1.16 dB of loss during the data demodulation time. As a result, it may not be necessary to improve the initial 3.59 dB of loss to better than the 1.16 dB resulting from a ⅛ chip offset drift error (per Table 2). As a further alternative, the receiver's Trip algorithm can function at levels which are purposely lower than the Carrier-to-Noise Ratio required to yield a particular Bit Error Rate desired. If a Trip Level of 3 to 5 dB is utilized, this results in a 2 to 4 dB advantage over the data decode portion of the algorithm, which assumes the minimal requirement of 7 dB Carrier-to-Noise Ratio. This 2 to 4 dB advantage directly reduces the effect of the 3.59 dB loss from the initial chip code phase offset error. Therefore, when computing the implementation losses of the system, 1.16 dB is used, unless otherwise noted, to indicate the ⅛ chip offset error which will result from a fine search that occurs after the initial Trip.

The following table provides system performance parameters:

TABLE 3

System Performance with DSP Post-Processing Approaches

| Implementation Losses | MAC's | Process |
|---|---|---|
| −1.1 dB | — | Chip code BW compression (.8 Rc = 1.6 dB) |
|  |  | (1.0Rc = 1.1 dB) |
|  |  | (1.2Rc = .75 dB) |
| +2.22 dB[1] | 200 | Taps, 15 KHz BW, (20 Kb/s)1 Bit = 50 μs (sample @ 1/BW), 3 Ms/s |
| −1.59 dB[4] | 63 | Chips (w/5/8 chip steps) |
| — | 2 | Antenna Banks (diversity) |
| — | 6 | Filter banks = 90 KHz frequency ambiguity tolerance |
| −1.1 dB | 151.2 K | × 25 ns/MAC[7] = 3.78 ms preamble required |
| −1.1 dB | — | Chip code BW compression |
| +1.0 dB | 150 | Taps, 20 KHz BW, (20 Kb/s)1 Bit = 50 μs (sample @ 1/BW), 3 Ms/s |
| −1.59 dB[4] | 63 | Chips (w/5/8 Chip Steps) |
| — | 2 | Antenna Banks (Diversity) |
| — | 4 | Filter Banks = 80 KHz frequency ambiguity tolerance |
| −2.26 d8 | 75.6 K | × 50 ns/MAC = 3.78 ms preamble required |
| −1.1 dB | — | Chip code BW compression |
| −.79 dB | 100 | Taps, 30 KHz BW, (20 Kb/s)1 Bit = 50 μs (sample @ 1/BW), 3 Ms/s |
| −1.59 dB[4] | 63 | Chips (w/5/8 Chip Steps) |
| — | 2 | Antenna Banks (Diversity) |
| — | 6 | Filter Banks = 180 KHz frequency ambiguity tolerance |
| −3.48 dB | 75.6 K | × 50 ns/MAC = 3.78 ms preamble required[1] |
| −1.1 dB | — | Chip code BW compression |
| −2.0 dB[3] | 75 | Taps, 40 KHz BW, (* 40 Kb/s)1 Bit = 25 μs, 3 Ms/s |
| −1.59 dB[4] | 63 | Chips (w/5/8 Chip Steps) |
| — | 2 | Antenna Banks (Diversity) |
| — | 4 | Filter Banks = 160 KHz frequency ambiguity tolerance |
| −4.69 dB | 37.8 K | × 50 ns/MAC = 1.89 ms preamble required |
| −3.44 dB[3] | 50.4 K | × 50 ns/MAC = 2.52 ms preamble required |

For a 20 Kb/s ASK Data System
−174 + NF + CNR + 10 Log 25 KHz[6]
−174 + 5 + 7 + 44 =
−118 dBm (less all implementation losses)[5]

Note 1: This reduces implementation loss of chip code misalignment (The fine search must, however, yield 0 dB error to yield a result better than 1.16 when combined with the chip phase error.)

Note 2: This will also reduce the required preamble time to (1/30 KHz · 63 + 10 false trips) = 2.6 ms; if a faster MAC DSP is used.

Note 3: Alternative: Reduce BW during search, if a 100 tap filter is used with a 27 KHz BW then the 1.25 dB improvement may be used to reduce the 1.59 dB implementation loss resulting from imperfect code alignment (0 chip code phase error must be achieved by fine chip alignment search.)

TABLE 3-continued

System Performance with DSP Post-Processing Approaches

Note 4: (CNR @ MDS - typical Trip Level) - Chip phase offset loss = implementation loss due to coarse search chip code misalignment @ MDS
7 dB − 5 dB − 3.59 dB = −1.59 dB (must be ≧ 1/8 chip fine search error = 1.16 dB, unless fine chip code search yields zero phase error
Note 5: See also the following data modulation & FEC Tables
Note 6: 20 Kb/s BW compensated for 1.25 Hz per bit per second - per following Table 4
Note 7: A MAC is a multiply accumulate DSP instruction

TABLE 4

Effects of Data Modulation on Noise Bandwidth

| | (From Dixon) | Effect of Noise BW on CNR (Vs 1 Hz per bit) |
|---|---|---|
| ASK (OOK) | 1.25 Hz per bit | 1 dB penalty |
| FSK | 1.25 | 1 dB penalty |
| BPSK | 1.25 | 1 dB penalty |
| QPSK | .53 | 2.8 dB advantage |
| MSK | .53 | 2.8 dB advantage |

TABLE 5

CNR For Corrected Bit Error Rate ≦ 1 per Message: 48 Bits = $2.1 \times 10^{-2}$

| | # of Bits Corrected by FEC | | | |
|---|---|---|---|---|
| Modulation Type | -- None -- 1 Lost Msg in 10 ($2.1 \times 10^{3-}$) | -- One -- ($2.1 \times 10^{-2}$) | -- Two -- ($4.2 \times 10^{-2}$) | -- Three -- ($6.3 \times 10^{-2}$) |
| ASK (OOK) | 12 dB | 9 dB | 8 dB | 7 dB |
| ASK w/Coherent Demodulation | 9 | 6 | 5 | 4 |
| FSK | 9 | 6 | 5 | 4 |
| MSK | 6 | 3 | 2 | 1 |
| PSK | 6 dB | 3 dB | 2 dB | 1 dB |

(BER derived from curves in Dixon)
For example, correction codes include corrected CRC and Golay codes Lastly, the use of Digital Signal Processing techniques can provide enhancement to antenna diversity approaches. The DSP algorithm may measure the base-band phase of a received signal. This phase is coherent with the higher frequency signals which start at the antenna port. Therefore the DSP may measure the phase of antenna A and of antenna B. Antenna diversity techniques may be optimized utilizing this information. In systems which switch antennas every half bit time suffer from phase cancellations which occur in the last IF filter of the receiver. This causes a characteristic dip midway through a received bit. It has the advantage, however, of enhancing the performance of the receiver in the presence of fades. At 900 MHz a signal transmitted and received in a building at a 1.2 MHz chip rate can have a 21 to 24 dB variation in received signal strength due to fading. When the antennas are 50/50 shared every bit time, even if one antenna is completely faded the other antenna may be in a peak. Since only half of the signal is missing due to the fade then the resultant will be 6 dB off of the signal received by the strong antenna. In a strong fade of 24 dB this still provides an 18 dB advantage during the acquisition of a transmitted preamble, which is very desirable. Additional losses however result from the phase cancellation which occurs due to the delay spread of the last IF filter. The DSP approach can adjust the phase position of the received signal to match that of the preceding antenna so that this characteristic dip, due to phase cancellation, does not occur.

As a second alternative a controllable phase delaying element may be placed in series with the antenna at the receiver's front-end. Once the DSP determines the phase of both antenna A and antenna B, one of the antennas may be phase adjusted in order to force constructive interference. The DSP algorithm would then enable both antennas to sum simultaneously, and yield a superior result.

In the DSP system which stores either 2 or 4 bit times prior to post processing, antenna diversity may be achieved by switching antennas on alternate bits. Antenna diversity may be enhanced by taking a 2 bit sample of antenna A and then a 2 bit sample of antenna B—the DSP may post process and select an optimal antenna. This would eliminate the phase cancellation problem within the center of a bit time and would reduce the spreading artifacts which occur at the front-end of the receiver. Once acquisition is achieved, the optimal antenna is selected as a second step. Diversity with more branches could be accomplished by making each of the times sampled be from a separately enabled antenna. This would be particularly useful in 2.4 GHz applications which experience severe fading.

The techniques disclosed herein are equally applicable to voice communications, whereby the data portion of the message is representative of digitized speech. This can be accomplished by any of the techniques as are know in the art. Alternatively, the voice can be directly modulated onto the carrier by phase, frequency or amplitude techniques.

Code Division Multiple Access (CDMA) techniques are typically limited to the number of orthogonal codes available in a certain chip code length. A rough rule of thumb is that there are approximately 1/10 the number of orthogonal codes as there are chips in a sequence. The equivalent of orthogonal codes may be created in the application of the instant invention at the expense of an increased occupied bandwidth. The bandwidth penalty is equal to the frequency uncertainty between the receiver and the transmitter. This CDMA channel increasing technique, in essence, offsets the transmitted frequency by a frequency equal to or greater than that of the frequency uncertainty between the transmitter and receiver. The effect at the receiver is that a transmitter frequency offset will, once despread, fall outside of the filter bins which are tuned to the frequencies of interest. Under the proper circumstances, the receiver, will suppress a transmission from a transmitter which has been so offset in frequency, by an amount approximately equal to the receiver's process gain. Multiple filter banks can then be utilized to identify the added, frequency offset, CDMA transmissions. Alternatively, the receiver may slew a synthesizer or LO to identify the frequency offset transmission.

The instant invention also provides improvements to the Bit Error Rate versus carrier-to-noise ratio performance. This improvement is a result of the high degree of synchronization in which the data bits are sampled. Typically, a sample clock is developed via one of various means from the received data. The received data provides the classic eye pattern. The transitions and/or shape of the eye pattern are used to create a bit sample reference. The bit sample time is used to establish the bit decision. In highly noisy environments, or in the Minimum Detectable Signal case, the background noise effects both the transitions of the data as well as the data itself. Therefore, noise has a somewhat squaring effect on the loss of Bit Error Rate in noisy environments. Not only does the data itself increase in noise, but the reference position in which data should be sampled is degraded as well. Several techniques are known in the art to track and optimize the data sample position. These include integrating the eye pattern transitions over a longer period of time. Some clock sampling schemes use only an initial transition reference to prevent tracking the clock sample position into a less advantageous portion of the eye pattern. The instant invention achieves chip code correlation to approximately 100 nanoseconds to 200 nanoseconds of accuracy. A bit time is fifty microseconds. The instant invention uses a high degree of chip code synchronization to clock the data bit decision. The transmitters related to the instant invention transmit a data bit in synchronization with the chip code pattern, therefore allowing chip position to be used as a cue to the associated data bit position. Since the instant invention inherently knows the optimal position in which to sample a data bit, that portion of the Bit Error Rate loss is eliminated. Empirical results from this technique have shown practical improvements in the error rate versus Carrier-to-Noise Ratio in the minimal detectable signal case of approximately 2–4 dB when demodulating ASK (OOK) data. This technique is equally applicable to any direct sequence spread spectrum system in which a high degree of synchronization is inherently achieved, provided that the data is transmitted in synchronization with the chip code clock. Further, no exotic, or noise error prone, tracking means are required since the chip code synchronization is continually available with a guaranteed accuracy of +/−½ of a chip time. This amounts to an approximately 1 microsecond of sampling uncertainty over a 50 microsecond bit duration. This 2% error is an absolute maximum number and contributes an insignificant effect on Bit Error Rate.

BRIEF DESCRIPTION OF THE DRAWINGS

A more complete appreciation of the invention and many attendant advantages thereof will be readily obtained as the same becomes better understood by reference to the following detail description when considered in connection with the accompanying drawings, wherein:

FIG. 1A is a block diagram of a direct sequence spread spectrum receiver of the present invention.

FIG. 4 is a graph illustrating the filter characteristic of one embodiment of the individual filter of FIG. 3.

FIGS. 5A, 5B and 5C are illustration of a packet data message of the present invention also show how the implementation of the IF filter can be modified during the message preamble to improve receiver sensitivity.

FIG. 6 is a flow diagram that depicts the receiver algorithm of the present invention.

FIG. 13 is a flow diagram showing a false trip detection algorithm that uses chip code turn-off or inversion.

FIG. 14 is a flow diagram showing a false trip detection algorithm that uses chip code phase offset.

FIG. 15 is a flow diagram showing a false trip detection algorithm that uses chip code phase offset as well as information from the filter bins.

DETAILED DESCRIPTION OF THE PREFERRED EMBODIMENTS

Figure 1B:
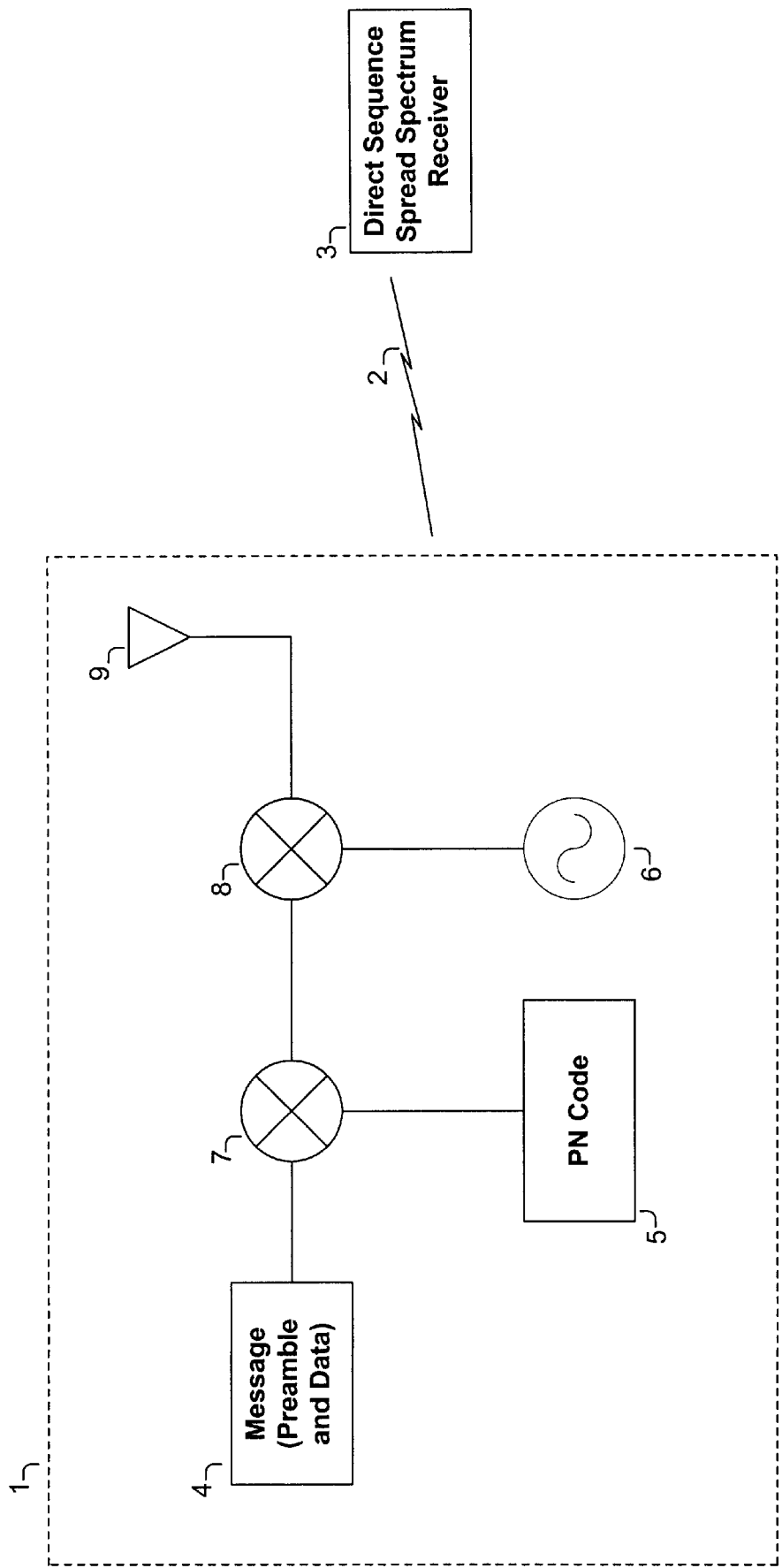
FIG. 1B is a block diagram of a direct sequence spread spectrum communication system with a transmitter and receiver according to the present invention.

FIG. 1A—Direct Sequence, Frequency Ambiguity Resolving Receiver

FIG. 1A is the block diagram of a direct sequence, frequency ambiguity resolving receiver 1. Mixer 100 down converts the RF input from the receiver's front-end. The LO is created by a synthesizer or numerically controlled oscillator 102. Crystal 103 creates the frequency reference for the receiver. Varactor 104 is used for frequency pulling of the crystal reference 103. Additionally, the synthesizer frequency may be selected by altering the divide ratio M 105. An optional second conversion for the receiver may be devised with the combination of a SAW 106 or equivalent bandpass filter in combination with a mixer 107 driven by a second LO. Despreading of the BPSK system may be accomplished by mixer 108. As an alternate to BPSK, FSK despreading may be used in an FSK modulated system. As a further alternative, despreading may be accomplished by parallel correlation means such as 1816 (see FIG. 18). As an alternative to despreading in mixer 108, the received signal may be despread 101 by injecting the despreading signal in series with the LO port of mixer 100. This injection port for a BPSK system must be performed by a double-balanced mixer or the equivalent. As a further alternative, the despreading may be accomplished by similar injection into LO port 2 of mixer 107. In any of these cases, bandwidth compression may be applied to the chip code's signal in order to tame the roll off of the side lobes resulting from the $$\frac{\sin X}{X}$$

function. This bandwidth compression may be accomplished by the low pass filter 109 or the like. In the instant invention, a fifth order flat group delay filter is utilized. Next, an initial bandpass filter 110 is used to suppress signals outside of the bandwidth required to compensate for the total frequency uncertainty of the system. The bandwidth of this filter is equal to the sum of the last IF filter banks' bandwidths. Next follows one or more envelope shapers 111. These envelope shapers may be combined as one single block which then feeds the later filter banks 112. The envelope shapers serve to reduce the impulse artifacts which are outside of the bandwidths of the IF filter of interest. Next, the filter banks 112 set the ultimate noise bandwidth and signal pass band of the system, the bandwidth of the last IF filter is set to approximately that of the received data modulation. As an alternative the bandwidth of this filter may be reduced to lower than that of the data during the time in which the transmitted preamble is being searched. The sum of the last IF filters' bandwidths must equal the total frequency ambiguity resulting from the transmitter and receiver's frequency references. Next, the filtered signals are passed to detectors 113. These detectors may be fashioned as envelope detectors or as peak detectors or as signal strength outputs into a processor's algorithm, or quieting outputs or signal lock outputs from a PLL. The outputs of detectors 113 precede the voting logic block 114. The purpose of the voting logic block is to stop the chip code phase alignment search in a phase position likely to yield a desired transmitted message.

DSP approaches may be used to implement a good portion of the block diagram illustrated in FIG. 1A. The DSP first alternative implementation would begin at 116, whereby the mixer 108 would be present inside of the DSP. A mixer 108 may be accomplished with a single multiply instruction contained within the DSP's instruction set. If the despreading is to be accomplished inside of the DSP, then the sampling rate of the A/D converter external to the DSP must be somewhat higher. If a chip code of 1.2 megachips is used then the Nyquist requirement and practical anti-aliasing filter limitations will force an approximately three to one oversampling. In addition, if In Phase and Quadrature (I&Q) channels are not utilized, then a further two to one increase in sampling rate is also required. If the bandwidth compression from filter 109 reduces the chip code below the 1.2 MHz of base band bandwidth, then a slightly lower sampling rate may be utilized. For example, if a compression factor of 0.8 $R_c$ is used, then the resulting bandwidth is 1 MHz. This would then yield an approximately 3 MHz external sampling rate. If, however, a unity bandwidth compression is used in filter 109 and if a single A/D converter is used, then the sampling speed will be approximately 3.6 to 7 million samples per second. This performance is readily achievable with 8 and 10 bit converters and with some 14 bit converters. The number of bits of resolution in the A/D may be overcome by utilization of the techniques which are described herein.

The next possible DSP implementation point is at 117. It may be desirable, however, to place the DSP's input at 118. This requires that the filter 110 also serves the function of an anti-aliasing filter. The performance of that filter is described later in FIG. 18. The sample rate of the A/D converter would fall to 240 to 540 KHz (×2 if a single A/D is used).

The filter banks 112 may additionally be dumped via input 115. Dumping would occur after the voting logic 114 made a decision and prior to the integration of the next chip phase alignment. This dumping function allows the reduction of undesired filter energy from the previous chip code position. This dumping function may not be required depending on what filter 112 topology is chosen.

Dumping circuit 115 allows the residual energy from previous chip code position samples to be removed from the filter prior to integrating the next chip position.

FIG. 1B—DSSP System, including Transmitter and Receiver

FIG. 1B illustrates a direct sequence spread spectrum system according to the present invention, including the receiver 1 above-described in relation to FIG. 1A and a transmitter 2. As previously indicated, the transmitter 2 transmits a modulated message 10 and for that purpose may, for example, employ BPSK spreading modulation and amplitude shift keying (OOK) data modulation, or FSK, MSK, QPSK, or the like, spreading modulation as well as phase or frequency shift data modulation. Transmitter 2 includes a message generator 4 as well as a PN code generator 5 and a carrier frequency generator 6. The PN code and carrier frequency are combined with the data message by mixers 7 and 8. The spread spectrum message 10 is then transmitted by antenna 9 to the receiver 1.

Figure 2:
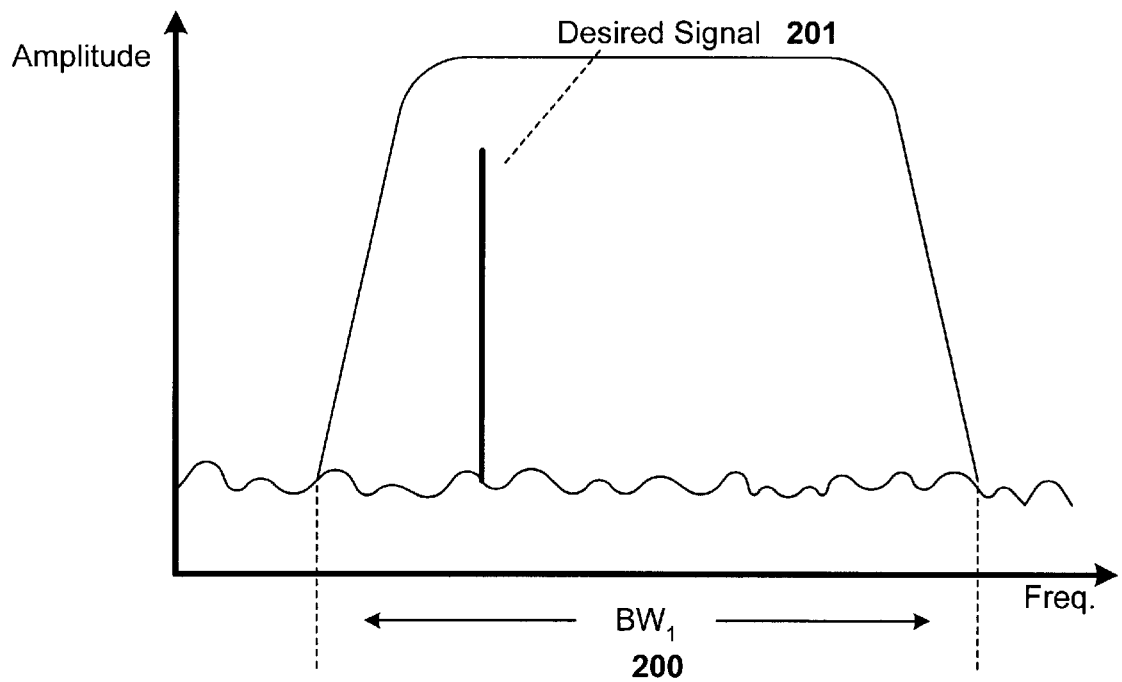
FIG. 2 is a graph illustrative of a single IF filter wide enough to allow for the frequency uncertainty of a received signal.

FIG. 2—Expanded IF Bandwidth to Allow for Frequency Uncertainty

The diagram in FIG. 2 indicates an expanded IF 200 to allow for the frequency ambiguities caused by the uncertainty in frequency references between the transmitter and receiver. The effect of this widened bandwidth is an increase in the noise power introduced with the signal. The effect is to lower the achievable signal-to-noise ratio. The desired signal 201 is shown offset in frequency as a result of the frequency offset between the transmitter and receiver.

Figure 3:
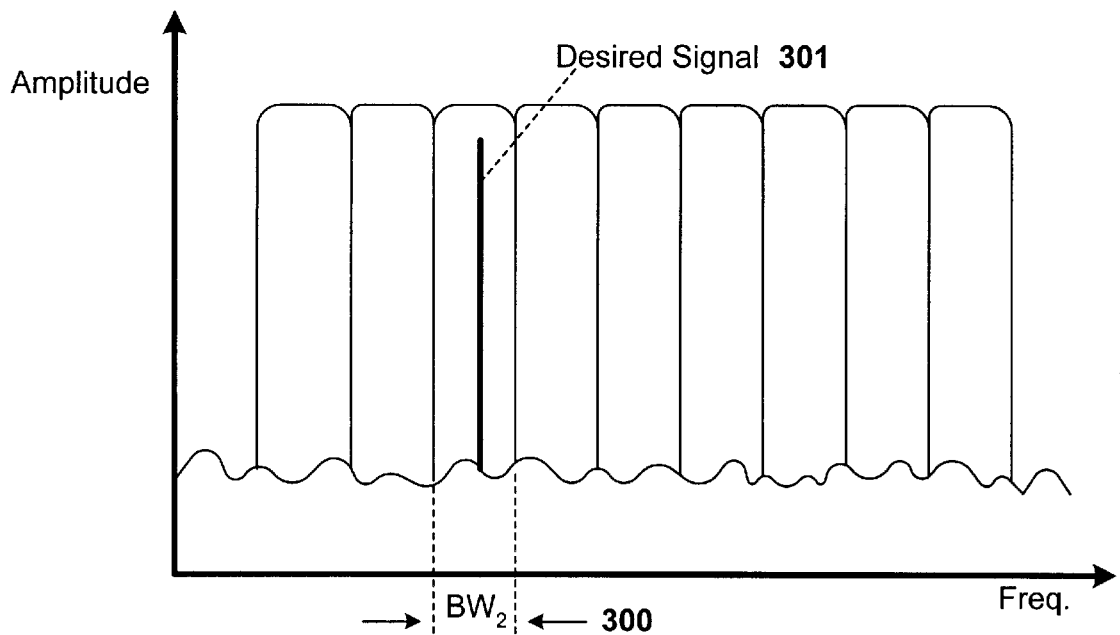
FIG. 3 is a graph illustrative of a bank of multiple IF filters in the present invention.

FIG. 3—Filter Banked Approach to Reduce Noise Bandwidth

FIG. 3 shows the use of multiple reduced bandwidth filters. The bandwidth of these filters 300 is reduced to that of approximately the data modulation, or during the preamble of the system possibly to less than the bandwidth of the transmitted signal. Desired signal 301 is shown offset in frequency but now located within one of the pass bands of the filter bank. The increase in effective signal-to-noise ratio is shown by the equation.

Improvement=10 Log (BW1/BW2)

FIG. 4—Practical Filter Implementation

Practical filter implementation typically will not allow for the brick wall adjacent filter attributes shown in FIG. 3. In an actual filter, the skirts of adjacent channels will overlap. The 3 dB bandwidth 400 of the filter is set to approximately that of the chip code rate divided by the number of chips in the chip code utilized. This is matched so that in the presence of jamming each filter will hold approximately one spectral line of the jamming signal. The filter bandwidth and filter shape are important to the noise bandwidth achieved by this last IF filter. In addition, signals received in adjacent channels must be rejected sufficiently to allow the voting logic and/or Trip Level algorithm to function properly. In the preferred embodiment, the 3 dB bandwidth of the filters is 20 KHz. Therefore, a signal which is offset by 20 KHz from the center frequency 403 into the center frequency 401 of the adjacent filter, must be adequately suppressed. The suppression on the adjacent channel must be greater than or equal to the maximum Trip Level desired 402. If this suppression does not occur, then the Trip Level algorithm will not have sufficient dynamic range to function properly. The maximum allowable Trip Level on the instant invention is approximately 11 dB. In addition to the filter set used for signal acquisition, an additional filter set may be provided which is designed with offsets in center frequency in ½ or ¼ fractional bandwidths. This allows for the automatic frequency centering of signals received which are not directly in the center of a filter's pass band. As shown in FIG. 4, in a 20 Kb/s ASK data system sensitivity=−174+NF+CNR+10 Log 20 KHz; −174+5+7+43=−119 dBm. Table 6 identifies various filters that have been simulated or tested to provide the characteristics necessary for the instant invention.

In column 1, Table 6 identifies a filter type with $BW_{3db}$ at 20 KHz; columns 2–5 identify filter response time; column 6 identifies a noise BW of each filter; and column 7 identifies the number of poles/taps with respect to each filter.

TABLE 6

| Filter Type $BW_{3dB}$ = 20 KHz | Time to reach 1 dB | | Level after 50 us 20 KHz away | | Noise BW | Pole/Taps |
|---|---|---|---|---|---|---|
| | Amin = 11 dB | Amin = 21 dB | Amin = 11 dB | Amin = 21db | | |
| Chebyshev | 67.3 us | | −23.2 dB | | 20.6 KHz | 3 |
| Elliptic | 47.3 us | 52.3 us | −14.2 dB | −19.8 dB | 23.7 KHz | 3 |
| Elliptic | 53.8 us | 62.4 us | −16.4 dB | −23 dB | 22.4 KHz | 4 |
| Butterworth | 62 us | | −19.7 dB | | 21.1 KHz | 3 |
| Bessel | 54.3 us | | −15.7 dB | | 21.3 KHz | 3 |
| Gaussian | 53.9 us | | −13.2 dB | | 21.3 KHz | 3 |
| Blinchikoff | 62.5 us | | −15.9 dB | | 20.7 KHz | 4 |
| FIR Fs = 540 KHz | 56 us | | −18 dB | | 20 KHz | 27 |
| FIR Fs = 600 KHz | 83 us | | −23.2 dB | | 20 KHz | 60 |
| FIR Fs = 1.08 MHz | 45 us | | −11.8 dB | | 20 KHz | 54 |
| FIR Fs = 1.5 MHz | 40 us | | −8.9 dB | | 20 KHz | 75 |
| FIR Fs = 3 MHz | 35 us | | −2.8 dB | | 20 KHz | 150 |
| Chebyshev | 41.8 us | | −25.4 dB | | 41.7 KHz | 3 |
| Elliptic | 31.6 us | 32.9 us | −13.6 dB | −22.3 dB | 48 KHz | 3 |
| Butterworth | 38 us | | −22.4 dB | | 43.3 KHz | 3 |
| Bessel | 36.4 us | | −12.3 dB | | 42.2 KHz | 3 |
| Gaussian | 36.8 us | | −1 2 dB | | 42 KHz | 3 |
| Blinchikoff | 40.2 us | | −18.4 dB | | 41.3 KHz | 4 |
| FIR Fs = 540 KHz | 56 us | | −23.6 dB | | 40 KHz | 27 |
| FIR Fs = 600 KHz | 83 us | | −28.6 dB | | 40 KHz | 60 |
| FIR Fs = 1.08 MHz | 42 us | | −17 dB | | 40 KHz | 54 |
| FIR Fs = 1.5 MHz | 40 us | | −14 dB | | 40 KHz | 75 |
| FIR Fs = 3 MHz | 33 us | | −7.9 dB | | 40 KHz | 150 |

| Filter Type $BW_{3dB}$ = 20 KHz | Time to reach 1 dB | | Level after 50 us 20 KHz away | | Noise BW | Pole/Taps |
|---|---|---|---|---|---|---|
| | Amin = 18 dB | Amin = 26 dB | Amin = 18 dB | Amin = 26 db | | |
| MFDCS | 47.6 us | 49.8 us | −15.8 dB | −15.1 dB | 21.2 KHz | 3 |

| Filter Type $BW_{3dB}$ = 40 KHz | Time to reach 1 dB | | Level after 50 us 40 KHz away | | Noise BW | Pole/Taps |
|---|---|---|---|---|---|---|
| | Amin = 18 dB | Amin = 26 dB | Amin = 18 dB | Amin = 26 db | | |
| MFDCS | 32.6 us | | −15 dB | | 42.8 KHz | 3 |

TABLE 6-continued

Filter with envelope shaping.

| Filter Type | Time to reach 1 dB | | Level after 50 us 20 KHz away | | | |
| --- | --- | --- | --- | --- | --- | --- |
| BW$_{3dB}$ = 20 KHz | Amin = 11 dB | Amin = 21 dB | Amin = 11 dB | Amin = 21 db | Noise BW | Pole/Taps |
| Elliptic | 67.3 us | 72.5 us | −22.4 dB | −34.9 dB | 23.7 KHz | 3 |

Note: Amin valid for Elliptic filters only.

FIGS. 5A, 5B, and 5C—Bandwidth Compression During Preamble Time

FIG. 5A is a chart plotting frequency and time of a transmitted message. If the preamble is not data modulated, then the BW of the I.F. may be reduced to enhance SNR and provide more robust acquisition. The message is broken into the preamble 500 and the data portion 501. During the preamble, a spectrum plot after despreading is shown in FIG. 5B with no data modulation during the preamble time. A spectrum plot is shown in FIG. 5C depicting the spectral expansion during the data modulation time. Since typically there is no data modulation during the preamble time, the search bandwidth may be reduced to lower than that of the data modulation during the preamble time 500. If there are 63 chips in a system and 10 bit times allocated for false Trips and miscellaneous, then the preamble search may be accomplished in 3.65 milliseconds [Preamble Time≧(# chips in code+false trips+misc.)×Last I.F. filter response time; (63+10)×$\frac{1}{20}$ Khz=3.65 ms] with a last IF filter of 20 KHz. If this 20 KHz bandwidth filter, which matches the data bandwidth, is reduced to 10 KHz, then the search time becomes 7.3 milliseconds [Preamble Scaled BW less than data BW; (63+10)×$\frac{1}{10}$ Khz=7.3 ms]. This 7.3 milliseconds 505, may be reduced by making a decision earlier in the settling time of the filter. Various filters disclosed within, provide settling times which are faster than the reciprocal bandwidth, allowing for a reduction in required preamble time.

In the alternative, a DSP or the like may post process after sampling for one or two bit times. The post processing required for the additional samples may be compensated for by increasing the speed of the DSP processor. A 50 nanosecond instruction time DSP can process a 20 KHz bandwidth IF in two milliseconds [(1 to 2 bit time samples)+DSP post process time; 150 # of filter taps (20 KHz BW I.F. : 3 ms/s); 63# of chip code positions; 4# of filter banks for 80 Khz of frequency ambiguity; 37.8×50 ns=1.9 ms+0.1 ms=2.0 ms]. If the IF bandwidth is reduced to 10 KHz, then a 25 nanosecond instruction speed DSP processor will require 3.9 milliseconds to process the same preamble [900 # of filter taps; 63# of chip code positions; 8# of filter banks for 120; 151.2×25 ms=3.78 ms+0.1 ms=3.9 ms]. Further increases in DSP instruction speed will allow for a further reduction in the post-processing time required.

The preamble must be greater than 63 bit times to allow for miscellaneous overhead. This overhead includes: extra time for antenna optimization, dynamic range compensation, fine alignment of chip code phase position, AFC loop, etc.

FIG. 6—Receiver Algorithm

The receiver algorithm described in FIG. 6 is that of a receiver architecture which uses serial correlation by mixing a reference chip code set with the received signal. This may be accomplished through alternate despreading means 1 15 or despreading means 108 as described in FIG. 1. First the algorithm steps to the next chip code position 600. This step may be full chip steps or half chip steps or any of the other chip stepping schemes as described herein and more particularly in FIG. 23. Next, the IF filters may optionally be dumped 616. The dumping of the filters reduces the effects of energy stored within the filters from previous chip code positions. Depending on the Trip algorithm selected and upon the filter type used, this dumping may or may not be required or desired. Next, the algorithm allows the filter banks to settle 601. Once the filter banks settle to an acceptable level, then the algorithm computes the average signal level of all M frequency bins, 602. There are several alternatives described within the body of the patent including shunting the high and low frequency bin from the computation of this average. Next, decision block 603 selects the first frequency bin and subtracts from it the average signal computed in 602. If the difference is greater than or equal to a Trip Level then the algorithm passes control to 605 whereby the algorithm is in the "tripped" mode. If the result is less than the Trip Level then block 604 increments through the available filter banks until all of the filter's have been examined. Once all of the filter bins have been compared without a trip, control is passed back to step 600. Step 605 performs various false Trip tests in order to reduce the occasions where the particular chip code is dwelt upon without the reasonable likelihood of successfully decoding a message. These occurrences can come from high background noise or from impulsive jammers. If a false Trip is detected, then block 607 increments a false Trip counter and passes control back to step 600. If the Trip was not false then control is passed to step 608. Step 608 allows for the automatic frequency fine tuning of the received signal. This may be accomplished through various means as described herein, including steering the VCO to the center frequency of the frequency bin of interest or by selecting an alternative subgroup of frequency bins. This alternative frequency bin group is purposely designed with center frequency offsets so that the subgroup is more closely centered with that frequency of the received signal. Step 609 provides for chip code clock correction. This is a frequency correction which reduces the rate of drift of the reference chip code with respect to that of the transmitted chip code. This may be accomplished through steering a VCO if that VCO also controls the chip code clock. It may also be accomplished algorithmically as periodic offsets to the chip code slipper. As an alternative, if the AFC process in 608 corrects the receiver's VCO to the center frequency bin, and if the chip code clock is derived from the VCO, then the chip code clock will automatically have been compensated with respect to the transmitted chip code clock, providing the chip code clock of the transmitter is phase coherent with the carrier frequency. As a further alternative to step 608, If ASK On Off Keying (OOK) data demodulation is used, energy from two frequency bins may be effectively utilized with no AFC. The energy level or the two or three strongest bins may be summed. This sum may then be made available to the ASK (OOK) demodulator as an alternative to a simple sum, the function in step 902 (see FIG. 9) or 1002 (see FIG. 10) or the like may be utilized. Step 610 provides a chip code phase correction. This correction is required to overcome the offset in time due to the 2 bit pipelining utilized in the receiver's algorithm. If pipelining is not used, then this step 610 may be eliminated. Step 617 also adjusts the chip code phase position. This step provides a further fine alignment of the chip code phase in a resolution which is greater than that of the original coarse chip code position search divided by step 600. A ⅛ chip code phase error yields a 1.16 dB loss in signal strength. Fine alignment may be accomplished through jogging the chip code phase position in discrete steps, or by determining the leading falling slopes of the correlation function and calculating a center position, or by any of the chip code tracking methods as are known in the art, such as Costas loops and Tau-Dither loops. Step 611 provides for the optimization of antenna diversity. This step is further described in FIG. 25. Step 612 is required if the preamble search is performed with a bandwidth of that less than the data bandwidth. Next, the data is decoded at 613. Data demodulation may be included. In the preferred embodiment this is amplitude shift keying. Alternate data modulations include Quadrature Phase Shift Keying (QPSK), Minimum Shift Keying (MSK) and Frequency Shift Keying (FSK). In addition, these data demodulations may be performed with automatic forward error correction as well as with coherent demodulation schemes. At the end of a data message, typically there is a CRC or some error detection code. This code is evaluated by decision block 614. If the data message was valid then control is passed to step 600. If the message was not valid then block 615 increments the false Trip count. The false Trip counts of block 615 and 607 are used in conjunction with the adaptive Trip threshold algorithm described in FIG. 16. Step 615 then passes control to step 600. In step 601 the last IF filters may be settling while computations of 602 and those blocks thereafter, are taking place on a previously sampled set of frequency bins. This pipelining technique is known in the art.

As an alternative to block 603, 604 and 602 fuzzy logic can be used to compare all M frequency bins simultaneously and automatically select the frequency bin most likely to yield the desired message.

Figure 7:
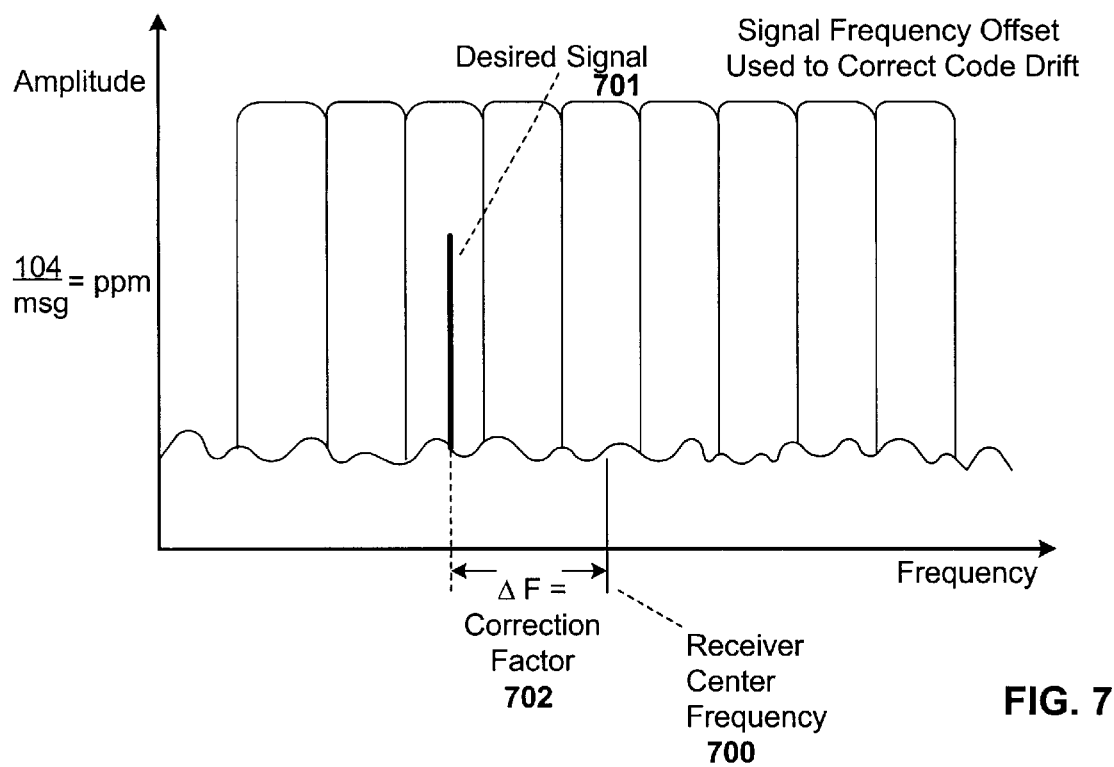
FIG. 7 shows a bank of filters wherein the frequency offset of the received signal may be used to correct a corresponding code drift in the spreading code of the received signal.

FIG. 7—Signal Offset Used to Correct Code Drift

If a transmitter's chip code clock is coherent with its carrier, then the carrier frequency error may be used to compute the chip code clock rate error. The receiver has a certain center frequency 700 which is set by its internal frequency reference. When a desired signal 701 is received, that signal will have some offset 702 from the receiver's center frequency 700. This AF 702 may be used to compute a correction factor or to steer a frequency reference in a receiver so that the receiver's chip code reference matches that of the transmitter's. If the receiver uses its own internal frequency reference to both synthesize the LO's and to clock the chip code generators, then if the receiver steers the receiver's VCO such that the desired signal 701 matches the receiver's sensor center frequency 700, then the chip code frequency drift error will automatically become zero.

Figure 8:
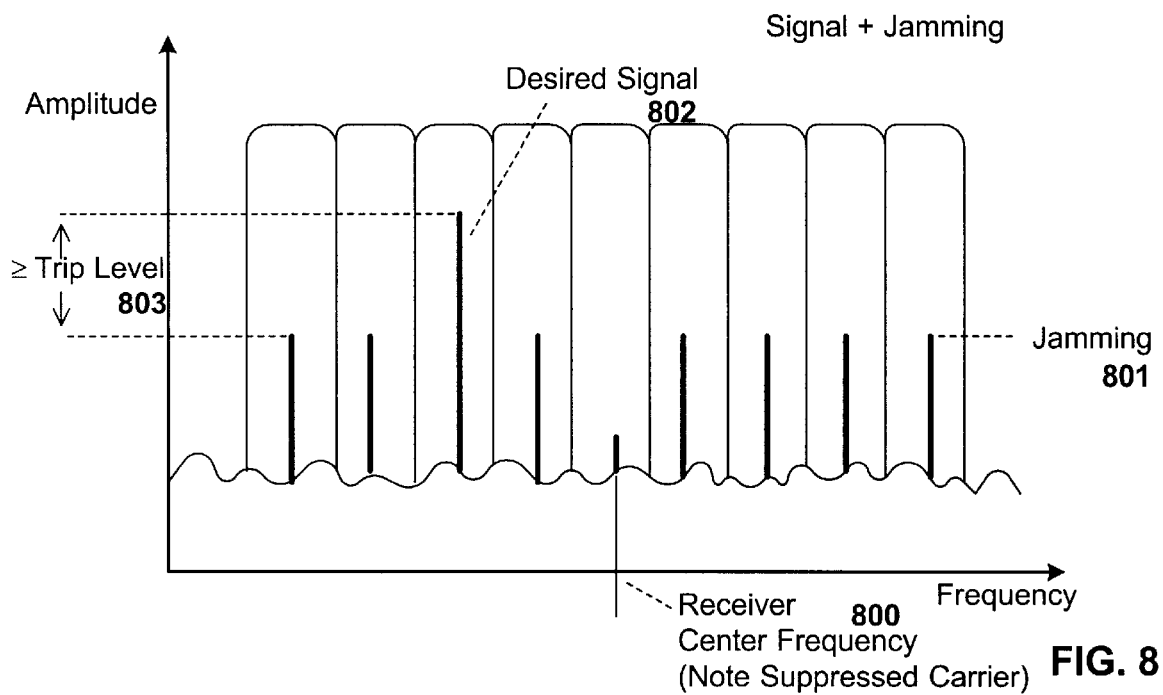
FIG. 8 shows a bank of filters wherein the received signal power within each filter is used to determine the trip level of the received signal.

FIG. 8—Signal Plus Jamming Effects on Frequency Bins

When a jamming signal 801 is received, spectral lines will begin to appear with a periodic offset. This periodic offset will equal the chip rate divided by the chip code length. In the instant invention, this yields a 20 KHz separation. It is therefore desirable to implement frequency bins with a bandwidth of 20 KHz or less so that each spectral line can be located in a separate frequency bin during an occurrence of jamming. Another effect to note of jamming is that the spectral line resulting from jamming which dwells at the receiver's center frequency 800, will be suppressed with respect to the other jamming spectral lines 801. This is due to the carrier suppression provided by the spread spectrum modulation. This is important to bear in mind when considering various Trip algorithms. This is especially true of Trip algorithms which take advantage of the lowest signal energy frequency bin as a reference.

When jamming occurs, the signal energy will rise in all of the frequency bins approximately equally, except for receiver center frequency 800. The jammer will appear to the receiver's algorithm as an increase in background noise. The Trip algorithm seeks the occurrence of a desired signal 802. The characteristic of the desired signal 802 must therefore provide enough cues with either respect to past history or with that of adjacent frequency bins, in order for the voting algorithm to make a Trip decision. Typically, the Trip Level 803 must provide a great enough range for the voting algorithm to make a correct decision.

Figure 9:
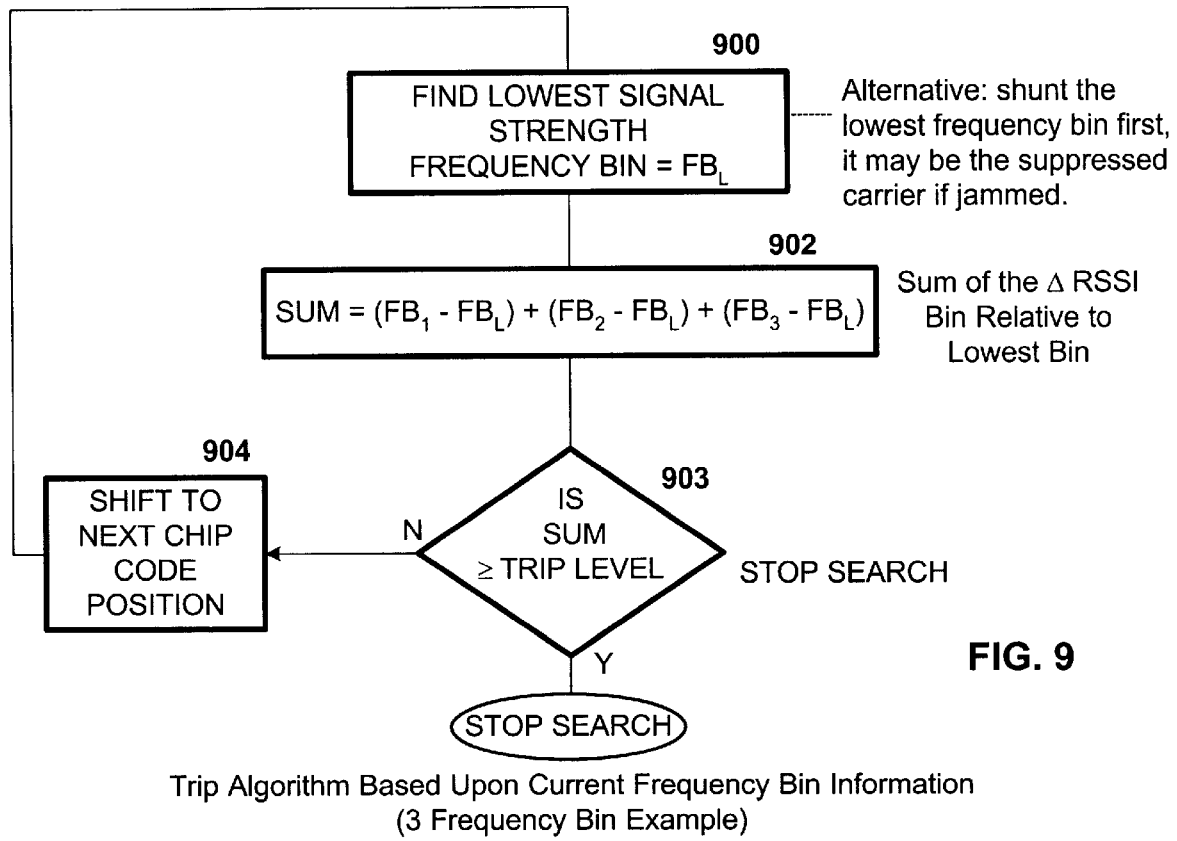
FIG. 9 is a flow diagram that depicts a trip algorithm of the present invention that utilizes the current signal strength information from each narrow IF filter.

FIG. 9—Trip Algorithm Based Upon Current Frequency Bin Information

Block 900 first finds the lowest signal strength frequency bin and sets a variable $FB_L$ equal to this lowest signal strength. As an alternative 901, the algorithm would first shunt and remove the lowest frequency bin first. This is due to the fact that the lowest frequency bin may be a result of the suppressed carrier effect during the occurrences of jamming. Step 902 provides an algebraic sum representative of the ΔReceived Signal Strength Indicator (RSSI) of all the frequency bins relative to the lowest bin. As a further alternate to step 900, the average signal strength may be computed. Such a computation may also alternatively shunt the highest and lowest signal strength from the calculation of the average. Resultingly, step 902 would use the average signal strength instead of using the lowest signal strength to perform this algebraic sum. Step 903 compares this sum to the Trip Level. If the Trip Level is met or exceeded then this portion of the chip code search stops. If the Trip Level is not met or exceeded, then control is passed to step 904 which shifts to the next chip code position and then passes control to 900. The chip code shift may be any of the chip code phase slip approaches as taught herein.

Since this decision is based entirely upon current frequency information, the relationship of this chip code sample to the previous chip code sample is not important. Some algorithms which use previous history require that a large jump in effect from one chip code position to the next is measurable, such as that taught in FIG. 10.

Figure 10:
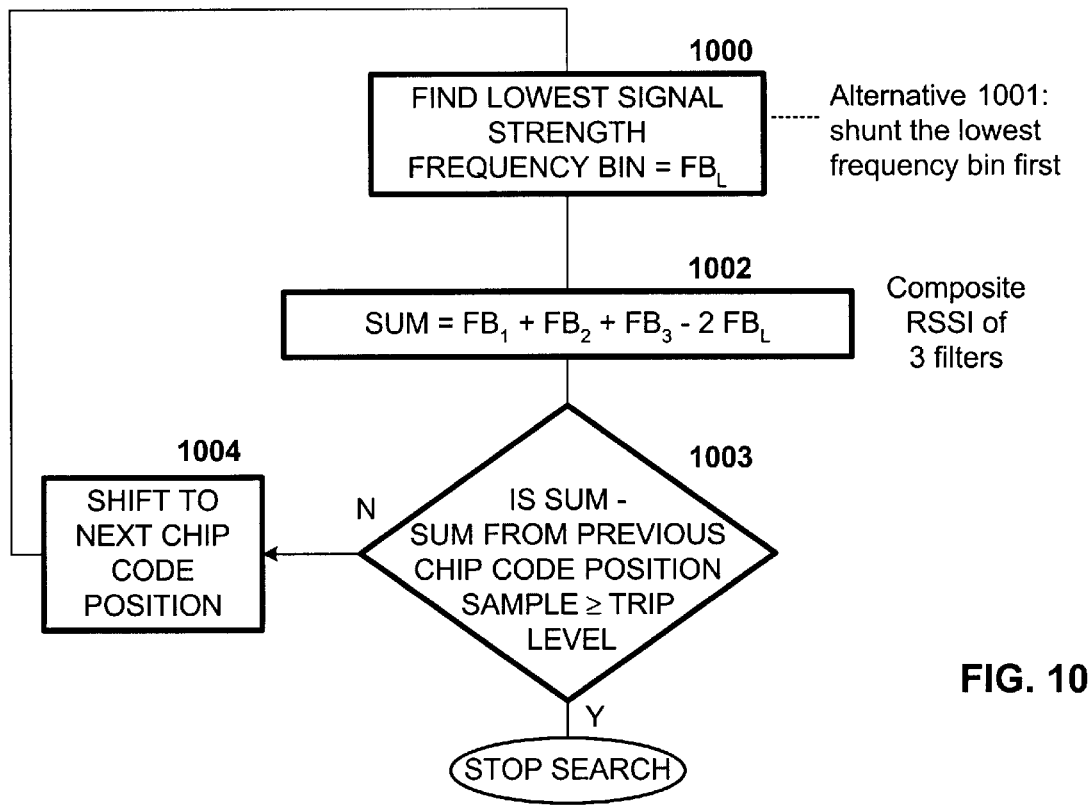
FIG. 10 is a flow diagram that depicts a trip algorithm of the present invention that utilizes both current and previous signal strength information from each narrow IF filter.

FIG. 10—Trip Algorithm Based on Previous History as well as Current Frequency Bin Information Step 1000 finds the lowest signal strength frequency bin and sets a variable FBL equal to this lowest signal strength. As an alternative 1001, the algorithm would first shunt and remove the lowest frequency bin first. This is due to the fact that the lowest frequency bin may be a result of the suppressed carrier effect during the occurrences of jamming. Step 1002 provides an algebraic sum representative of the ΔRSSI of all the frequency bins relative to the lowest bin. As a further alternate to step 1000, the average signal strength may be computed. Such a computation may also alternatively shunt the highest and lowest signal strength from the calculation of the average. Resultingly, step 1002 would use the average signal strength instead of using the lowest signal strength to perform this algebraic sum. Step 1003 compares this sum to the Trip Level. If the Trip Level is met or exceeded then this portion of the chip code search stops. If the Trip Level is not met or exceeded, then control is passed to step 1004 which shifts to the next chip code position. Control is then passed to step 1000. The concept of this step is to determine the average or the lowest signal strength in the frequency bins, then next to establish the Δ signal strengths of the other frequency bins. These Δ signal strengths are then summed with the lowest signal strength or average signal strength. In this manner, the average or lowest signal strength is summed with all the other available energy in the remaining filters. This process increases the potential dynamic range in which to make a Trip decision. Block 1003 uses this sum information in comparison to the previous sum information derived from the last chip code position. This technique of using previous history requires that every new chip code phase position searched yields as high a differential from the previous position as possible. Since a correlation function is two chip codes wide, it is desirable to step the chip code search in two chip time increments. After 63 of these searches, all of the chip positions will have been searched since 63 is an odd number. Any chip code search steps of less than two chip times will provide a lower dynamic reading from a previous measurement to a current measurement in which to run this algorithm. If the sum of the frequency bins of the current chip code position less the sum of the frequency bins from the previous chip code position is greater than or equal to the trip level, block 1003 will stop the chip code search. If Trip is not achieved then control is placed in block 1004 which then shifts the chip code phase to the next position. This chip code phase shift can be any of the techniques herein whereby the jump prior to the next bit time integration has added to it two additional chip phase positions. After 63 such search jumps, all of the chip code positions will have been examined. This algorithm is still compatible with multiple subchip steps integrated into the frequency bins over a bit time as is described in FIG. 23. Control is then passed to step 1000.

Figure 11:
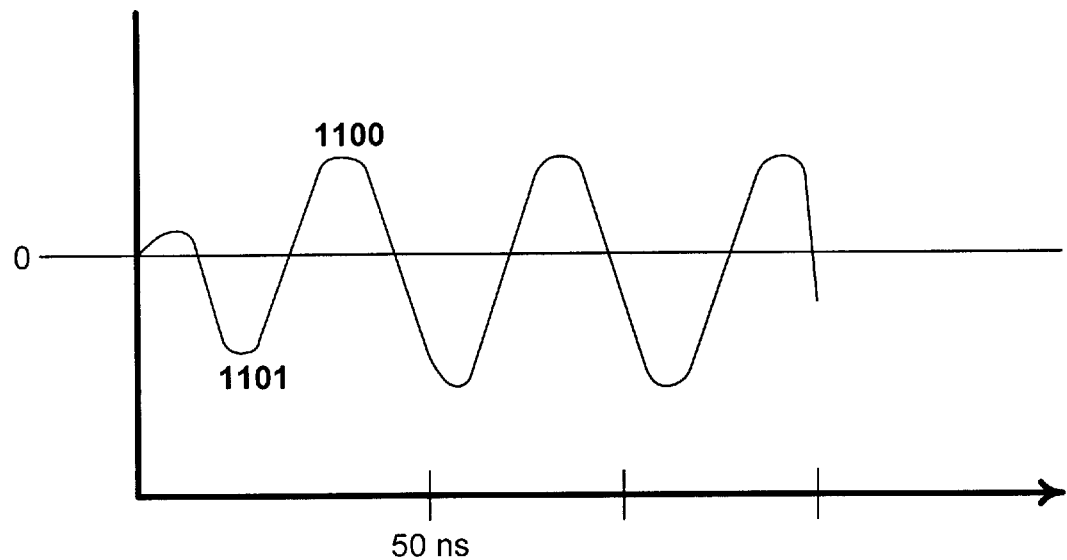
FIG. 11 is a diagram that shows the rise time of a 20 KHz filter of the present invention.

FIG. 11—In-Band Rise Time of 20 KHz Filter

There are several characteristics of the last IF filter which are important to the performance of the instant invention. One of these characteristics is the rise time of the filter. The slower the filter rises, the longer it takes to make a signal strength decision based on the information from that filter. The filter, as measured and simulated, typically settles within one over its bandwidth 1100. Prior to that the signal may be used but it will not have achieved its full signal strength 1101. This trade-off may be acceptable in order to reduce the acquisition time of the transmitted preamble. Alternatively, filters with less cochannel rejection may be used. As the steepness of the filter's skirts increase, so does the delay before the filter can settle.

Figure 12:
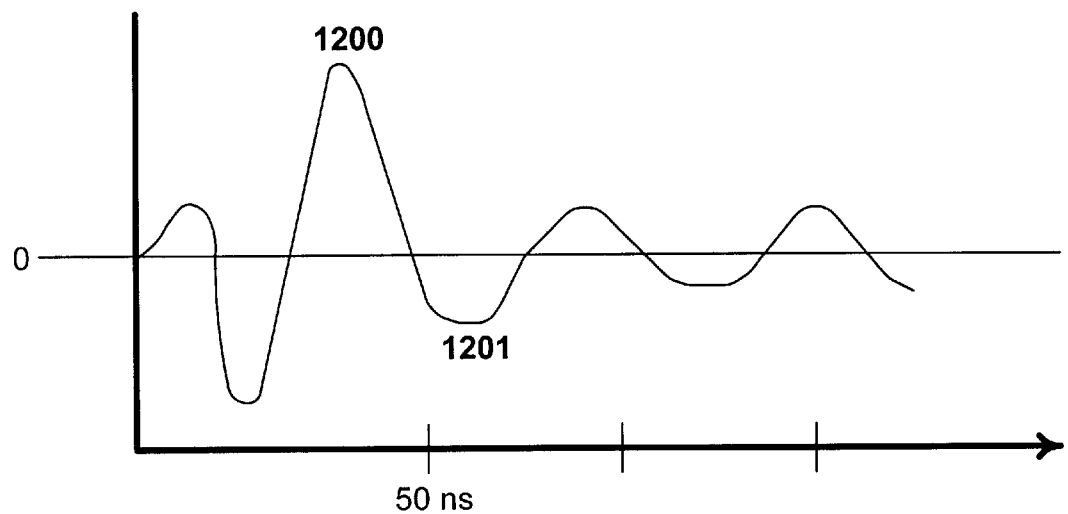
FIG. 12 is a diagram that shows how a 20 KHz filter may be affected by an out-of band signal.

FIG. 12—Response to Out-of-Band Signal 20 KHz from Center Frequency

Another characteristic of the last IF filter that is important to the instant invention, is its response to out-of-band signals. Since the instant invention depends on multiple adjacent filters, the response characteristic of a filter which is adjacent to a filter which is receiving a desired signal, is important to the performance of the receiver's voting algorithm. Typically, the leading edge filter response will respond to an out of band sine wave impulse with initial ringing and overshoot. The overshoot is shown as 1200. The filter will settle sometime after one over its bandwidth as shown by 1201. This overshoot has the undesired effect of making adjacent frequency bins appear to have signal strengths which are higher than their true levels. This may be overcome by waiting for a longer settling time but this is undesirable as it will increase the required transmitted preamble. Another difficulty that this creates, is that simple peak detectors cannot be used. If a peak detector is used it will store the signal strength at 1200 and not cause appropriate delay at 1201. If an envelope detector is used it must have a rapid decay time in order to acquire the signal level 1201. As an alternative, the Trip algorithm may be made to function under these circumstances. For example, there may be a signal strength advantage in the sine wave 1100 as compared to the sine wave at 1200 by 7 dB or more. This may be enough for the voting algorithm to function. Alternatively, different filters exhibit this overshoot property to a lower degree as shown in Table 6, "level after 50 μs, 20 KHz away". This may allow enough signal difference between 1100 and 1200 to not cause a degradation of performance in the receiver's voting algorithm. As a further alternative, the envelope shapers 111 may be used to reduce the effects of the impulse. The envelope shapers roll off the leading edge of the sin wave. The use of the envelope shapers 111 can completely eliminate the undesired overshoot 1200. The disadvantage of the envelope shaper 111 is that a portion of the desired signal 1100 is attenuated during the leading edge of the sin wave. It is possible to make a first order envelope shaper which both has minimum impact on desired signal strength 1100 while mitigating the undesired overshoot 1200 to an acceptable level. The voting algorithm can function properly with an 11 dB difference in signal strength from the desired signal frequency bin relative to the adjacent channels and with the adaptive techniques described herein, this level may be as low as 3 dB. The preferred embodiment utilizes DSP techniques which eliminates this problem. The DSP allows the computation of a signal magnitude which is accurate at the completion of one filter run length. This magnitude is computed as: $SIN^2(fbin)+COS^2(fbin)=Magnitude^2$ FIG. 13—False Trip Detection via Chip Code Turn Off or Inversion Block 1300 turns off the chip code reference in the receiver. Alternatively, 1301 inverts the chip code sequence but the sequence remains on. Block 1302 resamples for a bit time or for 1/BW of the IF. Block 1303 determines if the correlation function dropped an appropriate amount. Either turning off the chip code 1300 or inverting the chip code 1301 will cause a properly coded signal to decrease in signal amplitude. If this did not occur, control is passed to block 1304. This block increments the false Trip count and continues the chip code search. The false Trip counter is used by the adaptive Trip algorithm described in FIG. 16. This false Trip detection technique can function in any direct sequence serial correlating system.

FIG. 14—False Trip Algorithm via Code Phase Offset

Block 1400 offsets the chip code by more than one chip code position. This forces a partially or properly aligned chip code position to a less advantageous alignment, reducing the correlation function. More than one chip code of this alignment is necessary since the initial course alignment may have occurred at the leading edge of the correlation function. If two or more chip times are used as this phase shift, then a degradation in signal strength of a properly aligned signal is guaranteed since the correlation function itself is two chip times wide at its base. Next block 1401 resamples for a bit time or for 1/BW of the IF. Decision block 1402 decides whether the correlation function dropped by an appropriate amount. This amount is no greater than the process gain available and no less than an amount equal to the poorest possible initial course code correlation less a fully uncorrelated position. If the correlation function did drop by a proper amount then control is passed to the next portion of the algorithm which leads to data demodulation. If the correlation function did not drop by a proper amount then control is passed to block 1403. This block increments the false Trip count and continues the chip code search. The false Trip count is later used by the adaptive Trip algorithm described in FIG. 16.

FIG. 15—False Trip Algorithm via Sum of Bins and Code Misalignment Effect Verification Block 1500 compares the present sum of the frequency bin's signal strength to the sum of frequency bins from the previous chip code position sample. Optionally, step 1501 shunts both the highest and lowest signal trends from the sum. As a further alternate the sum may be computed as the Δ from the lowest signal strength frequency bin. Step 1502 compares the average present sum to determine if it increased by an appropriate amount. The present signal should be stronger than a previous signal. This amount should at least equal the amount of which the chip code phase increments being searched moves the signal strength up the leading edge of the correlation function. If this did not occur, control is passed to block 1503 which increments the false Trip count and continues the chip code search. The false Trip count is incremented for the benefit of the adaptive Trip algorithm described in FIG. 16. If this first test in block 1502 did pass then control is passed to block 1504. This block stores the present sum as the last sum. It then advances the chip code position some amount. If the chip code position is advanced 2 or more chip times then a decrease in correlation function is guaranteed since the chip code function itself is only two chip times in duration. Block 1505 then resamples for a bit time or for 1/BW of the last IF. It then compares the present sum of frequency bins to the "last sum". Control is then passed to decision block 1506. This block evaluates whether the present sum decreased by an appropriate amount as compared to the "last sum". If it did not, then control is passed to block 1507. This block increments the false Trip count and continues the chip code search. The false Trip count is used by the adaptive Trip algorithm described in FIG. 16. If the test in block 1506 passed, then control is continued with the receiver algorithm reading up to the demodulation of data. This algorithm is appropriate for any serial acquisition direct sequence receiver system as well as by the receiver architecture described herein.

Figure 16:
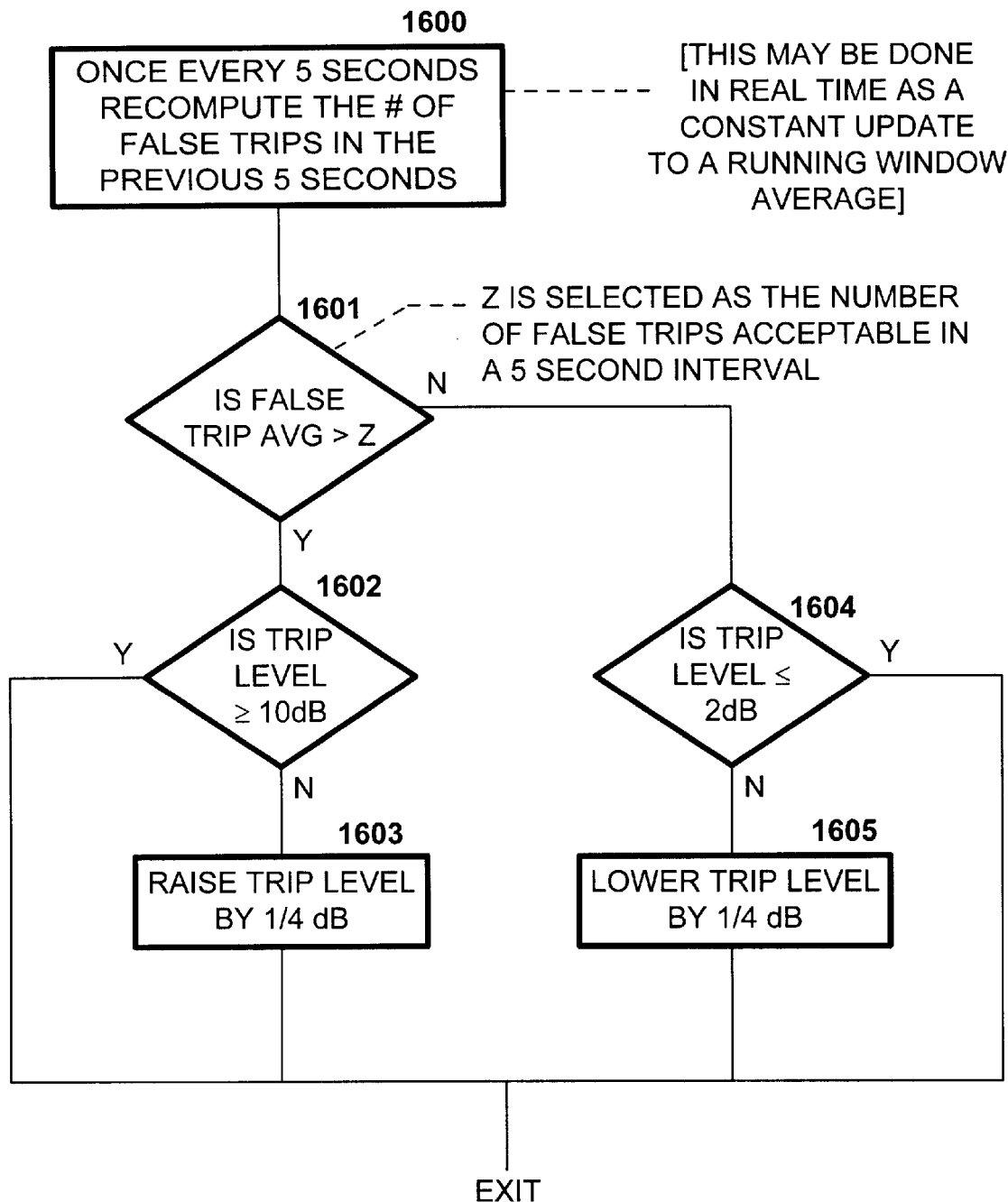
FIG. 16 is a flow diagram that adaptively modifies the trip level.

FIG. 16—Adaptive Trip Level Algorithm

Block 1600 indicates that once every five seconds that the accumulated number of false Trips is divided by some unit of time in order to yield a figure of merit which equals false Trips per second. This may be accomplished in real time via a number of means as well as through the constant update of a running window average. Such averaging techniques are known in the art. The overall purpose of block 1600 is to create a figure of merit equalling false Trips per second. As an alternative figure of merit, message throughput or any other indicator of improved receiver performance may be utilized. Block 1601 determines if this average false Trip rate is acceptable by comparing it to a value "Z". Z can be selected by computing the number of false Trips which can be tolerated within the transmitted preamble before the receiver runs out of time to search all 63 chip positions, in combination with the anticipated message traffic and operating environment. By comparing the average false Trips to the acceptable level, the algorithm is able to adaptively adjust the Trip Level to either a higher or lower amount depending on what is appropriate. If the average false Trips are too great, then control is passed to block 1602. This block serves to provide an upper limit as to how high the Trip Level can become. If the Trip Level becomes too high, then the difference in correlated to non-correlated signals will be missed entirely regardless of the losses caused by false Trips. This upper level must be selected based upon the chip code step sizes in the coarse search in relationship to how they fall upon the correlation function. This will be different in a strong signal case compared to an MDS case as further depicted in FIG. 23. In a strong signal case coarse search composed of full chip steps will always find at least a 12 dB peak from the uncorrelated signals. Whereas, in the MDS case, even with a chip search finer than one chip time, the correlation increase may only be 3 dB. (See FIG. 23). Therefore, as the Trip Level is set higher than 3 dB, the ultimate sensitivity of the receiver is decreased. This may be an acceptable tradeoff, however, in the presence of false Trips, if these false Trips are causing the loss of an unacceptable number of stronger signals. If the Trip level has not already reached its maximum level 1602, then control is passed to 1603. This block raises the Trip Level in ¼ dB increments. This level may be increased or decreased depending on the desired response time of the false Trip algorithm to changing environmental conditions. If the Trip Level has reached its peak in step 1602 then control is passed to the exit point and to the remainder of the algorithm.

If the false Trip average is not greater than "Z", then the sensitivity of the receiver may be increased. Prior to increasing the sensitivity block 1604 determines whether the Trip Level has become too low. This lower limit is not as critical as the higher limit, since it will automatically adjust itself to higher levels once the number of false Trips become unacceptable. However, in the instant invention, block 1604 sets an ultimate low level Trip point of 2 dB. If this level has not been reached, then block 1605 lowers the Trip Level by ¼ of a dB. This ¼ dB may be increased or decreased depending on the desired response time of the adaptive Trip Level algorithm to changing environmental conditions. If the Trip Level 1604 has reached its minimum level, then control is passed to the exit of the algorithm. This adaptive Trip Level approach and algorithm may be utilized by any serial acquisition direct sequence system as well as in conjunction with the techniques taught herein.

Figure 17:
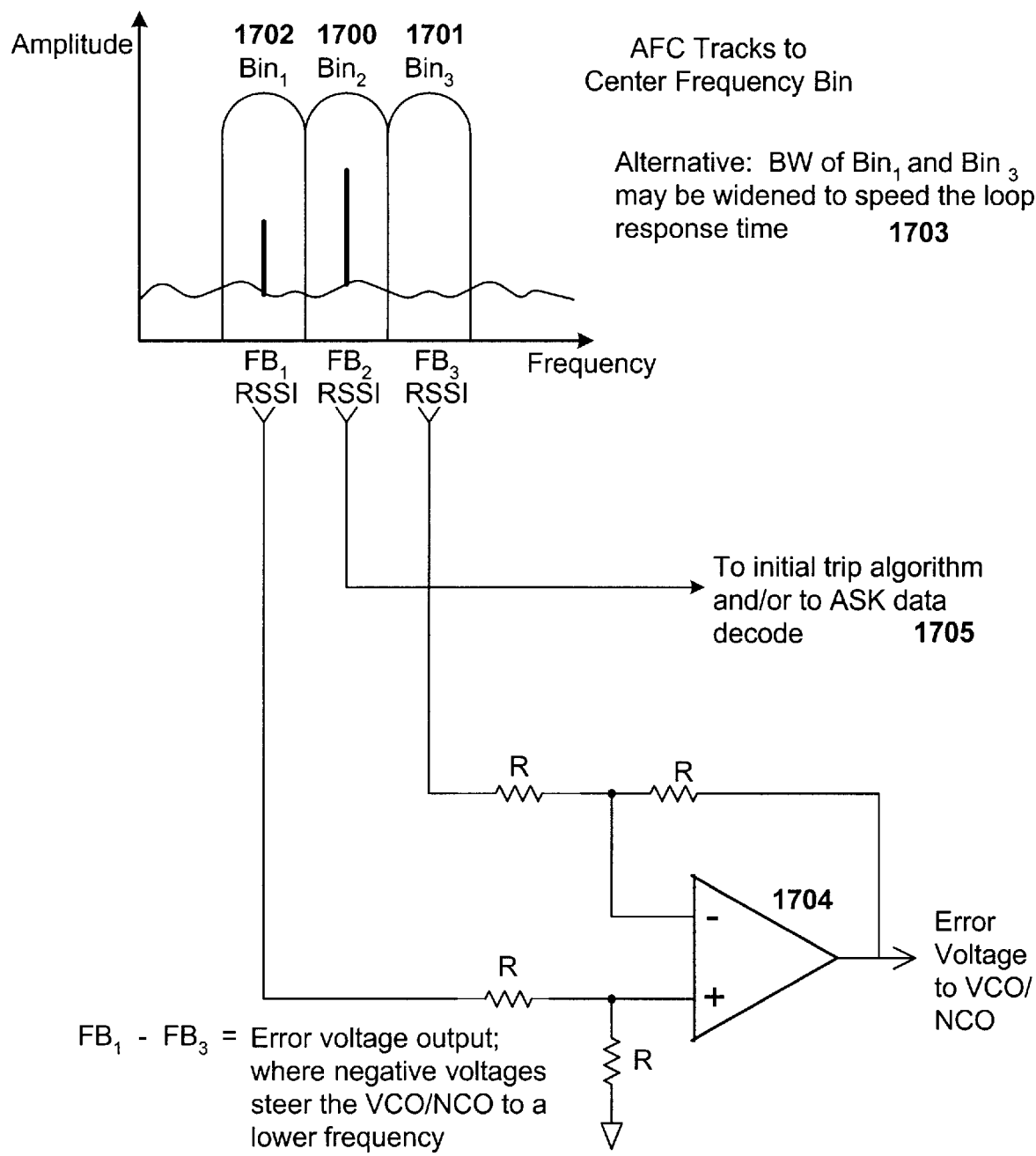
FIG. 17 is a circuit diagram that shows an automatic frequency correction loop.

FIG. 17—AFC Tracking

The AFC tracking loop steers the desired frequency into frequency bin 1700. This frequency bin may be used for the initial Trip algorithm such that the other bins are not required for the initial Trip decision. As an alternative technique, Frequency bin 1700 is measured for receiver received signal strength indication. This signal strength may be used by the ASK data decoding circuitry 1705. Alternatively, the output of frequency bin 1700 may be phase or frequency demodulated in order to match the modulation form used by the transmitter. Phase or frequency demodulation does not use the RSSI resultant output from frequency bin 1700. When either a signal is found in frequency bin 1701 or in frequency bin 1702, that frequency is automatically steered into frequency bin 1700. As an alternate to a bandwidth of all 3 frequency bins being the same, the bandwidth of the outer frequency bins 1702 and 1701 may be widened to decrease the loop response time 1703. This is particularly useful if the tracking loop of FIG. 17 is used during the initial acquisition of the transmitted preamble by steering the desired signal into the center frequency bin 1700 prior to the Trip algorithm making a decision. In such a case, the Trip algorithm may operate from the single output provided as the RSSI of frequency bin 1700. The Trip algorithm may simply look at the single frequency bin for increases in signal strength as compared to the last measured chip code position. When using the circuit in FIG. 17 for data demodulation frequency tracking, the response time of the filters in 1701 and 1702 may be slower since the torque term drift components will be low.

The operational amplifier 1704 subtracts the RSSI of frequency bin 1701 from the RSSI of frequency bin 1702. In the example given the subtraction is provided with unity gain. The output of op amp 1704 then provides an error voltage to a voltage control oscillator or to a numerically controlled oscillator. In order for this loop to function properly, the error voltage must control a VCO where negative or lower voltages steer the VCO to a lower frequency and higher voltages steer the VCO to a higher frequency.

The above loop may be accomplished via software means or via equivalent hardware means. It may also be run prior to data demodulation whereby the loop remains closed during data demodulation. Alternatively, it may be run prior to data demodulation whereby the loop is open once data modulation begins.

Figure 18:
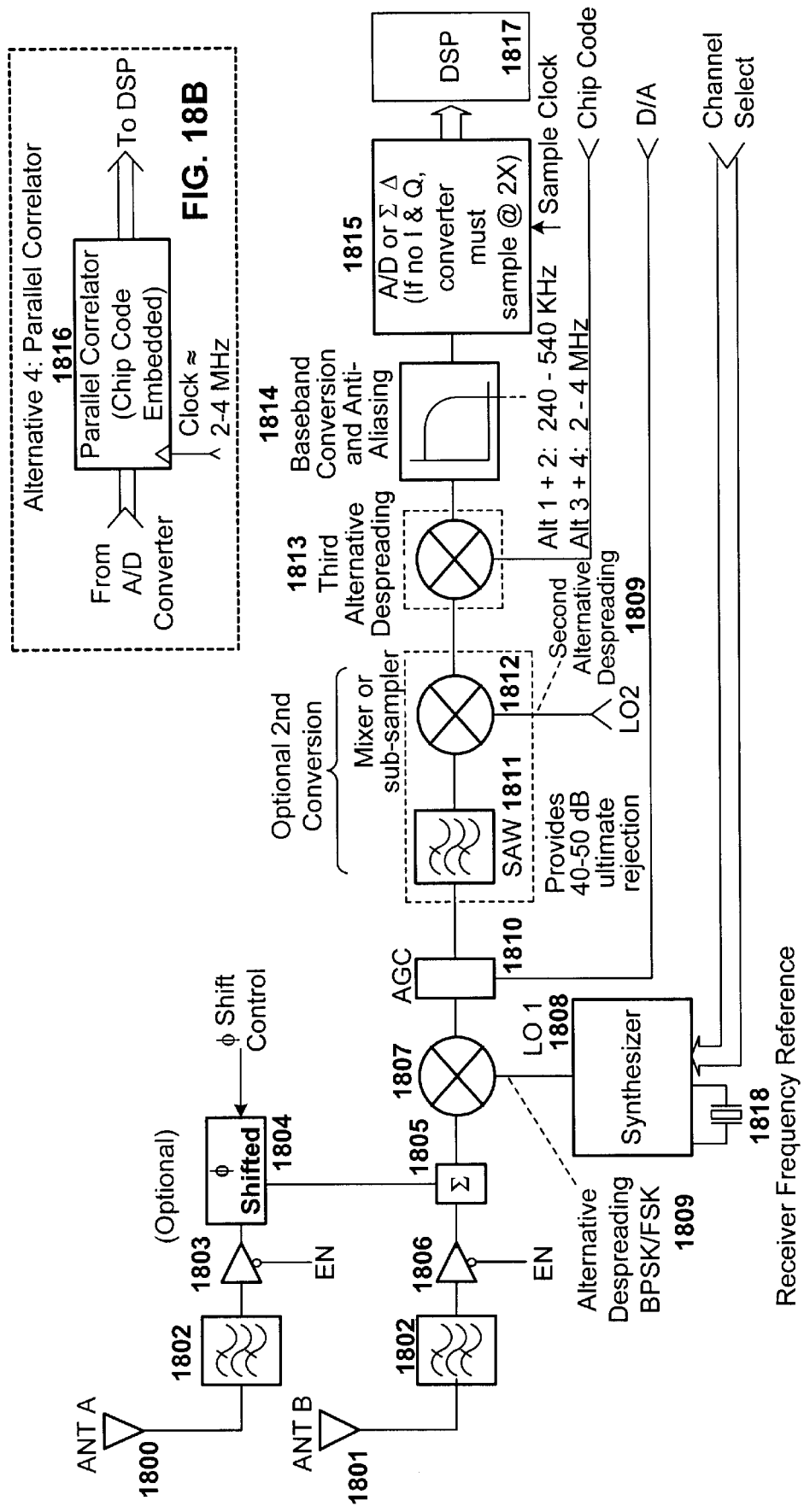
FIG. 18 is a block diagram that shows how the receiver of the present invention may be implemented in a DSP architecture.

FIG. 18—DSP Receiver Approach Block Diagram

Either antenna A 1800 or antenna B 1801 may be selected or some combination of the two. These antennas provide diversity against signal fading due to constructive interference. Preselector filter 1802 reduces desired frequencies outside of a certain practical bandwidth which may typically be anywhere from 10 MHz to 100 MHz. Practical preselector 1802 filter implementations range from surface acoustic wave types to printed element filters. Low noise Amplifier LNA 1803 enables signals to be passed from antenna A 1800. LNA 1806 allows signals to be passed from antenna B 1801. The selection of antenna A or antenna B can be used in diversity schemes as described herein. As an option to one of the diversity schemes described herein, phase shifter 1804 is utilized. The control of phase shifter 1804 is further described in FIG. 24. The signals from antenna A and antenna B are ultimately combined at summer 1805. This summer then provides an RF signal to mixer 1807. Mixer 1807 may be implemented from any of a variety of available mixers including image rejecting mixers which simplify later conversion stages of the receiver. Mixer 1807 is driven from an LO port which is supplied by synthesizer 1808. In alternative 2 for despreading 1809, a mixer driven by a chip code may be inserted between synthesizer 1808 and mixer 1807. Appropriate despreading modulations can include BPSK or FSK or MSK or QPSK, etc. The synthesizer uses an external frequency reference 1818, typically a crystal, as an overall frequency reference source. This frequency reference may further be temperature compensated by the DSP processor through the use of external temperature sensor and compensation look-up table stored in the DSP's ROM. Temperature compensation of this frequency reference 1818 may serve to reduce the frequency ambiguity which may exist between a transmitter and receiver. The output of mixer 1807 is then fed to automatic gain control (AGC) circuit 1810. Automatic gain control is useful in expanding the near-far operation between a receiver and a desired transmitter. In this way, a transmitter which is in near proximity to antenna A 1800 or antenna B 1801 may be attenuated by AGC 1810. This attenuation reduces the amount of signal which will ultimately be present at A/D converter 1815. By reducing the maximum signal which may be present on the A/D converter 1815, the total number of bits of resolution in the A/D converter may be reduced. This has the desirable effect of reducing the cost of the A/D converter, while maintaining a wide overall dynamic range for desired signals. This AGC circuit does not reduce the effect of undesired out-of-band signals which are stronger than the minimal detectable system signal by the available dynamic range of the A/D converter 1815. As a result, subsequent filtering such as surface acoustic wave, SAW, resonators 1811 are desirable. Such a SAW can be conveniently inserted as part of an optional second conversion stage. Such a SAW can readily provide 40–50 dB of ultimate rejection of signals which are separated 1–3 MHz from the center frequency of the SAW. Mixer 1812 is a further portion of the optional second conversion stage. As an alternative to this mixer, sub-sampling techniques may be employed. Either sub-sampling or mixing will yield the desired effect of frequency down conversion. A second alternative is shown where signal despreading 1809 may be applied to the LO2 port prior to injection into mixer 1812. In a third alternative, despreading occurs in line with the receiver's IF and is accomplished by mixer 1813. Mixer 1813 would then be injected with the reference chip code. It may also be desirable to band limit filter the reference chip code prior to injection into mixer 1813. The next stage of the receiver is block 1814 which provides the functions of base band conversion and of anti-aliasing. Again, base band conversion may be provided by sub-sampling, with an associated band-pass anti-alias filter, or via a mixer injected with $F_c$ or with dual mixers in quadrature which provide I and Q outputs. The ultimate minimum requirement of this anti-aliasing filter may be reduced by the use of preceding filter stages or decimation in the DSP process. It is desirable at this stage to eliminate all but the desired portion of the signal which is to be analyzed by the Digital Signal Processor. In despreading alternatives 1 and 2 the resulting bandwidths of this stage will be due to the frequency ambiguity between the transmitter and receiver. This ambiguity ranges between 80 KHz and 180 KHz. If the signal is to be later over-sampled by a ratio of 3:1, then the ultimate rejection frequency of filter 1814 must be in the range of 240–540 KHz. If a higher sampling rate is used by A/D converter 1815, then the ultimate rejection frequency of base band filter 1814 may be further relaxed. The pass band of filter 1814 must be either 80 or 180 KHz as is appropriate for the amount of frequency ambiguity which must be tolerated by the receiver.

In a fourth alternative, despreading is performed by a parallel correlator inserted after A/D 1815 and before a DSP 1817 (see FIG. 18B). In a fifth alternative, despreading occurs within the DSP 1817.

If despreading alternatives 3 or 4 are utilized, the ultimate rejection frequency of anti-aliasing filter 1814 must be in the range of 2–4 MHz. The chip rate of the preferred embodiment uses 1.2 megachips per second. This relates to an equivalent maximum Nyquist frequency of 600 KHz. This frequency may then be additionally bandwidth compressed as previously described herein. If this 600 KHz signal is then over-sampled by 3:1, then the resulting ultimate rejection frequency of the anti-aliasing filter 1814 must be at least 1.8 MHz. Again, if the sampling rate of the A/D converter 1815 is increased, then the ultimate band reject performance of the anti-aliasing filter 1814 may be relaxed. In any of these cases, it is important to consider that the amount of process gain achievable by the instant invention is 18 dB. This amount may be increased by either raising the chipping rate or by reducing the data rate. Still, any jamming signal which is present within an approximately 2 MHz bandwidth prior to despreading will become mixed with the spectral lines of the injected chip code reference signal. The jammer will be suppressed by 18 dB, but it will then be present in every spectral line separated by 20 KHz bandwidths. The anti-aliasing filter cannot reduce the effects of this situation. Since it cannot defend against these effects, then the ultimate band rejection of the anti-aliasing filter 1814 may be accordingly relaxed. It is the duty of the SAW 1811 or of equivalent filtering stages to reduce the effects of jammers which are outside of the bandwidth of the chip code reference signal (about 2–3 MHz).

The block 1815 provides a conversion of the RF signal conditioned from block 1814 to a digital form. This may be accomplished through an A/D converter or through a $\Sigma\Delta$ converter or the like. Appropriate A/D converters can be anywhere from 6 to 12 bits. If sub-sampling is used at a sample rate of 1.2 mega samples per second and the ultimate bandwidth desired is 20 KHz, then the Log base 2 of this ratio yields 6 additional bits of dynamic range performance. If this is coupled to a 6 bit A/D converter, then 12 effective bits result. Each bit yields 6 dB of additional dynamic range for a total of 72 dB of dynamic range. This dynamic range can further be augmented by the use of AGC stage 1810. As an alternative to a 6 bit to 12 bit A/D converter, a 1 bit A/D converter may be used providing it is preceded by a hard limiter stage. The tradeoff to 1 bit A/D conversion is the requirement for a substantially increased sample rate. Another cost trade-off is the use of 1 or 2 A/D converters. The previous sample rates and anti-aliasing filter requirements assume the use of I and Q resulting channels. Each one of those channels require its own A/D converter. The requirement of the I and Q and channels and their associated A/D converters may be eliminated by increasing the sample rate of a single A/D converter by 2:1. This doubling of sample rate has the further desirable effect of reducing the demands on the anti-aliasing filter 1814 proportionately. The negative effect is that the DSP must handle twice the information load. If the DSP has adequate processing power, however, then a single A/D conversion stage may be utilized and reduce the cost of the system. This is due to the fact that 8 bit convertors are typically available at low cost which provide 10 or 20 megasamples per second or more. The digital information from converter 1815 is then passed to the Digital Signal Processor. The sample clock which drives the converter 1815 typically operates at a rate equal to twice the ultimate rejection parameter of the anti-aliasing filter 1814.

As a third alternative despreading method, a parallel correlator 1816 may be utilized. The parallel correlator would receive information provided from the A/D converter 1815 and process it against a stored chip code. The parallel correlator would be clocked at 2–4 times the chip code rate. Implementation of appropriate parallel correlators are well known in the art. Reduced gate count parallel correlators are taught in Arthur et al, U.S. Pat. No. 4,977,577. The output of parallel correlator 1816 is then passed to the Digital Signal Processor. If the A/D converter 1815 uses a single bit A/D, then the parallel correlator may also be implemented from a single bit A/D. The use of single bit parallel correlation has an approximately 3 dB dilution on anti-jamming performance.

The parallel correlator 1816 can be clocked at rates less than 2–4 times the chip code rate. For example, the parallel correlator may be clocked at exactly the chip code rate. This would provide useable information on the correlator's output providing the sample clock was in proper alignment with respect to the received chip code. This proper alignment can be found by utilizing the appropriate search algorithm. The chip phase position in the parallel correlator can be thought about in the same manner as the chip code phase uncertainty during serial acquisition. The difference is that the uncertainty falls back into the same two chip correlation functions so that the total uncertainty in the coarse search is never more than +/− one chip time. This implies that the techniques as taught in FIGS. 23 and 24 are appropriate for application with a parallel correlator. These algorithms would then simply move the parallel correlator's clock in ½ chips, ⅜ chips, ⅝ chips or whatever increment is desired. This process would allow an equivalent result to that of the coarse searches as taught herein. The difference being that since the chip code uncertainty continues to remap into a two chip function, the search would occur 31–63 times faster. Once the coarse search is completed with the parallel correlator, fine search techniques may also be employed which are similar to those used in serial acquisition methods. Likewise, the above methodology can work if the sample clock is set at 2 times the chip code rate. Higher sampling rates have the advantage of increasing the effective dynamic range of whatever A/D conversion method is utilized. Upon an initial coarse search Trip, the parallel correlator clock may be phase shifted by a portion of a chip time to more finely determine the location of the correlation peak.

As a fourth alternative despreading method, the chip code may be completely resolved in the Digital Signal Processor 1817. This is further described in FIG. 20 and FIG. 21 or alternately, the despread option 1813 may be placed inside of the Digital Signal Processor providing the anti-aliasing filter 1814 and the A/D converter 1815 provide an adequately high sample clock and ultimate rejection.

Figure 19:
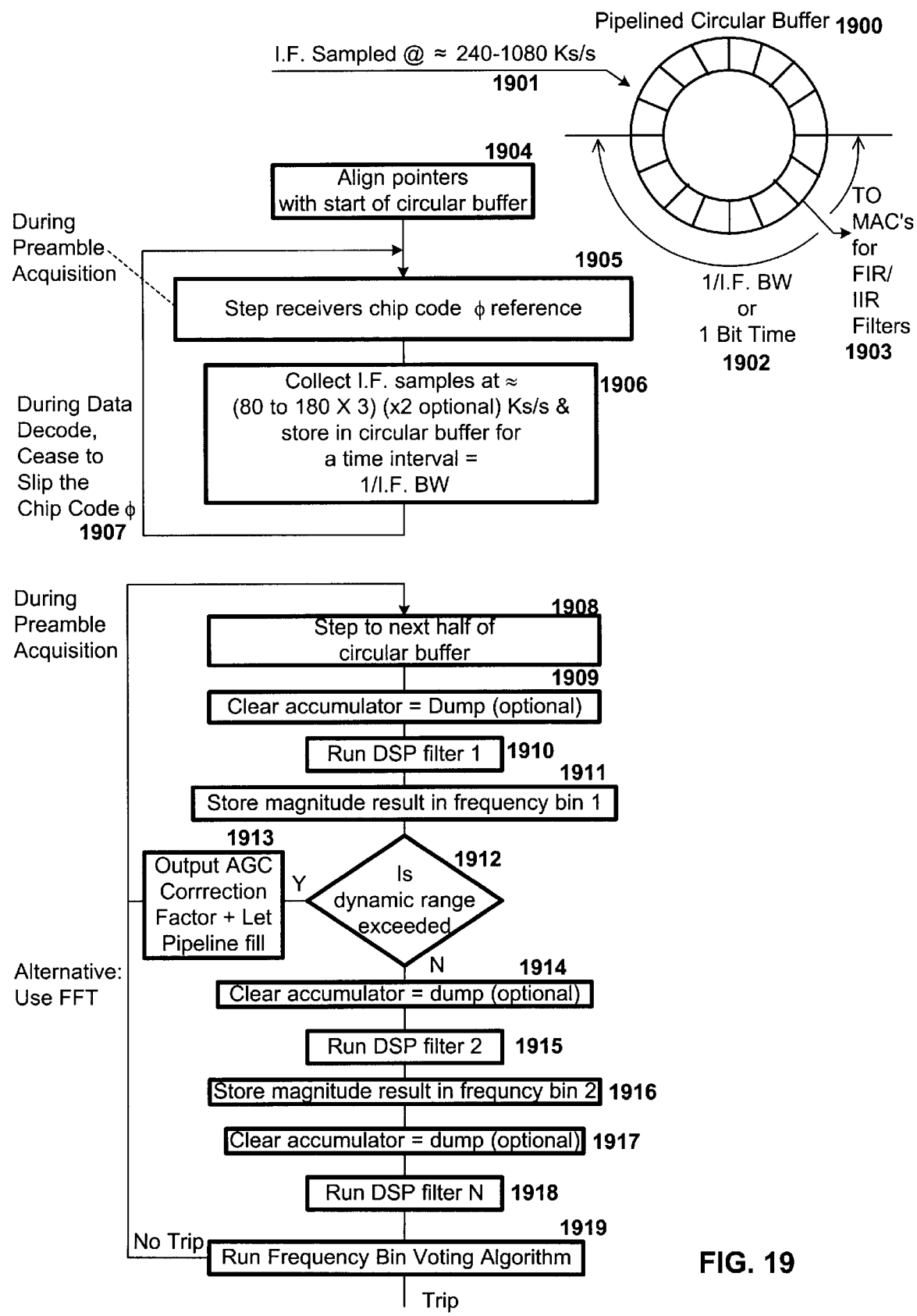
FIG. 19 is a flow diagram that shows how a circular buffer may be used to implement a receiver spreading code search algorithm.

FIG. 19—DSP Serial Code Search Receiver Algorithm

Two algorithms are accomplished simultaneously in the instant invention. One algorithm collects sampled data and stores it to a circular buffer while the other half of the algorithm analyzes the stored information. To accomplish this, circular buffer 1900 is utilized. The circular buffer is broken into two halves. One half of the circular buffer 1901 stores sampled data at a rate as low as 240 kilosamples per second or as high as 1,080 kilosamples per second. If despreading is formed within the DSP the sample rate increases to approximately 3 megasamples per second. While these samples are being stored in the circular buffer 1900, the other half of the circular buffer is being read in order to perform the multiply accumulates required by the FIR/IIR filters 1903. One half of the buffer is equal to the number of samples which can be collected in one bit time or 1/BW of the last IF 1902.

One half of the algorithm performs storage of the sampled IF information. This begins with step 1904 which aligns the appropriate pointers with the start of the circular buffer. Next, control is passed to block 1905 which steps the receiver's reference chip code phase position. This stepping only occurs during the preamble acquisition time. The code is not stepped while the data is being demodulated. This chip code may be stepped in increments of 1 chip, ½ chip, ⅓ chip or ¼ chip as is further described in FIG. 23. Next, control is passed to block 1906. This block collects IF samples at a rate of anywhere from 240 kilosamples per second up to 3 megasamples per second. Samples are stored in the circular buffer for approximately one bit time or 1/the last IF filter bandwidth. As an alternative, the storage intervals may last for less than one bit time in order to facilitate the sub-chip code stepping/averaging as described in FIG. 23. Once the preamble has been acquired, the chip code is no longer slipped, 1907.

The minimum overhead from this half of the algorithm which stores data results from 240 kilosamples per second.

240 kilosamples per second divided by the 20 million Multiply-and-Accumulates (MACs) available equals a 1.2% overhead. On the other hand, if 1080 kilosamples per second are required, then a 5.4% overhead factor results. Lastly, if 3 megasamples per second are required then this results in a 15% overhead on the DSP.

The other half of the algorithm analyzes the information which is stored in the circular buffer. During the preamble acquisition time, all of the filters in the filter banks must be analyzed in order to determine which filter may yield a signal with a desired transmission. The first step of the algorithm 1908 steps to the next half of the circular buffer. The following step 1909 clears the accumulator of the MAC. This is essentially a dump operation. The dump operation is optional, depending on what type of filter is implemented. A dump may not be required depending on the filter implementation. Next, step 1910 runs the first DSP filter 1. Once the DSP filter is run in block 1910 then the signal strength magnitude result is stored in frequency bin 1 1911. Immediately following this first frequency bin signal strength calculation is a test for overload. Block 1912 tests to see if the dynamic range provided the A/D converter has been exceeded. If this dynamic range has been exceeded, either too high or too low, then control is passed to block 1913. This block outputs a control voltage to the AGC circuit in block 1810. Once the correction factor is applied a time delay function is required in order to let the pipeline refill since the data being collected in the other half of the pipeline will also be outside of the dynamic range of the A/D converter. Control is then passed to block 1908 to resynchronize with the sampling of the circular buffer. If the dynamic range is acceptable, then control is passed to block 1914. This block optionally clears the accumulator. Next, the DSP filter #2 is run by block 1915. Step 1916 then stores the magnitude result in frequency bin 2. Next, step 1917 clears the accumulator prior to running block 1918. Block 1918 runs the "Nth" filter bin. Once all of the filter bins have been run, then the voting algorithm is invoked in block 1919. Various voting algorithms are described in here which provide a Trip output. If the voting algorithm results in a Trip then control is passed to a later portion of the algorithm as has been described in FIG. 6 and more specifically to step 605. If the voting algorithm 1919 does not result in a Trip then control is passed back to block 1908. As an alternative to running multiple filters, it is possible to perform the function in the frequency domain, for example using a fast Fourier transform, FFT, to provide the same functionality. The FFT must provide the same point-to-point isolation as required by the multiple filters. The frequency resolution of the FFT must be equal to or better than the channel separation of the multiple filters.

As a cross check, the above algorithm must be able to execute faster than a bit time, including the overhead required by the IF sampling. The above algorithm can run in 24.1 microseconds. Even with a 15% overhead, this is substantially less than the bit time (50 microseconds) which the voting decision must be accomplished in.

| | |
|---|---|
| 180 KHz | Frequency Uncertainty (max) |
| X3 | Oversampling for anti-aliasing filter |
| X2 | For single A/D converter |
| 1,080 KS/s | |
| 54 | Samples in 1 bit time, 50 μs |
| | (54 tap to yield 16 dB of cochannel rejection) |
| 54 | Taps |

-continued

| | |
|---|---|
| | 8 filter banks |
| 432 | MAC's for 8 filter banks |
| 50 | Misc. Overhead |
| 482 | Total MAC's per bit time |
| x50 ns | DSP instruction time |
| 24.1 μs | < must be less than a bit time (50 μs) |

FIG. 20—Three Functions Combined into One Hybrid Coefficient Set

Figure 20A:
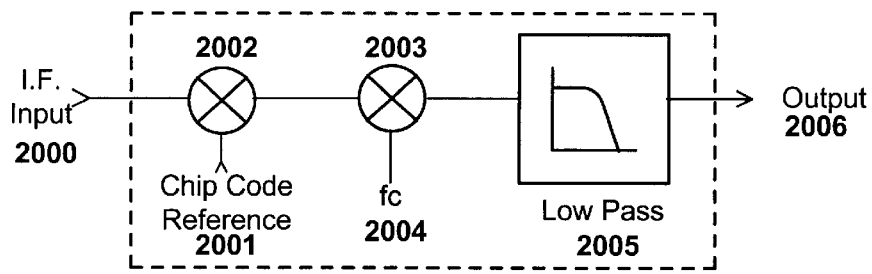
FIGS. 20A, 20B, 20C, 20D, 20E and 20F are illustrations of how multiple functions may be combined into a single set of hybrid coefficients.
Figure 20B:
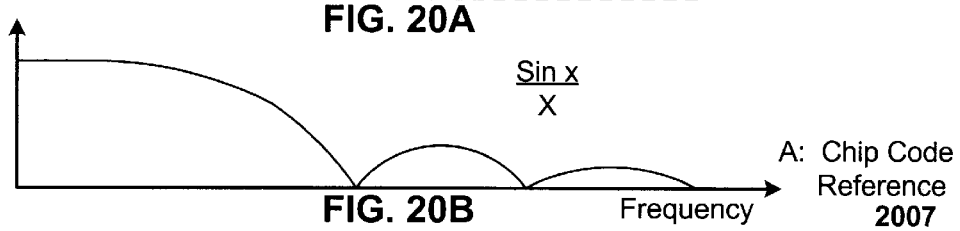
Figure 20C:
Figure 20D:
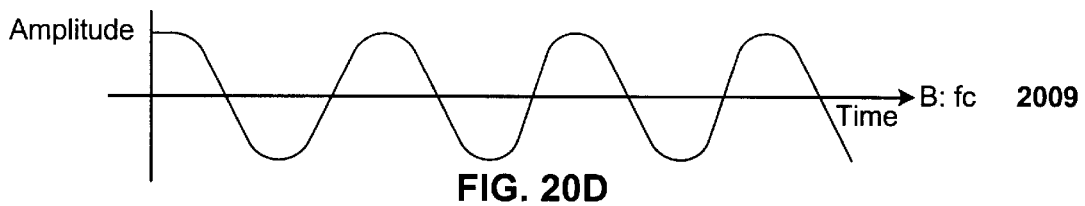

A DSP processor may serve to simultaneously resolve both chip code phase ambiguity as well as frequency ambiguity. In order to facilitate this functionality, a hybrid coefficient set must be created. A discrete implementation would require the following three functional blocks. First, as shown in FIG. 20A, an IF input 2000, which consisted of both the unspread received signal along with its frequency ambiguity, would be introduced into mixer 2002. Mixer 2002 would be injected with a chip code reference 2001. This chip code reference is shown in the frequency domain as 2007, as shown in FIG. 20B. It is also shown, in FIG. 20C, in the time domain as a sequence of chip code 1's and 0's as 2008. The spectrally compressed output of mixer 2002 is then input into mixer 2003. Mixer 2003 is injected with the center frequency of the desired signal 2004. This injected signal $F_c$ is depicted in the time domain 2009. The output of mixer 2003 now has a spectral output with a center frequency of 0 Hz. This allows a low pass filter 2005 to essentially accomplish a bandpass function. The bandpass function is shown in FIG. 2010 in the frequency domain. The resulting output of low pass filter 2005 is then provided as an output 2006 to be used for signal strength evaluation or envelope detection.

Figure 20E:
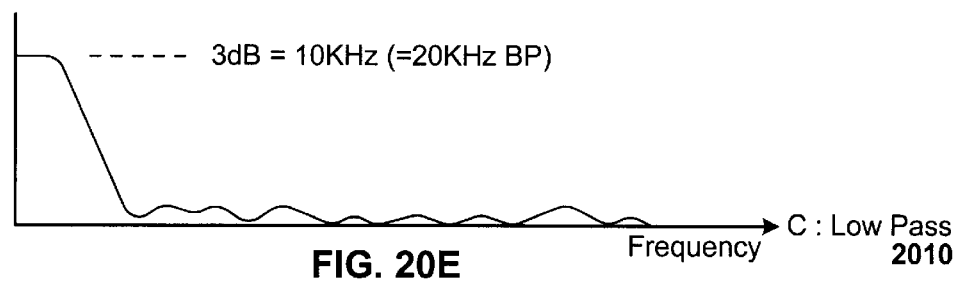
Figure 20F:
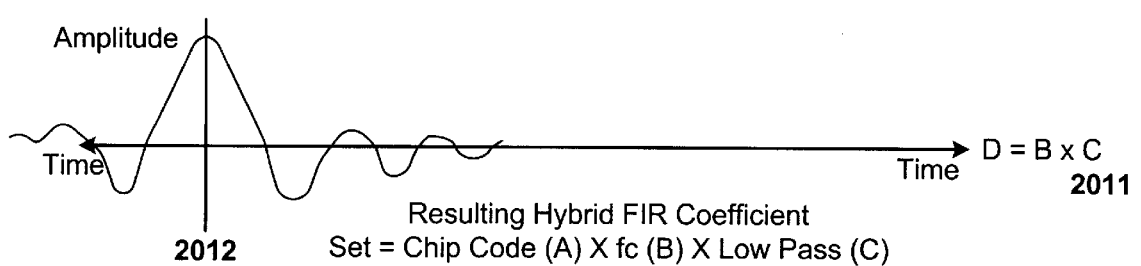

These three functions may be combined into a single coefficient set which can be used by a Digital Signal Processor to simultaneously perform all three functions. This is typically done by convolving the sin wave as shown by waveform 2009 in FIG. 20D with the Fourier coefficients created from the frequency response of the low pass filter 2010, as shown in FIG. 20E. This time domain result becomes the coefficient set which is convolved with an input signal to be processed. Alternatively, the chip code reference signal 2001 may also be combined in order to yield the hybrid coefficient set 2012 and illustrated by 2011 in FIG. 20F. The hybrid coefficient set 2012 is time domain coefficients representing the product of the Chip Code Reference 2007, the center frequency 2004, and the low pass function 2010. The resulting coefficient set may be directly convolved with an incoming IF input 2000 and the result is the output 2006.

During the time in which the spread spectrum chip code phase is being acquired, the chip code reference 2008 may be further enhanced. This enhancement would build in a chip code offset within the center of the coefficient table such as to accomplish the technique as described in FIG. 23 and FIG. 24. This code slipping and integrating would have to be eliminated after the chip code phase was established. This could be done with an alternate coefficient set which did not have the sub-chip code phase slips inserted.

Figure 21:
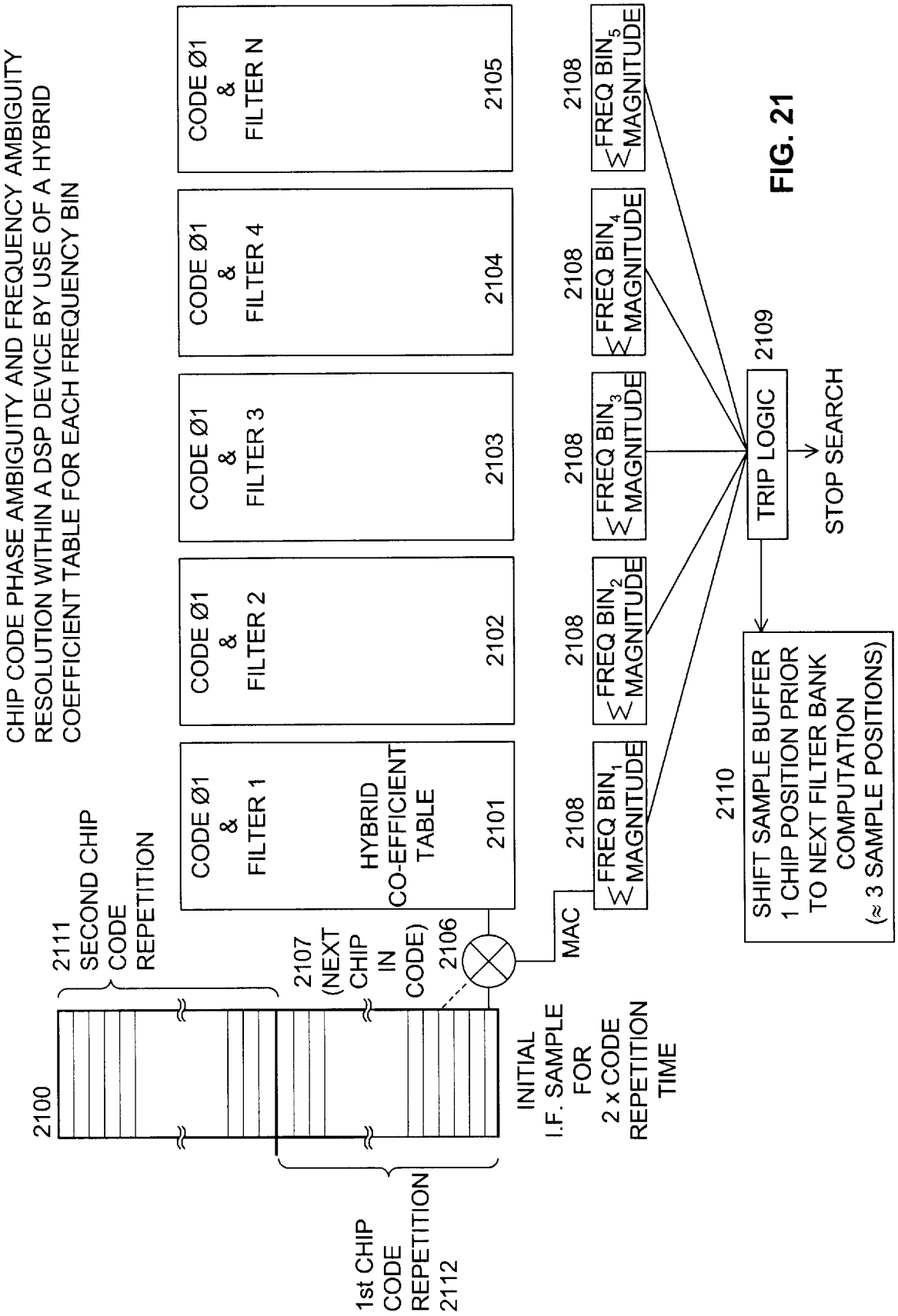
FIG. 21 is a block diagram showing how hybrid coefficient tables are used in the present invention to resolve both chip code phase ambiguity and frequency ambiguity of the received signal.

FIG. 21—Chip Code Phase Ambiguity and Frequency Ambiguity Resolution Within a DSP Device by Use of a Hybrid Coefficient Table for Each Frequency Bin A data input buffer 2100 would be established to store samples from the receiver's last IF stage. These samples would be made over a period of time equal to two chip code repetitions. In systems where a chip code repetition is equal to a bit time, then this would equal two bit times. Alternatively, the samples could be taken for a period of time equal to twice the last IF filter's response time. This last IF filter would be those contained in the DSP hybrid coefficient tables 2101 through 2105. The rate at which the data is sampled and stored in this buffer 2100 is determined as per the previous text contained herein. Each one of the samples in table 2100 is then multiplied by the coefficients stored in table 2101. The multiply is accomplished via a multiply accumulate instruction which is depicted as 2106. The multiply accumulates are then computed for the entire coefficient table 2101. Once the last coefficient has been multiplied by its respective entry in table 2100, the accumulator is left with a magnitude result. This magnitude result is stored in 2108 for later use by the Trip logic contained in block 2109. Next, the coefficient table 2100 is multiplied by the hybrid coefficient table 2102. Again, the final result from the multiply accumulate process 2106 is stored in its respective frequency bin magnitude register 2108. This same process is repeated for hybrid coefficient table 2103, then 2104, and finally 2105. There must be a coefficient table set for enough frequency bins to resolve the frequency ambiguity which may exist between the transmitter and receiver. Once this first set of magnitudes is established the Trip logic 2109 decides whether to stop the search or to cause a chip code phase shift 2110. This chip code phase shift may be accomplished by several means. It is possible to start the next multiply accumulate between hybrid coefficient table 2101 and the sample buffer 2100, one chip time delayed in the sample's buffer 2100. This is as indicated by 2107. If the IF is sampled at 3 times the chip code rate, then by offsetting the pointer into table 2100 by 3 storage locations, effectively one chip code time will have been delayed. This will effectively cause a search for chip code phase agreement, once the hybrid coefficient tables 2101 through 2105 have been rerun and the Trip logic 2109 executed. Once again 2110, if the algorithm does not Trip then the chip code phase position must again be slipped. Upon the search of the 63rd chip code phase position, the second code repetition in table 2100 stored in 2111, will be fully utilized during the subsequent multiply accumulate operations. Alternately, the chip code phase position search could be accomplished by rotating the portion of the sample table 2100 noted as 2112 by a number of samples equal to one chip time. As a further alternative during the preamble synchronization acquisition, the chip code phase could be shifted in the middle of the table 2112. This would have the effect of causing a partial chip code phase shift. Such a shift code phase shift could be used to implement the algorithms described in FIGS. 23 and 24. These algorithms call for a partial chip code phase shift in the middle of a bit sample time. As a further alternative, this mid-table offset could be built into the hybrid coefficient tables 2101 through 2105 and yield a similar result. This sub-chip time offset cannot be used during the data demodulation time. Once every hybrid coefficient table/filter bin 2101–2105 has been computed in combination with every chip code phase position, then the process is repeated whereby two more code repetitions are stored from the IF into table 2100. The entire process then repeats itself. The above computation takes a period of time equal to the number of hybrid coefficient tables times the number of samples contained in the buffer portion noted as 2112, times the number of chip code positions searched, times 2 if two antenna positions are being searched per the algorithm as per the antenna diversity algorithm described in FIG. 25, times the speed of a multiply accumulate instruction plus the overhead of data sampling and miscellaneous decision making. This time must be equal to or less than the time for which the transmitted preamble is sent. Increased multiply accumulate instruction speed can therefore reduce the required on air time of a transmitted preamble. Lastly, it should be noted that once a chip code phase position and frequency bin are selected by Trip logic 2109, then there will be another chip code phase offset which must be compensated for. This phase offset is the result of the time between which the data was sampled and stored in buffer 2100 and which the computation and Trip decision were completed. These are fixed offset times and can be compensated for by a phase adjustment in the chip code reference prior to data demodulation. Once data is being demodulated, then a single hybrid coefficient table may be used to both despread the received signal and provide the required filtering to match the bandwidth of the modulated data.

The algorithm, when using this technique, is essentially the same as that described in FIG. 6, wherein the step 601 in FIG. 6 is replaced by the multiply accumulates of the associated filter banks 2101–2105.

If the result of the filter's signal strength magnitude exceeds the dynamic range of the system (A/D converter) then one or two new bit samples must be taken prior to computing the remaining hybrid coefficient tables. This contingency can be allowed for by adding two or three bit times to the transmitted preamble.

Figure 22:
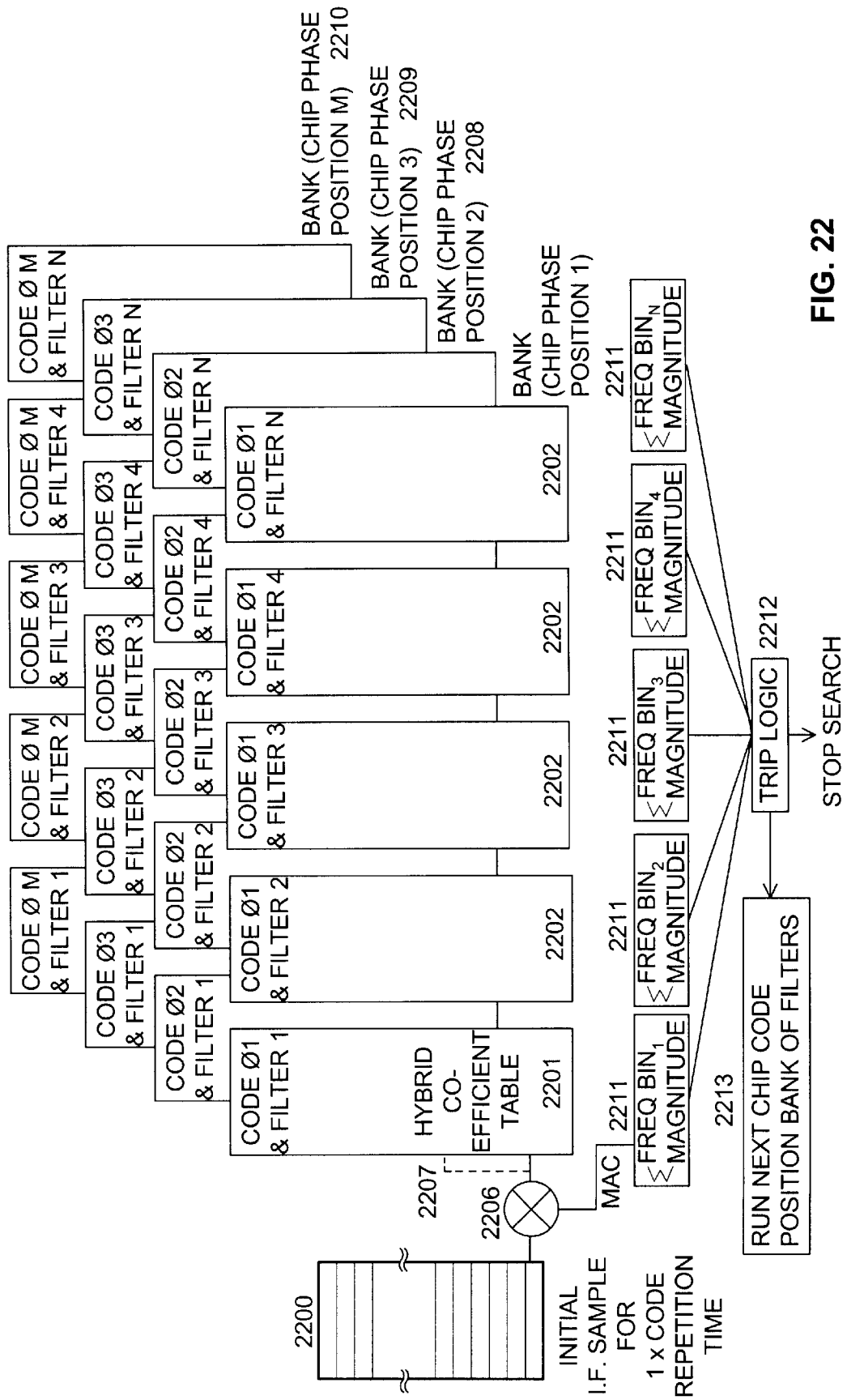
FIG. 22 is another block diagram showing how hybrid coefficient tables are used in the present invention to resolve both chip code phase ambiguity and frequency ambiguity of the received signal.

FIG. 22—Phase and Frequency Ambiguity Resolution by Use of One Hybrid Coefficient Table for Each Phase Frequency Combination The IF is sampled for a period of time equal to one code repetition time or one bit time or 1/BW of the last IF filter as implemented in the hybrid coefficient tables 2201–2205. These initial IF samples are stored in buffer 2200. Next, multiply accumulates 2206 are performed between the buffer 2200 and the hybrid coefficient tables 2201–2205. The respective result of the multiply accumulates from each hybrid coefficient table are then stored in their respective frequency bin magnitude register 2211. The output of the frequency bin magnitude registers 2211 are provided to the Trip logic 2212. If a signal is found likely to result in a valid message, then the chip code search is stopped. If a likely signal is not identified then control is passed to block 2213. This block is responsible for shifting the chip code phase position. This is accomplished by selecting the next bank 2208 of filters. In this case the multiply accumulates are made between the buffer 2200 and the next filter bank 2208 via the connection depicted as 2207. This process is continued until all of the filter banks 2209 through 2210 have been computed, unless a chip code phase match and frequency match is found prior to the completion of all hybrid coefficient tables.

Again, the hybrid coefficient table can be created such that it provides for the sub-chip code time slip in the middle of a sampled bit as per the descriptions in FIGS. 23 and 24. The rest of the technique is the same as that described under FIG. 21.

FIGS. 23A, 23B, 23C, 23D and 23E—Chip Code Stepping Schemes to Improve Preamble Acquisition at MDS Code search during the MDS condition presents unique problems. Ordinarily. the correlation function can be detected over a two chip time period. If MDS detection resulting from a 6 dB carrier-to-noise ratio is desired, then the portion of the correlation function which may be seen above the noise floor can only be seen over a one chip duration. Therefore, coarse searches which increment the chip code phase position in one or more chip increments, can straddle the portion of the correlation function which is above the noise floor and fail to detect the signal. This means that some portion of these code searches will be blind to MDS signals which have a 6 dB carrier-to-noise ratio. Converting the coarse chip code search to ½ chip increments improves the situation but still can lose 2.5 dB of the signal during acquisition.

The code search step direction is shown as 2300. The noise floor at MDS is assumed to require at least a 6 dB carrier-to-noise ratio, 2301. A 63 chip code yields an 18 dB correlation peak 2302. The resulting dB loss from chip code phase error is determined by the equation 2304. A ⅛ chip phase error results in a 1.16 dB signal loss 2307. A ¼ chip phase error results in a 2.5 dB signal loss, 2305. A ½ chip error results in a 6 dB signal loss shown as 2306.

Figure 23A:
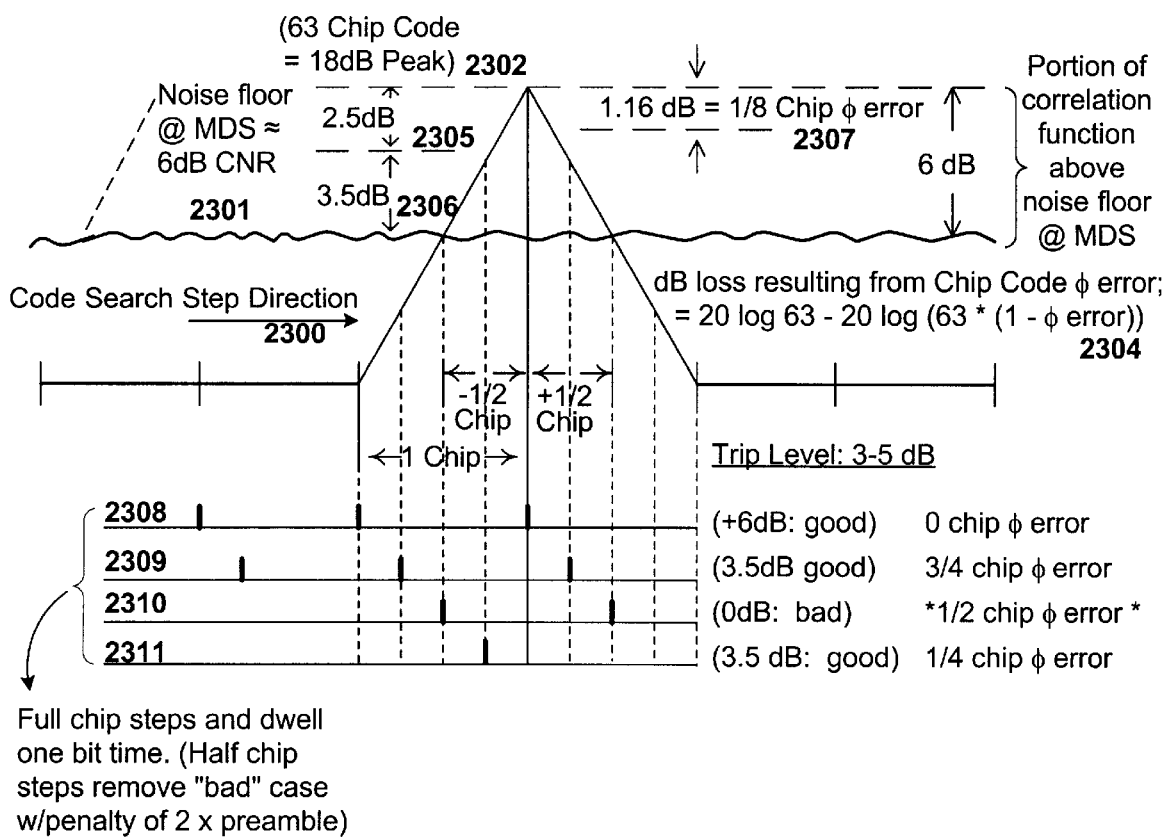
FIGS. 23A, 23B, 23C, 23D and 23E are diagrams showing how fraction chip code phase error can result in loss of receiver sensitivity.
Figure 24:
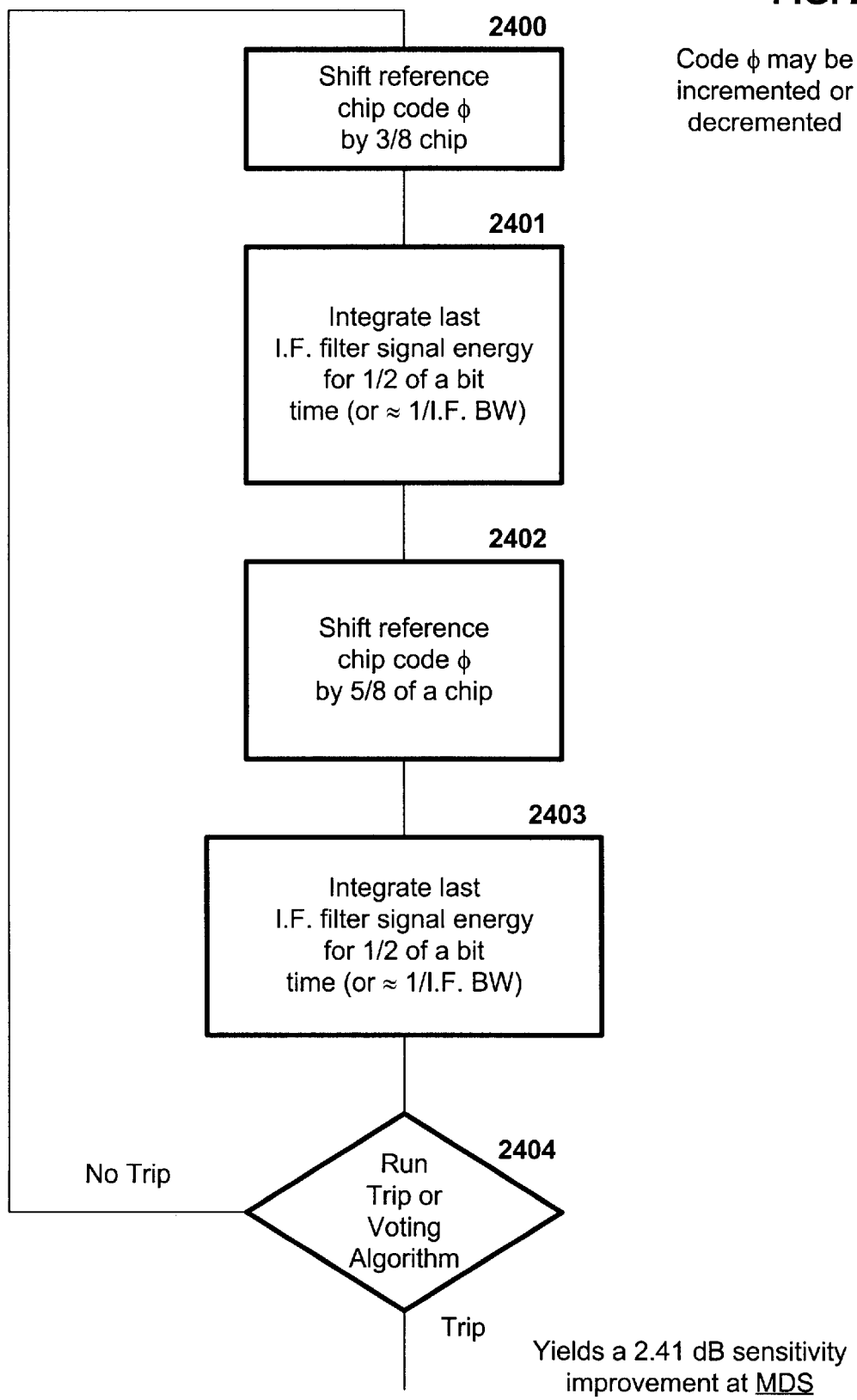
FIG. 24 is a flow diagram showing an enhanced chip code alignment algorithm.

FIG. 23A illustrates signal strength resulting from full chip step searching of chip code phase alignment. 2308 shows the coarse search finding the correlation peak yielding a full 6 dB signal. 2309 shows an initial ¾ chip phase error which on the subsequent sample becomes ¼ chip phase error yielding a 3.5 dB signal. If the Trip Level is set at 3 dB then this will be adequate to initiate a fine search in the rest of the previous algorithm. 2310 shows a ½ chip phase error which straddles the correlation function at the noise floor yielding a 0 dB outcome. This best indicates the dilemma of code acquisition at MDS. 2311 shows a ¼ chip phase error resulting in a viable 3.5 dB signal.

Figure 23B:
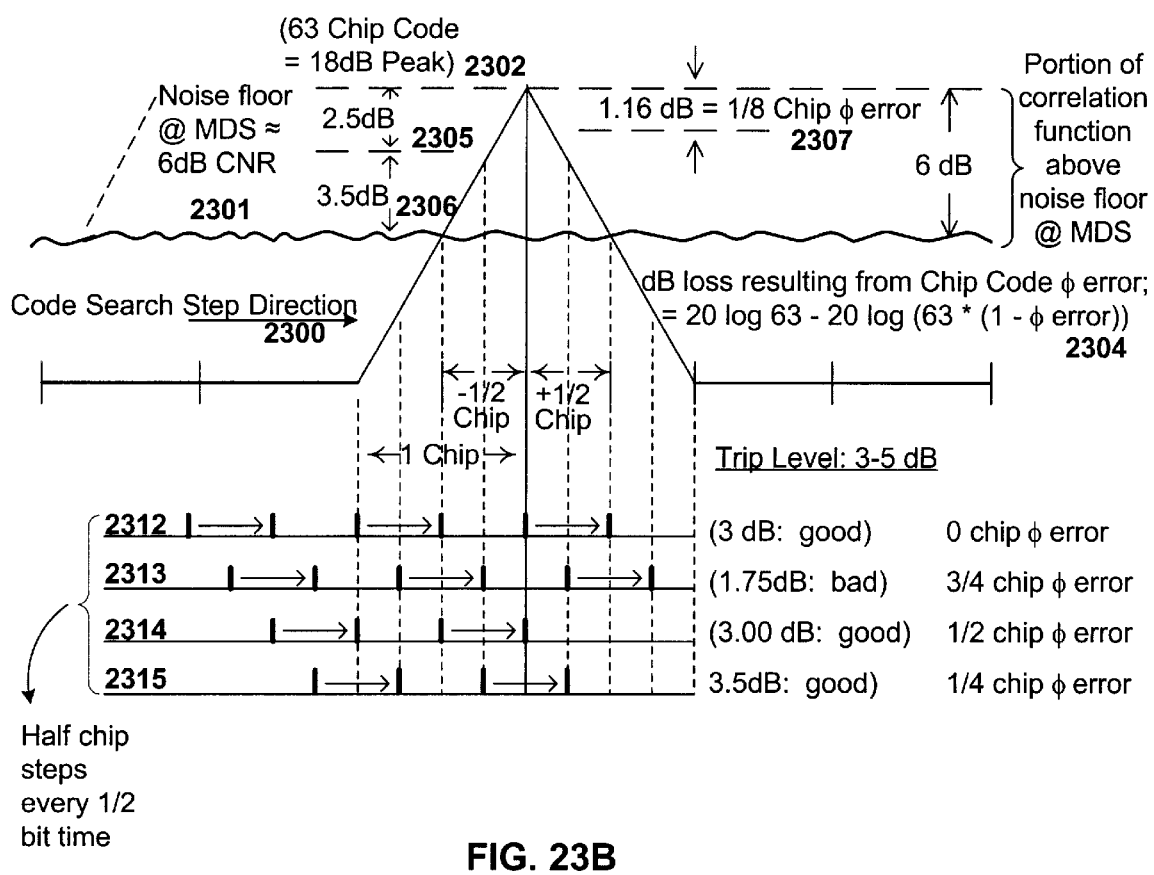

The next scheme illustrates breaking the coarse search into two different portions during a single bit time. The chip code phase is increased by ½ of a chip. The signal energy is then integrated for ½ of a bit time. The chip code phase is again incremented by ½ of a chip. Finally, the second half of the bit's energy is integrated. The resulting average between the two halves is then used to supply the result. FIG. 23B illustrates signal strength resulting from ½ chip step searching of chip code phase alignment; 2312 indicates a zero chip phase error providing a 3 dB result. 2313 indicates a ¾ chip error yielding a 1.75 dB result. This result would not be adequate to trip the voting algorithm. 2314 indicates a ½ chip error resulting in a 3 dB signal, adequate to trip the algorithm. 2315 shows a ¼ chip error resulting in a 3.5 dB signal. This scheme provides a 1.75 dB improvement over an ordinary coarse search as indicated by 2308–2311.

Figure 23C:
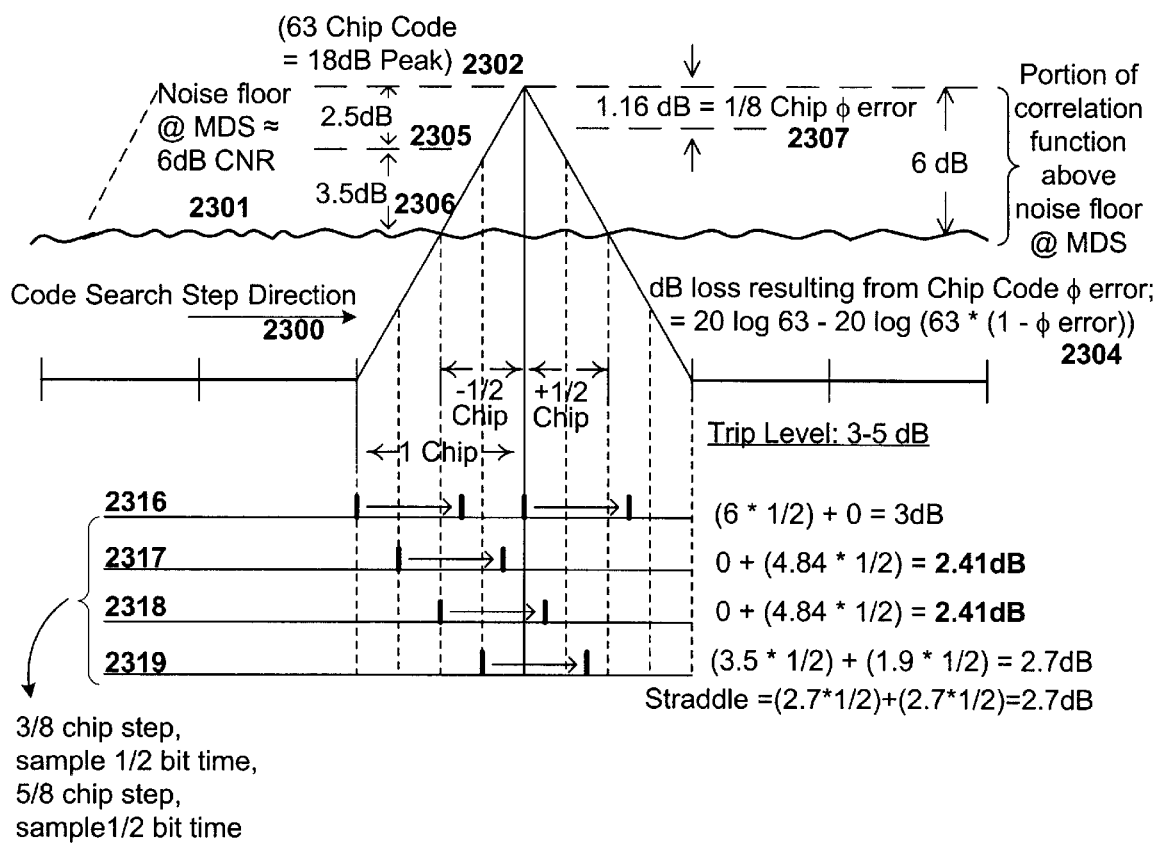

The next scheme initiates a chip code search with a ⅜ chip step that then integrated for ½ of a bit time where upon it forces a ⅝ chip step then samples for ½ of a bit time. FIG. 23C illustrates signal strength resulting from ⅜ chip step searching of chip code phase alignment. 2316 indicates a zero chip phase error resulting in a 3 dB signal. 2317 is based on a ¾ chip error resulting in a 2.41 dB signal. 2318 assumes a ½ chip phase error resulting in a 2.41 dB signal. 2319 assumes a ¼ chip phase error resulting in 2.7 dB signal. In this scenario, the worst cases are 2317 and 2318 whereby the second bit time provides all of the signal energy available. A reduction in the ⅝ chip steps brings either 2317 lower than the leading edge of the correlation function. At the same time, widening the ⅝ interval has a negative effect on 2318 whereby the second sample is lowered down the trailing edge of the correlation function reducing the resulting signal. It should also be noted that in the case 2319 if the signal points were to equally straddle the correlation function, the result is the same 2.7 dB. The algorithm in 2316–2319 provides a 2.41 dB improvement over the conventional full chip acquisition scheme of 2308–2311. The ⅜ chip then ⅝ chip scheme is used in the preferred embodiment. It should also be noted that two samples work equivalently well as evenly distributed multiple samples over the same interval.

Figure 23D:
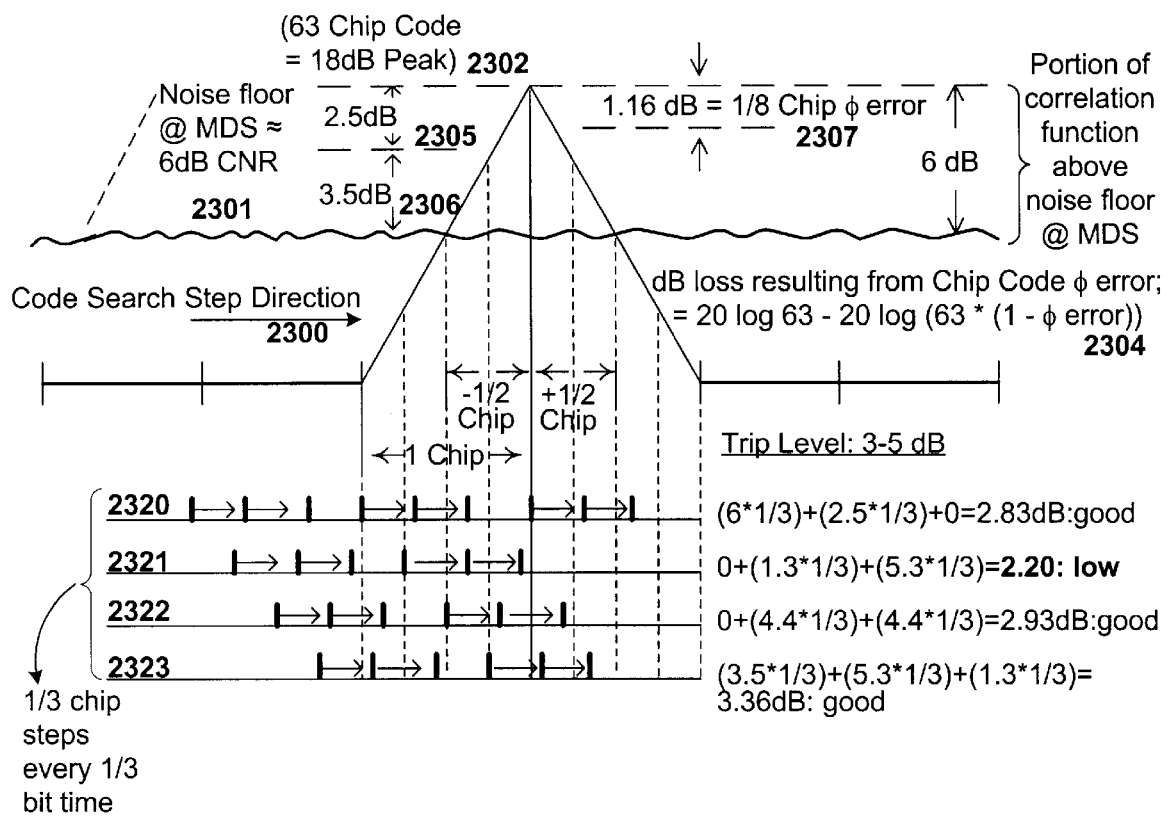

The following scheme steps in ⅓ chip increments every ⅓ of a bit time. FIG. 23D illustrates signal strength resulting from ⅓ chip step searching of chip code phase alignment. 2320 with a zero chip phase error yields a 2.83 dB signal. 2321 with a ¾ chip phase error yields a 2.2 dB improvement. 2322 with a ½ chip phase error yields a 2.93 dB signal. 2323 with a ¼ chip phase error yields a 3.36 dB signal.

As a further alternative to the above techniques, it is not necessary to cause a full chip step increment for each coarse search. Note that by utilizing a conventional coarse search with ½ chip step sizes, results in a 3.5 dB improvement. It essentially eliminates case 2310 in the full chip coarse search scenario with a penalty of an increase of 2:1 in the preamble time. The following discloses a technique which increases the preamble time by 25% as opposed to 2:1 while yielding a 3.17 dB improvement over conventional full chip coarse search.

Figure 23E:
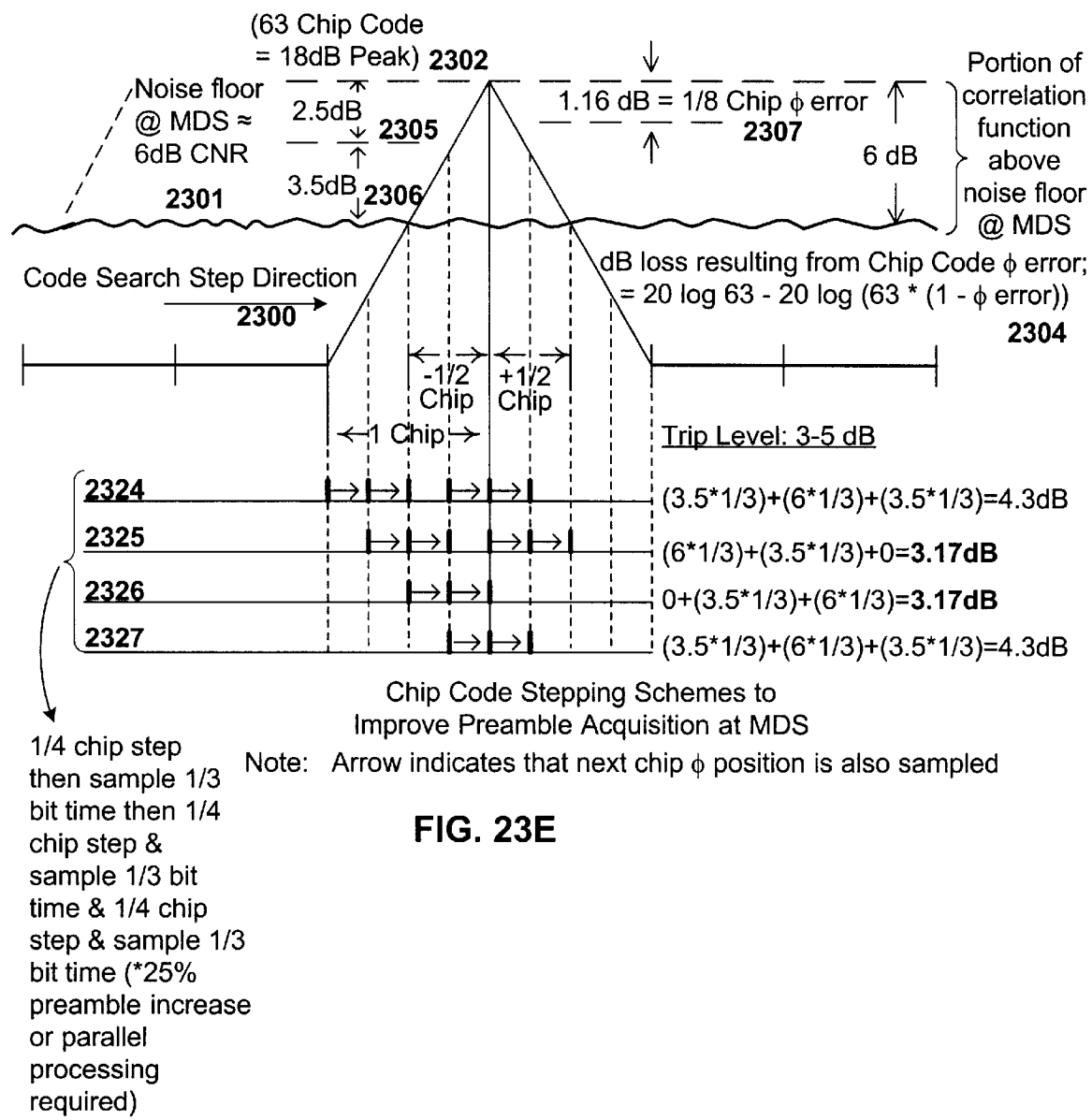

The chip code is stopped ¼ of a chip then sampled for ⅓ of a bit time. Then it is moved ¼ of a chip and sampled for ⅓ of a bit time and finally moved for another ¼ chip step and sampled for ⅓ of a bit time. This effectively causes the coarse search to move in ¾ chip increments causing a 25% increase in preamble time or forcing the requirement of parallel processing techniques as those described in the instant invention. This technique also works equivalently well when the middle sample is removed and the first and last samples taken over ½ of a bit time. FIG. 23E illustrates signal strength resulting from ¼ chip step searching of chip code phase alignment. 2324 shows a zero chip phase error resulting in 4.3 dB. 2325 shows a ¾ chip phase error resulting in a 3.17 dB improvement. 2326 shows a zero dB chip phase error resulting in a 3.17 dB improvement. 2327 indicates a ¼ chip phase error resulting in a 4.3 dB signal.

The above schemes or the equivalents thereof may be used to increase the sensitivity of any direct sequence serial correlating receiver as well as that taught in the instant invention.

FIG. 24—Enhanced Chip Code Alignment Search Algorithm

The following algorithm implements the processes taught in FIG. 23. The illustration given is for one of the scenarios in FIG. 23 which is used in the preferred embodiment. Any of the techniques taught in FIG. 23 or the equivalent thereof may be implemented using the following steps.

The first step 2400 shifts the reference chip code phase by ⅜ of a chip. This is the search for the next code alignment position. Conventionally, this initial shift would be one whole chip time in a coarse search. Step 2400 essentially uses the ⅜ chip step to complete a full chip step which had previously been initiated in step 2402. Therefore, the full coarse search of the chip code phase ambiguity may be searched in a period of time equal to the number of chips in the code times 1/settling time of the last IF filter.

Step 2401 then integrates the signal from the last IF filter for a period of ½ of a bit time or approximately 1/last IF filter's bandwidth. Next, control is passed to block 2402. This block shifts the reference chip code phase by ⅝ of a chip. Next, block 2403 integrates the energy from the last IF filter for ½ of a bit time or 1/last IF filter's bandwidth. The effect of steps 2401 through 2403 is to integrate the energy contained in the signal over a wider chip code phase uncertainty of the correlation function. This averaging reduces the signal dips which are the effect of coarse chip code phase searches. Next, the control is passed to block 2404 which runs a Trip algorithm or a voting algorithm as described herein. If no Trip is detected, then control is passed to 2400. If a Trip is detected then control is passed to the remainder of the algorithm as described herein.

The above algorithm and method yield a 2.41 dB sensitivity improvement for signals being received at their minimum detectable level, without the penalty of increased transmitted preamble time. The technique described above is applicable to any direct sequence serial acquisition system as well as to the instant invention.

Figure 25:
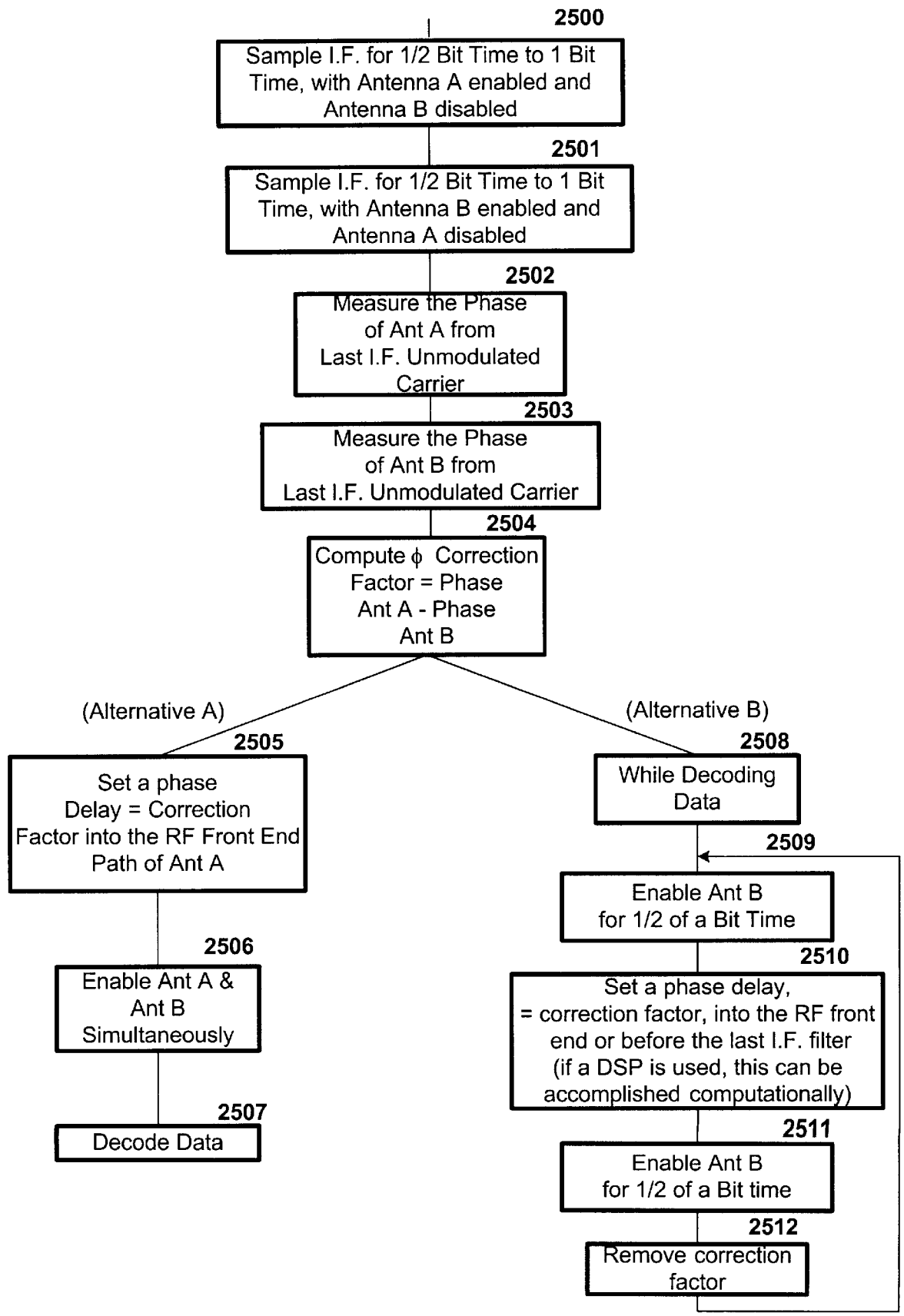
FIG. 25 is a flow diagram showing an antenna diversity phase optimization algorithm.

FIG. 25—Antenna Diversity Phase Optimization Algorithm

Block 2500 samples the IF filter for one half of a bit time to one bit time while only antenna A is enabled. Block 2501 samples the IF for one half of a bit to one bit time with only antenna B enabled. Block 2502 measures the phase of antenna A, preferably while the carrier is unmodulated. Block 2503 measures the phase of antenna B preferably while the carrier is unmodulated. Block 2504 computes a phase correction factor. This phase correction factor is the result of subtracting the phase of antenna B from the phase of antenna A. In alternative A, block 2505 sets a phase delay equal to the correction factor to be inserted in the RF front-end path of antenna A. The purpose of the correction factor is to align the resultant phase of antenna A with that of antenna B. Once the phases of both antennas are made the same, beneficial results occur from constructive interference. Block 2506 enables both antenna A and antenna B simultaneously. Finally, block 2507 decodes data with the benefit of a fade minimized signal.

Alternative B starts with block 2508, which indicates that data is being decoded while the following algorithm occurs. Block 2509 enables antenna B for one half of a bit time. Block 2510 sets a phase delay equal to the previously computed correction factor into either the RF front-end or anywhere prior to the last IF filter. If a DSP approach is used, this phase delay may be accomplished computationally within the DSP. Block 2511 then enables antenna B for one half of a bit time while block 2512 removes the previous correction factor. Control is then returned to block 2509. Steps 2509 through 2512 are continued through the duration of data demodulation. The above algorithm is applicable to any radio system which provides phase adjustment means, as well as to the instant invention.

As an alternative to the above algorithm, antenna A and antenna B may be 50% duty cycled regardless of their resulting signal strength and phase. As a second alternative, the above algorithm can measure signal strength in steps 2502 and 2503, and simply use the strongest of the two antennas for the data demodulation portion of the algorithm.

As a further alternative to the above, the algorithms described in FIG. 21 and FIG. 22 may be used to determine carrier phase and/or signal amplitude from antenna A and antenna B. Once this is established, the above algorithm or any of the alternatives may be used in order to enhance the fading performance of the system. In the preferred embodiment, the sample buffers 2200 are doubled in length, whereby half of the samples taken are from antenna A and the other half are taken from antenna B. In this manner, the algorithms described in FIG. 21 and FIG. 22 may determine which one of the two antennas is preferable. This is done at a 2:1 increase in multiply accumulates and resulting processing time. This added time is noted in the System Performance with DSP Approaches Table.

It can now be understood that the above-described invention provides several advantages. The primary advantage is that the above-described direct sequence spread spectrum system operates in a manner that provides enhanced acquisition speed and/or enhanced sensitivity. The direct sequence spread spectrum system accomplishes this advantage by, for example, avoiding searches over multiple frequencies for extended periods and by avoiding searches using a filter BW wider than that necessary to demodulate the transmitted information.

Further, in a particular embodiment, the present invention may provide the advantage of increasing the realizable sensitivity during the search time of the transmitted preamble without requiring an increase in the preamble duration.

Still further, in another particular embodiment, the present invention may provide the advantage of increasing the sensitivity of a direct sequence spread spectrum reception during the period when the transmitted data is being demodulated.

Yet further, in another particular embodiment, the present invention may provide the advantage of increasing the effective process gain achieved by the direct sequence spread spectrum receiver.

Further, in still another particular embodiment, the present invention may provide the advantage of decreasing the preamble time required by a direct sequence spread spectrum system.

Further, in yet another particular embodiment, the present invention may provide the advantage of reducing the transmitter and receiver crystal accuracy required to yield reliable performance over a given operating temperature range for a direct sequence spread spectrum system.

Still further, in yet another particular embodiment, the present invention provides a system that corrects for chip code alignment drift due to frequency offset between a transmitter crystal reference and a receiver crystal reference.

Further still, in yet another particular embodiment, the present invention provides a means to enhance the performance of antenna diversity when used with a direct sequence spread spectrum receiver.

Further yet, in another embodiment, the present invention provides a system that operates to reduce the effects of jamming and of impulse noise on a receiver by means of a spread spectrum acquisition algorithm.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A direct sequence spread spectrum system, comprising:
   a transmitter configured to transmit a direct sequence spread spectrum signal that includes a carrier frequency modulated by a direct sequence chip code, a phase synchronizing preamble, and modulating information; and
   a receiver configured to receive the transmitted direct sequence spread spectrum signal with both chip code phase uncertainty and frequency uncertainty between the carrier frequency of the transmitter and a local reference frequency of the receiver and to demodulate the modulating information, comprising,
      a despreader which despreads the received direct sequence spread spectrum signal to produce a despread signal,
      a plurality of parallel filters having adjacent bandpass ranges, each parallel filter having the despread signal applied thereto and each parallel filter having a bandwidth less than said frequency uncertainty,
      an operator mechanism configured to detect outputs of said parallel filters and to select a parallel filter based on the detected parallel filter outputs to resolve said carrier frequency uncertainty, and a demodulator configured to demodulate data having a data bandwidth at the output of the selected filter.

2. The system according to claim 1, wherein the bandwidth of each of said plural parallel filters is matched to a bandwidth of the modulated information.

3. The system according to claim 1, wherein each of the plurality of parallel filters has a bandwidth less than the data bandwidth during demodulation.

4. The system according to claim 1, wherein each of the plurality of parallel filters has a bandwidth less than or equal to approximately one half of the carrier frequency uncertainty.

5. The system according to claim 1, wherein each of the plurality of parallel filters has a bandwidth in a range of approximately one tenth to one half of the carrier frequency uncertainty.

6. The system according to claim 1, wherein the despreader comprises:
   a code reference generator configured to provide a chip code, and
   a mixer for mixing said chip code and a frequency converted direct sequence spread spectrum signal received at an output of a frequency conversion stage to produce the despread signal provided to the plurality of filters.

7. The system according to claim 1, wherein said demodulator demodulates at least one of voice and data from the output of the selected filter.

8. The system according to claim 1, wherein said operator mechanism selects one of said plurality of parallel filters having a strongest signal level above a predetermined minimum level.

9. The system according to claim 1, wherein said operator mechanism detects at an output of each of the plurality of parallel filters at least one of a) signal strength, b) quieting, c) phase lock, and d) signal quality.

10. The system according to claim 1, wherein the operator mechanism comprises a calculator configured to calculate an average signal strength of outputs of said plurality of parallel filters with at least one of a highest and a lowest signal strength eliminated from calculation of the average, and selects a filter having an output signal strength exceeding the calculated average by a predetermined margin.

11. The system according to claim 1, wherein said operator mechanism selects a filter based on outputs of parallel filters having stronger signal levels by a predetermined margin than outputs of others of said parallel filters.

12. The system according to claim 1, wherein the plurality of parallel filters comprise a Fourier transform mechanism configured to detect signal strengths of discrete frequency ranges based on a data bandwidth and covering a total bandwidth at least as large as said frequency uncertainty.

13. The system according to claim 1, wherein the receiver further comprises a plurality of envelope shaping devices coupled between the despreader and the plurality of filters and configured to reduce impulse effects on signals passed by filters adjacent to the selected filter.

14. The system according to claim 1, wherein the despreader comprises a parallel correlator.

15. The system according to claim 14, wherein the parallel correlator includes a clock input which receives a parallel correlator clock clocked at a chipping rate.

16. The system according to claim 14, wherein said parallel correlator comprises a correction mechanism configured to correct a parallel correlator clock in time by a portion of a chip duration.

17. The system according to claim 1, wherein the receiver further comprises:
   a frequency reference device that provides a frequency reference for mixing with incoming signals;
   a temperature measurement device for providing a temperature of said receiver;
   a frequency reference correction device for calculating a frequency correction factor based on said temperature; and
   a drift correction device for providing a frequency drift correction factor to said frequency reference device based on said temperature.

18. The system according to claim 1, wherein the receiver further comprises:
   a jamming warning mechanism configured to provide a jamming warning when a majority of the plurality of filter outputs simultaneously exceeds a predetermined signal strength.

19. The system according to claim 1, wherein said operator mechanism is configured to interpolate a frequency between outputs of adjacent ones of said filters having predetermined signal strengths based on a ratio of received signal energies between the adjacent filter outputs and selects the output of a filter centered at the interpolated frequency.

20. In a direct sequence spread spectrum system for receiving a direct sequence spread spectrum signal with both chip code phase uncertainty and frequency uncertainty between a carrier frequency of a transmitter transmitting said direct sequence spread spectrum signal and a local reference frequency utilized by a receiver, the receiver comprising:
   a despreader configured to despread a received direct sequence spread spectrum signal, comprising,
      a memory configured to store tables of coefficients, each said table of said coefficients being a product of a respective chip code sequence and at least one respective bandpass filter characteristic and a lowpass filter characteristic, each bandpass filter characteristic being one of a plurality of adjacent frequency filter characteristics,
      a multiplier configured to multiply in parallel the received direct sequence spread spectrum signal and the coefficients of a plurality of said coefficient tables thereby to implement plural parallel filters producing plural parallel despread output signals each corresponding to a filter output corresponding to a respective one of said tables of coefficients;
   an operator mechanism configured to detect at said filter outputs at least one parameter selected from the group consisting of a) signal strength, b) quieting, c) phase lock, and d) signal quality and based on the at least one detected parameter to select an output of a filter for demodulation; and
   a demodulator configured to demodulate data having a data bandwidth at the selected filter output.

21. The system according to claim 20, wherein the bandwidth of each of said plural filters is matched to the data bandwidth of data modulated on said received direct sequence spread spectrum signal.

22. The system according to claim 21, wherein each of the plural parallel filters has a bandwidth less than the data bandwidth during demodulation.

23. The system according to claim 20, wherein each of the plurality of filters has a bandwidth less than a reciprocal of a repetition rate of a code sequence of the despreader.

24. The system according to claim 20, wherein each of the plurality of filters has a bandwidth less than or equal to approximately one half of the carrier frequency uncertainty.

25. The system according to claim 20, wherein each of the plurality of filters has a bandwidth in a range of approximately one tenth to one half of the carrier frequency uncertainty.

26. The system according to claim 20, wherein said operator mechanism selects one of said plurality of filters having a strongest signal level above a predetermined minimum level.

27. The system according to claim 20, wherein the operator mechanism comprises a calculator configured to calculate an average signal strength of said filter outputs with at least one of a highest and a lowest signal strength eliminated from calculation of the average, and selects a filter having an output exceeding the calculated average by a predetermined margin.

28. The system according to claim 20, wherein said operator mechanism selects a filter based on outputs of adjacent filters having stronger signal levels than outputs of others of said filters.

29. The system according to claim 20, wherein the despreader comprises a parallel correlator.

30. The system according to claim 29, wherein the parallel correlator includes a clock input which receives a parallel correlator clock clocked at a chipping rate.

31. The system according to claim 29, wherein said parallel correlator comprises a correction mechanism configured to correct a parallel correlator clock in time by a portion of a chip duration.

32. The system according to claim 20, wherein each of the plurality of parallel filters has a bandwidth less than the data bandwidth during demodulation.

33. The system according to claim 20, wherein said despreader further comprises a local reference frequency device that provides said local reference frequency for mixing with said received direct sequence spread spectrum signal; and said system further comprises:
a temperature measurement device for providing a temperature of said system;
a frequency reference correction device for calculating a frequency correction factor based on said temperature; and
a drift correction device for providing a frequency drift correction factor to said local reference frequency device based on said temperature.

34. The system according to claim 20, further comprising:
a jamming warning mechanism configured to provide a jamming warning when a majority of the plurality of filter outputs simultaneously exceeds a predetermined signal strength.

35. The system according to claim 20, wherein said operator mechanism is configured to interpolate a frequency between outputs of adjacent ones of said filters having predetermined signal strengths based on a ratio of received signal energies between the adjacent filter outputs and selects the output of a filter centered at the interpolated frequency.

36. In a direct sequence spread spectrum receiver, a method for receiving a transmitted direct sequence spread spectrum signal, comprising the steps of:

despreading a received direct sequence spread spectrum signal by mixing the received signal with a chip code reference signal;

applying the despread signal simultaneously to a plurality of parallel filters, each filter of said plurality of filters having a bandwidth based on a reference chip code rate and chip code length of said receiver, where said bandwidth is less than a frequency uncertainty between the transmitted and received direct sequence spread spectrum signals;

detecting at an output of each of the plurality of filters at least one parameter of a) signal strength, b) quieting, c) phase lock, and d) signal quality;

selecting for data demodulation an output of a filter based upon the at least one parameter detected at the output of each of said plurality of filters; and demodulating one of data having a data bandwidth and voice information from the selected filter output.

37. The method according to claim 36, further comprising the step of pipelining an output of each filter in said plurality of filters to sample storage buffers.

38. The method according to claim 36, further comprising the steps of:

detecting a signal strength at each filter output of the plurality of filters;

comparing the detected signal strength at each filter output to a predetermined signal strength; and providing a jamming warning when a majority of the signal strengths of the plurality of filter outputs simultaneously exceed said predetermined signal strength.

39. The method according to claim 36, further comprising the steps of:

counteracting signal fading comprising:
measuring, during reception of a transmitted preamble, a first phase of a first signal from a first antenna,
measuring, during the reception of the transmitted preamble, a second phase of a second signal from a second antenna,
computing, as a phase correction factor, a difference between the first and second phases,
applying the phase correction factor to a phase delaying device which constructively combines the first and second signals from the first and second antennas in phase with each other; and
demodulating data from the constructively combined first and second signals.

40. The method according to claim 36, further comprising:

measuring, during reception of a transmitted preamble, a first signal strength of a first antenna, and a second signal strength of a second antenna;

comparing the first and second signal strengths;

determining, upon comparison of the first and second signal strengths, a stronger signal strength antenna;

enabling, based upon the determining step, only the stronger signal strength antenna; and demodulating data, upon completion of the transmitted preamble, with only the stronger signal strength antenna enabled.

41. The method according to claim 36, further comprising:

establishing the bandwidth of each of the plural parallel filters at less than the data bandwidth prior to demodulation; and establishing the bandwidth of the filter having the selected output to be at least equal to the data bandwidth during demodulation.

42. The method according to claim 36, wherein the step of selecting for data demodulation comprises:

interpolating a frequency between outputs of adjacent ones of said parallel filters having predetermined signal strengths based on a ratio of received signal energies between the adjacent filter outputs; and selecting the output of a filter centered at the interpolated frequency.

43. A receiving method employed in a direct sequence spread spectrum receiver for receiving a direct sequence spread spectrum signal with time uncertainty in a chip code alignment and frequency uncertainty between a carrier frequency of a transmitter and a local reference frequency of the receiver, the method comprising the steps of:

despreading a received direct sequence spread spectrum signal to produce a despread signal;

applying the despread signal simultaneously to a plurality of filters each having a bandwidth based on a reference chip code rate and chip code length of said receiver, where said bandwidth is less than said frequency uncertainty;

applying a trip level algorithm to outputs of the plurality of filters, in order to achieve initial spread spectrum synchronization and resolve the time uncertainty of the chip code alignment;

selecting the output of at least one filter for subsequent demodulation based on the applying said trip level algorithm; and demodulating the selected filter output of at least one of data having a data bandwidth and voice.

44. The method of claim 43, wherein said step of applying the trip level algorithm comprises:

determining at least one of (1) which filter output has a signal strength higher than signal strengths of other filter outputs by at least a predetermined margin, (2) which filter output has the greatest signal strength, and (3) which filter output has a signal strength higher by at least a preset margin than an average of the signal strengths of the filter outputs, wherein, in computing the average of the signal strengths, at least one of the following steps is performed: (a) the lowest signal strength is removed from the average, (b) the highest signal strength is removed from the average, and (c) all signal strengths are used in the average.

45. The receiving method according to claim 43, further comprising:

detecting a signal strength of each filter output;

comparing the detected signal strength of each filter output to a predetermined signal strength; and providing a jamming warning when a majority of said filter outputs simultaneously have a signal strength above said predetermined signal strength.

46. The receiving method according to claim 43, further comprising:

correcting phase drift of a chip code clock based on an offset between the center frequency of the selected filter output and the center frequency of a predetermined filter output representing zero frequency error in the absence of frequency uncertainty.

47. The method according to claim 43, wherein the selecting step comprises choosing a filter output having a largest signal strength.

48. The method according to claim 43, wherein the step of applying the trip level algorithm further comprises:

combining signal strengths of all filter outputs to obtain a combined signal strength; and comparing the combined signal strength to a previous combined signal strength at a previous chip code alignment.

49. The method according to claim 43, further comprising:

setting adjacent channel filter attenuation such that a signal having a center frequency in one filter bandwidth is attenuated in an adjacent filter bandwidth by at least a maximum trip level.

50. The receiving method according to claim 43, wherein the step of applying the trip level algorithm comprises:

measuring and combining signal strengths at outputs of the filters, including, determining a first combined signal strength level output by said filters at a first chip code phase alignment;

determining a second combined signal strength level output by said filters at a second chip code phase alignment; and verifying that said second combined signal strength level exceeds the first combined signal strength level by at least a predetermined amount.

51. The method according to claim 43, further comprising:

compensating for chip code phase alignment drift of the receiver with respect to the transmitter, comprising, measuring a frequency offset of the selected filter output with respect to the center frequency of a predetermined filter output representing zero frequency error in the absence of frequency uncertainty, calculating a chip code phase drift correction factor based on the frequency offset;

applying the calculated chip code phase drift correction factor to produce a phase corrected chip code sequence; and demodulating data utilizing the phase corrected chip code sequence.

52. The method according to claim 43, further comprising:

establishing the bandwidth of each of the plurality of filters at less than the data bandwidth prior to demodulation;

establishing the bandwidth of the filter having the selected output to be at least equal to the data bandwidth during demodulation.

53. The method according to claim 43, wherein:

the step of applying the trip level algorithm comprises, interpolating a frequency between outputs of adjacent ones of said filters having predetermined signal strengths based on a ratio of received signal energies between the adjacent filter outputs; and the step of selecting comprises, selecting the output of a filter centered at the frequency interpolated in said trip level algorithm applying step.

54. The method according to claim 43, further comprising the step of:

jogging the chip code reference to correct for chip code phase drift.

55. The method according to claim 43, further comprising:

counteracting signal fading comprising, measuring, during reception of a transmitted preamble, a first phase of a first signal from a first antenna, measuring, during the reception of the transmitted preamble, a second phase of a second signal from a second antenna, computing, as a phase correction factor, a difference between the first and second phases, and applying the phase correction factor to a phase delaying device which constructively combines the first and second signals from the first and second antennas in phase with each other; and demodulating data from the constructively combined first and second signals.

56. In a receiving method employed in a direct sequence spread spectrum receiver for receiving a direct sequence spread spectrum signal with time uncertainty in a chip code alignment and frequency uncertainty between a carrier frequency of a transmitter transmitting said direct sequence spread spectrum signal and a local reference frequency of the direct sequence spread spectrum receiver, the improvement comprising the steps of:

applying a trip level algorithm to the outputs of a plurality of filters in order to achieve initial spread spectrum synchronization, including, determining at each chip code phase alignment a previous history average of outputs of said filters from at least the previous chip code phase alignment, comparing, for each successive chip code phase alignment, the signal strength of the outputs of each of the plurality of filters to said previous history, determining at least one filter output that is higher than said previous history, by at least a predetermined level;

selecting for demodulation an output of one of said filters which has a signal strength higher than said previous history, by at least said predetermined level based on the determined at least one filter; and demodulating data having a data bandwidth at the output of the selected filter.

57. The method according to claim 56, further comprising:

establishing the bandwidth of each of the plurality of filters at less than the data bandwidth prior to demodulation; and establishing the bandwidth of the filter having the selected output to be at least equal to the data bandwidth during demodulation.

58. The method according to claim 57, wherein the step of selecting for demodulation the output of one of said filters comprises:

interpolating a frequency between outputs of adjacent ones of said plurality of filters having predetermined signal strengths based on a ratio of received signal energies between the adjacent filter outputs; and selecting the output of a filter centered at the interpolated frequency.

59. A method for receiving a direct sequence spread spectrum signal with time uncertainty in a chip code alignment and frequency uncertainty between a carrier frequency of a transmitter transmitting said direct sequence spread spectrum signal and a local reference frequency of a receiver, comprising the steps of:

despreading a received direct sequence spread spectrum signal to produce a despread signal;

applying the despread signal simultaneously to a plurality of filters each having a bandwidth based on a reference chip code rate and chip code length of said receiver, where said bandwidth is less than said frequency uncertainty; and applying a trip level algorithm to outputs of the plurality of filters, comprising, computing, at a first chip code alignment, a signal strength of an output of each of the filters relative to an output of a filter having a lowest signal strength, summing the signal strengths, computed at the first chip code alignment, of all filter outputs into a first combined signal strength, computing at a second chip code alignment a signal strength of an output of each of the filters relative to an output of a filter having a lowest signal strength, summing the signal strengths computed at the second chip code alignment, of all filter outputs into a second combined signal strength, and comparing the second combined signal strength to the first combined signal strength to determine if the second combined signal strength exceeds the first combined signal strength by a trip level.

60. A method of receiving a direct sequence spread spectrum signal having both chip code phase uncertainty and frequency uncertainty, comprising:

despreading a received direct sequence spread spectrum signal by means of a chip code sequence to produce a despread signal;

applying the despread signal to plural filters;

selecting an output of a candidate filter from said plural filters for demodulation;

measuring a frequency offset from the candidate filter to a filter representing a zero offset frequency error in the absence of frequency uncertainty;

calculating a chip code sequence phase correction factor for compensation of code drift; and using the chip code sequence phase correction factor to correct a phase in the chip code sequence.

61. The method according to claim 60, further comprising:

demodulating the output of said candidate filter.

62. A method of receiving a direct sequence spread spectrum signal having both chip code phase uncertainty and frequency uncertainty, comprising:

despreading the received direct sequence spread spectrum signal to produce a despread signal;

applying the despread signal to a filter bank comprising plural filters;

measuring signal strengths at outputs of each of the plural filters;

applying a trip level algorithm to determine if the measured signal strengths exceeds a predetermined value;

selecting an output of a candidate filter from said plural filters for demodulation;

measuring a frequency offset from the candidate filter output to a center frequency filter output; and selecting, based on the frequency offset measured in said measuring step, an alternative filter bank having plural filters and a center frequency offset by a portion of a filter bandwidth.

63. A direct sequence spread spectrum system including a transmitter which transmits a spread spectrum signal comprising a direct sequence chip code and a carrier frequency, and a receiver which receives the transmitted signal and resolves carrier frequency uncertainty between the carrier frequency of the transmitter and a local reference frequency of the receiver and chip code phase uncertainty between the chip code of the transmitter and a chip code of the receiver, the system comprising:

a despreader configured to despread the received signals, comprising a chip code sequence phase shifter which shifts a phase of the receiver chip code sequence while searching to resolve said chip code phase uncertainty;

a plurality of filters each having an output of the despreader applied thereto and each having a bandwidth less than said carrier frequency uncertainty; and an operator mechanism configured to detect outputs of said filters at consecutive code chips and to use concurrently detected outputs of the plurality of said filters to determine existence of chip code synchronization at each code chip, and to cause said chip code phase shifter to cease shifting the phase of the receiver chip code when chip code synchronization is determined to exist.

64. The system according to claim 63, wherein the operator mechanism is configured to determine existence of chip code synchronization at each code chip in relation to a minimum trip level threshold.

65. The system according to claim 63, wherein the plurality of filters comprise parallel filters.

66. The system according to claim 63, wherein the plurality of filters comprise parallel filters having adjacent pass bands.

* * * * *